US008046694B1

(12) United States Patent (10) Patent No.: US 8,046,694 B1
Lappas et al. (45) Date of Patent: Oct. 25, 2011

(54) MULTI-SERVER CONTROL PANEL

(75) Inventors: Paul Lappas, San Francisco, CA (US); John Martin Keagy, San Francisco, CA (US); Nicholas F. Peterson, El Cerrito, CA (US)

(73) Assignee: Gogrid, LLC, San Francisco, CA (US)

( * ) Notice: Subject to any disclaimer, the term of this patent is extended or adjusted under 35 U.S.C. 154(b) by 867 days.

(21) Appl. No.: 11/834,761

(22) Filed: Aug. 7, 2007

Related U.S. Application Data

(60) Provisional application No. 60/954,310, filed on Aug. 6, 2007.

(51) Int. Cl.
G06F 3/00 (2006.01)
(52) U.S. Cl. ........ 715/740; 715/733; 715/734; 715/738; 715/735
(58) Field of Classification Search .................. 715/740, 715/733, 734, 738, 735
See application file for complete search history.

(56) References Cited

U.S. PATENT DOCUMENTS

| | | |
|---|---|---|
| 5,375,199 A | 12/1994 | Harrow et al. |
| 5,852,812 A | 12/1998 | Reeder |
| 5,893,077 A | 4/1999 | Griffin |
| 5,930,773 A | 7/1999 | Crooks et al. |
| 6,430,160 B1 | 8/2002 | Smith et al. |
| 6,529,784 B1 | 3/2003 | Cantos et al. |
| 6,567,850 B1 | 5/2003 | Freishtat et al. |
| 6,868,444 B1 | 3/2005 | Kim et al. |
| 6,888,836 B1 | 5/2005 | Cherkasova |
| 6,912,221 B1 | 6/2005 | Zadikian et al. |
| 6,985,937 B1 | 1/2006 | Keshav et al. |
| 7,010,493 B2 | 3/2006 | Yamamoto et al. |
| 7,020,628 B2 | 3/2006 | Peterson et al. |
| 7,054,308 B1 | 5/2006 | Conway |
| 7,080,378 B1 | 7/2006 | Noland et al. |
| 7,577,722 B1 | 8/2009 | Khandekar et al. |
| 7,587,492 B2 | 9/2009 | Dyck et al. |
| 7,649,851 B2 | 1/2010 | Takashige et al. |
| 2004/0054793 A1 | 3/2004 | Coleman |
| 2004/0267897 A1 | 12/2004 | Hill et al. |
| 2005/0038834 A1 | 2/2005 | Souder et al. |
| 2005/0120160 A1 | 6/2005 | Plouffe et al. |
| 2006/0168224 A1 | 7/2006 | Midgley |

(Continued)

OTHER PUBLICATIONS iReasoning Inc., "SysUpTime User Manual Version 3.5," Mar. 2007.*

(Continued)

Primary Examiner — William L Bashore
Assistant Examiner — Daniel Um
(74) Attorney, Agent, or Firm — Adeli & Tollen LLP

(57) ABSTRACT

Some embodiments of the invention provide a graphical user interface for receiving a server configuration (e.g., receiving a new configuration or a modification to an existing configuration). The graphical user interface (UI) includes several UI control elements for defining components of the server configuration. It also includes a display area for displaying graphical representations of the defined components of the server configuration. Examples of control elements in some embodiments include control elements for adding, deleting, and modifying servers. In some embodiments, at least one control element is displayed when a cursor control operation is performed on the UI. The cursor control operation (e.g., a right hand click operation) in some embodiments opens a display area that shows the control element. In some embodiments, at least two different components in the server configuration correspond to two different layers (e.g., a web server layer and a data storage layer) in the server configuration. The display area of some embodiments includes multiple tiers, where each tier is for displaying graphical representation of components in a particular layer of the server configuration. At least two tiers in some embodiments are displayed simultaneously in the display area.

6 Claims, 52 Drawing Sheets

U.S. PATENT DOCUMENTS

| | | |
|---|---|---|
| 2006/0184653 A1 | 8/2006 | van Riel |
| 2006/0206619 A1 | 9/2006 | Dan et al. |
| 2007/0240160 A1 | 10/2007 | Paterson-Jones et al. |
| 2007/0250608 A1 | 10/2007 | Watt |
| 2007/0266433 A1 | 11/2007 | Moore |
| 2008/0052206 A1 | 2/2008 | Edwards et al. |
| 2008/0298568 A1 | 12/2008 | Karandikar |
| 2009/0182605 A1 | 7/2009 | Lappas et al. |
| 2009/0235067 A1 | 9/2009 | Miller et al. |

OTHER PUBLICATIONS

Microsoft Press, "Microsoft Windows User Experience," 1999, Chapter 5.*
U.S. Appl. No. 12/652,730, filed Jan. 5, 2010, Lappas, Paul, et al.
Portions of prosecution history of U.S. Appl. No. 11/834,722, filed Apr. 5, 2010, Lappas, Paul, et al.
Portions of prosecution history of U.S. Appl. No. 11/834,726, filed Dec. 24, 2009, Lappas, Paul, et al.
Preliminary Amendment of U.S. Appl. No. 12/353,246, filed Dec. 31, 2009, Lappas, Paul, et al.
Response to Office Action of U.S. Appl. No. 11/834,732, filed Apr. 1, 2010, Lappas, Paul, et al.
VMware Infrastructure 3 Primer: ESX Server 3.5, ESX Server 3i version 3.5, VirtualCenter 2.5, Nov. 2007, Revision: 20071129, VMware, Inc., Palo Alto, CA.
U.S. Appl. No. 11/834,768, filed Aug. 7, 2007, Lappas, Paul, et al.
U.S. Appl. No. 11/834,722, filed Aug. 7, 2007, Lappas, Paul, et al.
Non-Final Office Action of U.S. Appl. No. 11/834,722, Oct. 5, 2009 (mailing date), Lappas, Paul, et al.
U.S. Appl. No. 11/834,726, filed Aug. 7, 2007, Lappas, Paul, et al.
Restriction Requirement of U.S. Appl. No. 11/834,726, Sep. 15, 2008 (mailing date), Lappas, Paul, et al.
Non-Final Office Action of U.S. Appl. No. 11/834,726, Apr. 10, 2009 (mailing date), Lappas, Paul, et al.
U.S. Appl. No. 11/834,732, filed Aug. 7, 2007, Lappas, Paul, et al.
Non-Final Office Action of U.S. Appl. No. 11/834,732, Oct. 1, 2009 (mailing date), Lappas, Paul, et al.
U.S. Appl. No. 12/185,774, filed Aug. 4, 2008, Lappas, Paul, et al.
Amazon Elastic Compute Cloud (Amazon EC2)—Limited Beta, Amazon Web Services, Jul. 2007 (web page archive date from web.archive.org), http://web.archive.org/web/20070705164650rn_2/www.amazon.com/b?ie=UTF8&node=201590011, Amazon.Com, Inc.
Amazon Elastic Compute Cloud (Amazon EC2)—Limited Beta FAQs, Amazon Web Services, Jul. 2007 (web page archive date from web.archive.org), http://web.archive.org/web/20070626055456/www.amazon.com/b?ie=UTF8&node=201591011, Amazon.Com, Inc.
Amazon EC2: Developer Guide (API Version Jun. 26, 2006), 2006 (Month NA), Amazon.Com, Inc., Seattle, WA.
Amazon EC2: Developer Guide (API Version Oct. 1, 2006), 2006 (Month NA), Amazon.Com, Inc., Seattle, WA.
Amazon EC2: Developer Guide (API Version Jan. 3, 2007), 2006 (Month NA), Amazon.Com, Inc., Seattle, WA.
Amazon EC2: Developer Guide (API Version Jan. 19, 2007), 2006 (Month NA), Amazon.Com, Inc., Seattle, WA.
Amazon EC2: Developer Guide (API Version Mar. 1, 2007), 2007 (Month NA), Amazon.Com, Inc., Seattle, WA.
Amazon EC2: Developer Guide (API Version Aug. 29, 2007), 2007 (Month NA), Amazon.Com, Inc., Seattle, WA.
The first grid operating system that runs and scales existing web applications, Jun. 2006 (web page archive date from web.archive.org), http://web.archive.org/web/20060627045727/www.3tera.com/, 3TERA, Inc.
Utility Computing—the easy way to run and scale online applications, Jul. 2007 (web page archive date from web.archive.org), http://web.archive.org/web/20070718011012/www.3tera.com/, 3TERA, Inc.
AppLogic 2.0—What's new, Jul. 2007 (web page archive date from web.archive.org), http://web.archive.org/web/20070701162502/www.3tera.com/applogic20.html, 3TERA, Inc.
AppLogic Overview, Jul. 2007 (web page archive date from web.archive.org), http://web.archive.org/web/20070701161932/www.3tera.com/applogic.html, 3TERA, Inc.
AppLogic Usage, Jul. 2007 (web page archive date from web.archive.org), http://web.archive.org/web/20070712042731/www.3tera.com/applogic-usage.html, 3TERA, Inc.
AppLogic User Interface, Jul. 2007 (web page archive date from web.archive.org), http://web.archive.org/web/20070704235539/www.3tera.com/applogic-ui.html, 3TERA.
AppLogic Hardware Configuration, Jul. 2007 (web page archive date from web.archive.org), http://web.archive.org/web/20070707062814/www.3tera.com/applogic-hw.html, 3TERA, inc.
AppLogic Features, Jul. 2007 (web page archive date from web.archive.org), http://web.archive.org/web/20070630051607/www.3tera.com/applogic-features.html, 3TERA, inc.
AppLogic—Application Monitoring, Jul. 2007 (web page archive date from web.archive.org), http://web.archive.org/web/20070629035849/www.3tera.com/applogic-monitor.html, 3TERA, inc.
AppLogic Users, Jul. 2007 (web page archive date from web.archive.org), http://web.archive.org/web/20070630061258/www.3tera.com/applogic-users.html, 3TERA, inc.
AppLogic 2.0 Beta Program, Jul. 2007 (web page archive date from web.archive.org), http://web.archive.org/web/20070701162528/www.3tera.com/applogic20beta.html, 3TERA, inc.
3TERA—Press Release: 3Tera adds Application Monitoring of Multi-CPU Scalability to AppLogic Utility Computing Platform for SaaS and Web 2.0 Customers, May 24, 2007, http://www.3tera.com/News/Press-Releases/Archive/3Tera-adds-Application-Monitoring-and-Multi-CPU-Scalability-to-AppLogic.php, 3TERA, Inc.
Portions of prosecution history of U.S. Appl. No. 11/834,768, Aug. 19, 2010, Lappas, Paul, et al.
Updated portions of prosecution history of U.S. Appl. No. 11/834,722, Nov. 2, 2010, Lappas, Paul, et al.
Updated portions of prosecution history of U.S. Appl. No. 11/834,726, filed Oct. 27, 2010, Lappas, Paul, et al.
Updated portions of prosecution history of U.S. Appl. No. 12/353,246, filed Jul. 19, 2010, Lappas, Paul, et al.
Updated portions of prosecution history of U.S. Appl. No. 11/834,732, Jun. 17, 2010, Lappas, Paul, et al.
Portions of prosecution history of U.S. Appl. No. 12/185,774, Sep. 13, 2010, Lappas, Paul, et al.
Updated portions of prosecution history of U.S. Appl. No. 11/834,768, Nov. 23, 2010, Lappas, Paul, et al.
Updated portions of prosecution history of U.S. Appl. No. 11/834,722, Nov. 12, 2010, Lappas, Paul, et al.
Updated portions of prosecution history of U.S. Appl. No. 11/834,726, Dec. 9, 2010, Lappas, Paul, et al.
Updated portions of prosecution history of U.S. Appl. No. 12/353,246, Dec. 20, 2010, Lappas, Paul, et al.
Updated portions of prosecution history of U.S. Appl. No. 11/834,732, Dec. 17, 2010, Lappas, Paul, et al.
Updated portions of prosecution history of U.S. Appl. No. 12/185,774, Dec. 13, 2010, Lappas, Paul, et al.
Author Unknown, "Introduction to VMware Infrastructure: ESX Server 3.5, ESX Server 3i version 3.5, VirtualCenter 2.5," Dec. 2007, pp. 1-46, Revision: 20071213, VMware, Inc., Palo Alto, California, USA.
Author Unknown, "iSCSI SAN Configuration Guide: ESX Server 3.5, ESX Server 3i version 3.5, VirtualCenter 2.5," Nov. 2007, pp. 1-134, Revision: 20071129, VMware, Inc., Palo Alto, California, USA.
Author Unknown, "Parallels Server Transporter Guide," 2008 (Month NA), pp. 1-101, Parallels Software International Inc.
U.S. Appl. No. 12/982,487, Dec. 30, 2010 (filing date), Lappas, Paul, et al.
Portions of prosecution history of U.S. Appl. No. 12/652,730, Mail Date Dec. 30, 2010, Lappas, Paul, et al.
Updated portions of prosecution history of U.S. Appl. No. 11/834,768, Mail Date Apr. 18, 2011, Lappas, Paul, et al.
Updated portions of prosecution history of U.S. Appl. No. 11/834,726, Mail Date Mar. 31, 2011, Lappas, Paul, et al.
Updated portions of prosecution history of U.S. Appl. No. 12/353,246, Mail Date Apr. 12, 2011, Lappas, Paul, et al.
Updated portions of prosecution history of 11/834,732, Mail Date Mar. 14, 2011, Lappas, Paul, et al.
Updated portions of prosecution history of 12/185,774, Mail Date Mar. 14, 2011, Lappas, Paul, et al.

* cited by examiner

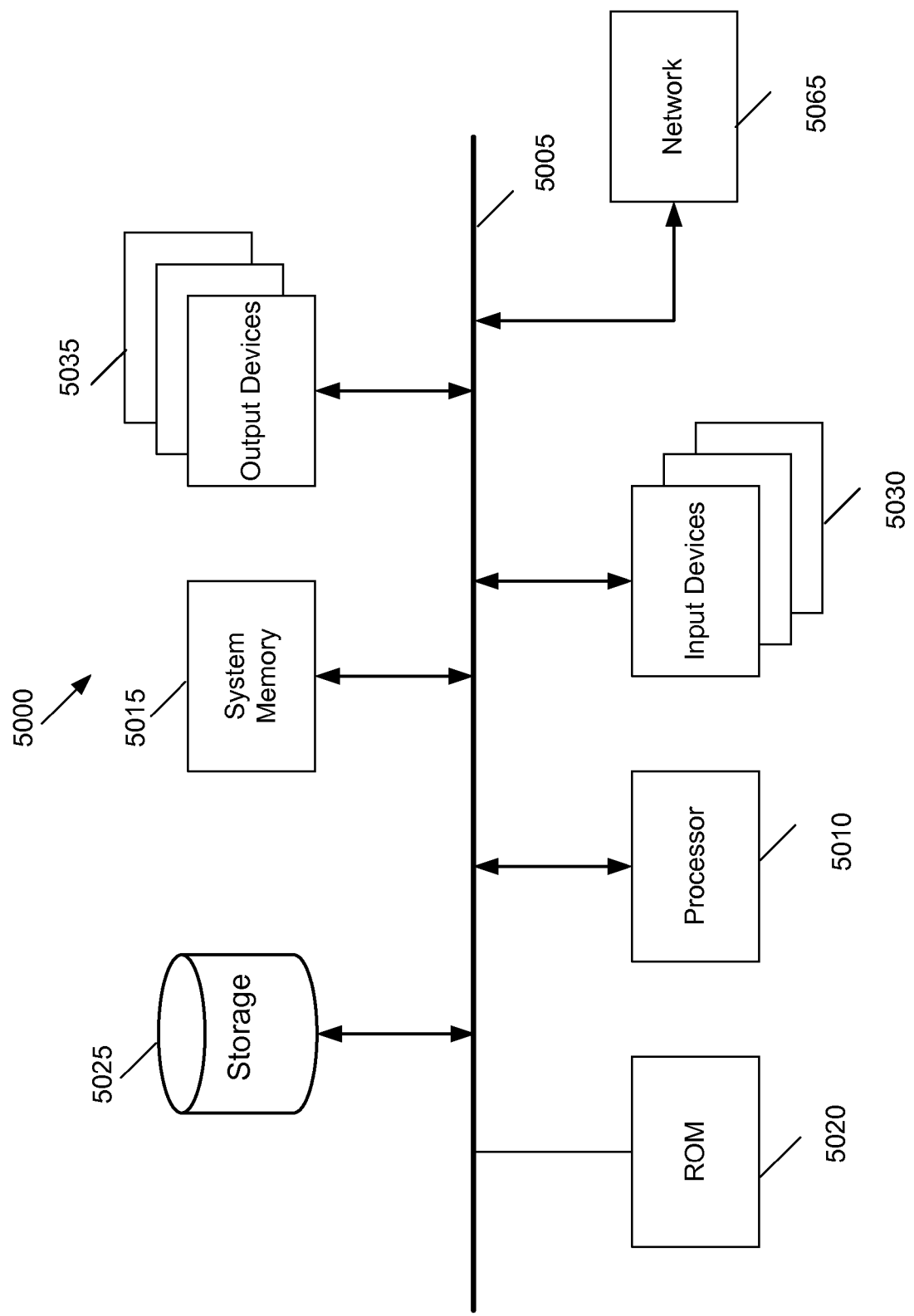

MULTI-SERVER CONTROL PANEL

CLAIM OF BENEFIT TO PROVISIONAL APPLICATION

This application claims benefit to U.S. Provisional Application 60/954,310, filed Aug. 6, 2007. This provisional application is incorporated herein by reference.

CROSS REFERENCE TO RELATED APPLICATIONS

This Application is related to the following applications: U.S. patent application Ser. No. 11/834,768, filed Aug. 7, 2007; U.S. patent application Ser. No. 11/834,722, filed Aug. 7, 2007; U.S. patent application Ser. No. 11/834,726, filed Aug. 7, 2007; U.S. patent application Ser. No. 11/834,732, filed Aug. 7, 2007; U.S. patent application Ser. No. 12/185,774, filed Aug. 4, 2008; and U.S. patent application Ser. No. 12/353,246, filed Jan. 13, 2009, now published as U.S. Patent Publication No. 2009/0182605.

FIELD OF THE INVENTION

The present invention relates to virtualized hosting services.

BACKGROUND OF THE INVENTION

Hosting services provide a means whereby multiple users can implement custom server configurations without the overhead costs associated with purchasing, upgrading, and maintaining the equipment needed to implement the configuration. Instead, the hosting service provides, maintains, and provisions the equipment so that multiple users are able to share such hardware. All the while, the hosting service creates the façade that each configuration is individually hosted on dedicated equipment.

To ensure quality of service for each configuration, typical hosting services allocate an amount of processing bandwidth (i.e., CPU cycles) to each configuration and charge users accordingly. For example, a configuration allocating 30% of the processing power of a physical device, guarantees that at any time during operation of the configuration, 30% of the processing power will be available to the configuration. In this way, traditional hosting services share resources while guaranteeing certain computational capacity to each configuration.

To facilitate the hosting services, users typically place an order for a hardware configuration requiring certain functionality. Users fill out forms or place telephone calls to specify their configuration. At the hosting service site, a system operator reviews the requests and manually determines where to distribute the configuration. The operator then configures the equipment and installs software as specified within the order request.

Once operational, changes to the configuration require additional requests to be placed with the operator. Therefore, through another order form or telephone call the users specify his request to an operator, who then must modify the configuration per the user's request. Since changing a configuration typically requires an operator to take down the configuration or temporarily disable the configuration, typical hosting services perform such modifications at specified times in the day where the impact to the customer is minimized. Additionally, by waiting until a specified time in the day, all changes to a particular piece of hardware can be done at one instant of the day, therefore minimizing downtime for all users.

Users typically make such modifications when their configurations experience greater or lesser loads or when they implement new components to be integrated with existing functionality. Therefore, hosting services provide a level of performance tracking to notify users of the performance of their configurations. However, reporting of hosting services typically coincides with billing reporting so that users are only notified at the end of a billing period as to the performance of their system.

However, as users become more sophisticated and require more control over their hosted configurations, the services provided by such hosting services are unable to meet the needs of such users. Users require a highly customizable and robust method by which to specify their configurations while still having a simple interface to do so. Additionally, since predicting behavior of a configuration prior to deployment is inaccurate at best, users require a means by which information as to their configurations is conveyed to them in real-time. Such information should assist the user in identifying potential problem areas prior to occurring or as they occur. Some users prefer direct monitoring where the information is conveyed to them whenever they so desire, while other users prefer indirect monitoring so that they are only notified of potential or actual problems when they occur.

In conjunction with such monitoring functionality, users require the ability to quickly and easily modify an existing configuration to respond to such changes. However, some users only have a small window in which to make the changes before the spike in demand is lost. Therefore, such users require a near instantaneous reconfiguration functionality to make and implement the changes without having to wait for service personnel to accept, verify, and implement the changes. Rather, an automated system that simply responds to the users actions is desired.

Such rapid reconfiguration functionality is additionally desired so that the user need not always allot resources in case of a worst case scenario. For example, a user's configuration may only experience a traffic spike that requires 40% of the processing power for only ten minutes in a day. Typical hosting services require a user to statically purchase resources for the 40% processing power even though such traffic occurs for only a small percentage of the user's overall configuration. Therefore, a need arises to allow users the ability to dynamically allocate resources as needed and only pay for those resources as opposed to wasting resources in case the worst case scenario arises.

Additionally, users specify different configurations that utilize different amounts of resources. Therefore, to be billed based on a single resource that does not accurately reflect the usage of the configuration may be beneficial to some configurations while detrimental to others. Therefore, there is a need to monitor configurations based on resources other than allocated processing power. For instance, some users may prefer their configurations to be tracked based on allocated RAM, network bandwidth, or disk storage as some examples.

SUMMARY OF THE INVENTION

Some embodiments of the invention provide a graphical user interface for receiving a server configuration (e.g., receiving a new configuration or a modification to an existing configuration). The graphical user interface (UI) includes several UI control elements for defining components of the server configuration. It also includes a display area for displaying graphical representations of the defined components of the server configuration. Examples of control elements in some embodiments include control elements for adding, deleting, and modifying servers.

In some embodiments, at least one control element is displayed when a cursor control operation is performed on the UI. The cursor control operation (e.g., a right hand click operation) in some embodiments opens a display area that shows the control element.

In some embodiments, at least two different components in the server configuration correspond to two different layers (e.g., a web server layer and a data storage layer) in the server configuration. The display area of some embodiments includes multiple tiers, where each tier is for displaying graphical representation of components in a particular layer of the server configuration. At least two tiers in some embodiments are displayed simultaneously in the display area.

BRIEF DESCRIPTION OF THE DRAWINGS

The novel features of the invention are set forth in the appended claims. However, for purpose of explanation, several embodiments of the invention are set forth in the following figures.

FIG. 5 illustrates a selection of the template field that causes several operating systems to be displayed.

FIG. 6 illustrates a selection of a template field that causes several selectable web server templates to be displayed.

FIG. 23 illustrates an exemplary web server edit form for reconfiguring a web server.

FIG. 50 conceptually illustrates a computer system with which some embodiments of the invention are implemented.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

In the discussion below, Section I provides an overview of the multi-server control panel according to some embodiments. Section II provides examples of managing servers using the multi-server control panel. Section III provides several resource utilization meters according to some embodiments.

Some embodiments provide a method for automatedly receiving and provisioning a server configuration through a graphical user interface (GUI). In some embodiments, a graphical representation for the configuration is automatically mapped and allocated to a set of hardware nodes, where the performance of the configuration is tracked and analyzed. The set of hardware nodes represent the physical devices for implementing the functionality specified within the configuration. In some embodiments, the configuration is mapped and allocated to a single hardware node. In other embodiments, the configuration is mapped and allocated to multiple hardware nodes, each node for implementing at least one component or functional device within the configuration.

I. Architecture

Figure 1:
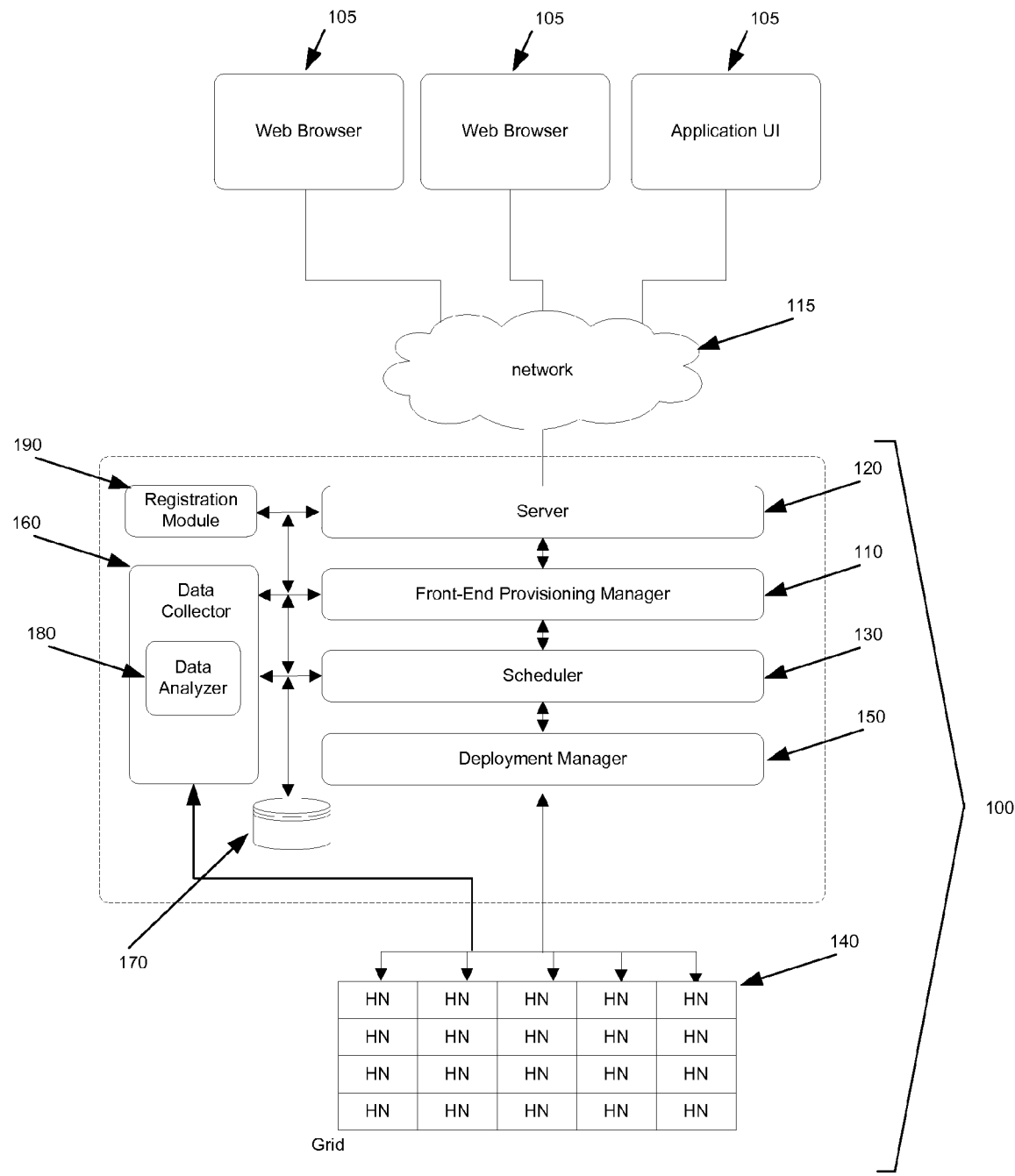
FIG. 1 illustrates a hosting system that implements some embodiments of the invention.

FIG. 1 illustrates a hosting system 100 that implements some embodiments of the invention. This system automatedly receives new or modified server configurations through front-end user interface (UI) logic and then automatedly deploys the server configuration onto a grid of hardware nodes through back-end placement logic. In some embodiments, the hosting system 100 provides hosting services for multiple unrelated users over the shared grid of hardware nodes. As shown in FIG. 1, the hosting system 100 includes: (1) a service request server 120, (2) front-end provisioning manager 110, (3) a scheduler 130, (4) a deployment manager 150, (5) a data collector 160, (6) a data analyzer 180, (7) a registration module 190, and (8) a data storage 170.

The service request server 120 (1) receives communications (i.e., service requests) from external users through a network 115 and (2) routes the communications to the front-end provisioning manager 110. In some embodiments, the service request server 120 is a web server, which communicates to a user through a network 115 such as the internet. Specifically, in such embodiments a user accesses the hosting system 100 through the user's web browser or through a downloadable client application 105 which may reside on the user's desktop computer, portable notebook computer, personal digital assistant (PDAs), digital cellular telephone, or other electronic communication device. In other embodiments, the user can access the hosting system 100 through communication networks other than the internet. For instance, the network 115 may include wireless data services (e.g., GPRS or other variations of 2 G or 3 G packet data services) or other electronic communication interfaces. In this manner, users may access the hosting system 100 while being located anywhere throughout the world.

The service request server 120 routes user communications to the front-end provisioning manager 110. On an initial communication, the front-end provisioning manager 110 passes the user communication to the registration module 190 for user verification and authentication. In some embodiments, the registration module 190 is a fully automated component of the hosting system 100 that performs the verification and authentication operations without human intervention. Accordingly, the registration module 190 receives identification information from the user and automatedly determines whether the user has already created an account with the system. In some embodiments, the identification information includes a username and password combination.

If the registration module 190 determines that the user is an existing customer, the registration module 190 retrieves the user's prior server configurations and usage information from the data storage (i.e., database) 170 and passes such information to the front-end provisioning manager 110.

However, if the registration module 190 determines that the user is not an existing customer, the registration module 190 of some embodiments presents a graphical interface with editable fields through which the user enters additional identification information for creating a user account. In some embodiments, creating the user account includes having the user specify a resource allotment plan and specify billing information such as credit card information. In some such embodiments, the user selects one or more resource allotment plans (e.g., a memory hour allotment plan and a data transfer allotment plan) to be billed individually. Such individual billing permits the user to modify one resource allotment plan and accrue charges for the modifications to the particular allotment plan only. In this manner, a user need not be billed for resources that are unnecessary.

The registration module 190 then authenticates the entered information so as to prevent fraudulent billing. After authentication, the registration module 190 stores the information within the database 170. With the authentication and verification of the user complete, the registration module 190 passes the user information and any previously specified configurations to the front-end provisioning manager 110.

The front-end provisioning manager 110 is responsible for generating a graphical interface through which users specify graphical representations for various server configurations (i.e., the multi-server control interface described in Section II below). In some embodiments, the graphical representations contain sets of selected graphical items, where each item represents a component of the server configuration. For instance, a user desiring to create a server configuration having a load balancer, multiple web servers, and a database server simply selects the three graphical elements within the GUI that represent such components. In some embodiments, such selection occurs when users click on items within the graphical display to add, modify, or delete the graphical representations for such items, while some other embodiments allow users the ability to drag and drop the graphical representations for such items across the graphical display.

In some embodiments, the specified configuration is scalable to increase or decrease allocated resources in response to demand through simple modification of the graphical representation. To facilitate the scaling of a server configuration, the front-end provisioning manager 110 acts as a user interface manager that provides a tiered hierarchical representation of the server configuration, as further described in Section II below.

Some embodiments of the front-end manager 110 further permit users the ability to specify configuration parameters for each component of the configuration or for the configuration as a whole. For instance, the front-end manager 110 of some embodiments allows users the ability to specify a desired software configuration (e.g., to specify operating systems, anti-virus protection, anti-spam protection, applications, etc.) to operate in conjunction with the specified hardware configuration.

In addition, the front-end manager 110 of some embodiments notifies users of the state of the configuration through graphical indicators that are displayed within the graphical representation of the configuration. Some embodiments update the graphical indicators in real-time.

After the graphical specification for the server configuration is complete, some embodiments of the front-end manager 110 automatedly provide the configuration to the hosting system's back-end logic, which is formed by the scheduler 130, the deployment manager 150, the data collector 160, and the data analyzer 180. In some embodiments, the scheduler 130 of the back-end logic receives the specified configuration from the front-end manager 110 and performs a logical assignment (i.e., identifies a mapping) of the components within the configuration to a grid of available hardware nodes 140. In some embodiments, the logical assignment is stored within the data storage 170 where it can be later accessed by other components of the hosting system 100. In some embodiments, the data storage 170 includes one or more databases that reside on one or more physical devices.

The scheduler 130 performs a constraint optimization process and produces a logical assignment for a user-specified configuration by considering a variety of factors. In some embodiments, the factors used in the constraint optimization process include: (1) the unallocated resources of the hardware nodes, (2) the behavioral characteristics of the specified configuration, (3) the individual characteristics associated with each user, and (4) the internal specific parameters. By considering these several dimensions, the scheduler performs intelligent resource allocation that maximizes the performance of the configuration over the set of hardware nodes 140 and maximizes the number of users able to use the nodes 140.

The deployment manager 150 receives the logical assignment directly from the scheduler 130 or from the data storage 170 after the scheduler 130 stores the assignment in the data storage 170. The deployment manager 150 automatedly allocates the logical assignment across one or more of the physical hardware nodes 140. In some embodiments, the deployment manager 150 acts as a virtualization manager to emulate the single server configuration as if it existed on a single hardware node, even though the deployment manager 150 may physically leverage the resources of multiple nodes to implement the single configuration. Moreover, a single functional component (e.g., a database server) of the user configuration may be distributed across multiple nodes 140. The deployment manager 150 further acts as a virtualization manager by allowing several different configurations the ability to leverage and share the resources of a single hardware node. These different configurations can be the different configurations of one user of the hosting system or can be different configurations of different users of the hosting system.

Together, the scheduler 130 and the deployment manager 150 provide an automated method and system to provision and allocate an array of hardware nodes 140 to multiple users without the need for human intervention. Accordingly, some embodiments of the invention provide a hosting system 100 that rapidly deploys a server configuration after the configuration is specified. Such a hosting system 100 can provide such services at any time. Section III below provides a more detailed discussion of the scheduler 130 and the deployment manger 150.

After mapping of the configuration to hardware, the data collector 160 in conjunction with the data analyzer 180 of some embodiments begin recording and analyzing the performance and activity of the configuration across the set of hardware nodes 140. In some embodiments, the data collector 160 takes periodic snapshots for each configuration. In conjunction with the periodic snapshots, some embodiments of the data collector 160 also perform real-time monitoring of some or all configurations. Within the snapshots or real-time data, the data collector 160 records the resource allocation and the performance of the configuration among other statistics within the database 170, therefore maintaining a log of configuration activity.

In some embodiments, the data analyzer 180 retrieves the data from the database 170 to convey historical information to the user as to the performance of a configuration. In some embodiments, the data analyzer 180 presents a real-time statistical analysis of the individual nodes of a configuration or the configuration as a whole. In some such embodiments, the data analyzer directly interfaces with the data collector 160 to acquire the real-time data. A detailed description of the data collector 160 and the data analyzer 180 is presented in Section III below.

Based on the data collected, the data analyzer 180 presents feedback to the system or users as to resource allocation, billing, and performance of the configurations. The data analyzer 180 of some embodiments analyzes the recorded data by comparing at least one allotted resource for a particular configuration to determine current usage or projected usage of the at least one resource and presents various notifications based on the results of such comparisons. Alternatively, some embodiments of the front-end manager 110 provide the various notifications by bypassing the data analyzer 180 and directly acquiring real-time information from the data collector 160 via a series of application programming interface (API) calls. As a result, the front-end logic implements real-time indicators within the graphical display to notify the user.

In some embodiments, notifications occur when the data analyzer 180 detects failures within the configuration. One such example occurs when the data analyzer 180 detects that an allocated amount of one or more resources have exceeded a specified threshold one or more times. Another example is when the data analyzer 180 detects an actual or potential bottleneck within a configuration such as an overloaded web server that is dropping service requests.

The notifications make users aware of the status of their configurations so that the users can take remedial action if deemed necessary to alleviate any failures or bottlenecks within the configuration. Should the user desire to allocate more resources (e.g., hardware, software, or other resources), the user alters the graphical representation of the configuration through the front-end user interface. The user can add, delete, and/or modify existing configuration resources.

The scheduler receives the modified configuration from the front-end manager and optimally re-provisions the modified configuration. The deployment manager then receives the re-provisioned configuration and re-allocates the resources across the hardware nodes to implement the modified configuration. Such re-provisioning and re-allocation occurs automatedly and without human intervention. As a result, users may dynamically allocate or reconfigure their set of allocated hardware resources via the graphical interface at any time. Such control allows users the ability to actively manage their own configurations without third-party intervention. Furthermore, such control allows users the ability to instantaneously and granularly adjust their configuration to account for actual or expected changes in demand. Accordingly, users are able to avoid excessive resource allocation and the costs associated therewith. In this manner, some embodiments of the invention create a hosting environment that simulates the user having a local server configuration while also providing the benefit of access to and control of the simulated local server configuration irrespective of the user's location.

Based on the detection of failures and bottlenecks within the configuration, some embodiments of the hosting system 100 provide automated reconfiguration of the user configuration without user input. In some such embodiments, the user, while configuring a server through the front-end logic, selects an automated reconfiguration option that directs the scheduler to generate a new mapping for the configuration upon encountering a failure. For example, if a web server of a particular configuration does not respond to user requests a certain amount of times in a certain time period, the data analyzer directs the scheduler to automatically add a web server to the user configuration to assist in the processing and therefore remedy the failure. Alternatively, if a web server of a particular configuration does not respond to user requests within a specified latency duration, the data analyzer directs the scheduler to automatically add a web server (i.e., a new component), increase resources of the existing web servers within the configuration (i.e., increase RAM or network bandwidth), or map an existing server to a less utilized more efficient node that can better respond to such requests so that processing is improved and the failure is removed.

The automated resource reconfiguration of some embodiments ensures a scalable multi-server configuration that on-the-fly adjusts to increased or decreased demand or transient traffic patterns. Such reconfiguration scales existing configuration by adding new components (e.g., additional web server) to the configuration or by allocating additional resources (e.g., additional RAM) to existing components within the configuration. Some such embodiments reduce the management overhead associated with the configuration as the hosting system 100 will automatically adjust the configuration to meet increased or decreased needs. Furthermore, costs to the client are minimized as excess hardware allocation of resources is eliminated while the grid of hardware nodes is maximally utilized as unused nodes can be assigned to perform other configurations.

It should be apparent to one of ordinary skill in the art that the grid of hardware nodes 140 include several distinct physical servers or clusters of servers. In some embodiments, the grid of hardware nodes is uniformly used to implement all components of a server configuration. However, some embodiments segregate various functionality across groups of nodes. For instance, in some embodiments, a first grouping or cluster of nodes are used to implement the load balancing servers of a configuration and a second grouping of cluster of nodes are used to implement other server components (e.g., web servers, database servers, etc.) of the configuration. In some such embodiments, the load-balancing servers dedicated F5 load balancing server appliances that can be configured to work in conjunction with the other nodes of the grid.

The resources of each node can be allocated to one or more different configurations and can therefore be shared by multiple users. Similarly, several nodes can be used to implement a single configuration. As such, the node array of some embodiments contains an inter-communication pathway by which each node shares data with other nodes of the array. Through, the inter-communication pathway, physically separated nodes together operate as a single functional unit.

As mentioned above, the set of hardware nodes in some embodiments is a set of distinct servers. In some embodiments, the servers are typically standalone server computers. However, one of ordinary skill will appreciate that servers in other embodiments encompass any standalone computational element that can process requests it receives. Moreover, in some embodiments, the grid of hardware nodes might include multi-core processing units that conceptually operate as several separate physical processing cores though physically are implemented within a single core. Accordingly, each multi-core processing unit may be allocated to one or more different users. It should be apparent to one of ordinary skill in the art that the architecture depicted in FIG. 1 does not encompass all embodiments of the invention. Some embodiments of the architecture may include other various functional components to work in conjunction with or instead of the enumerated components illustrated in FIG. 1.

II. Managing Servers

A. Configuring and Modifying Servers

Some embodiments provide a multi-server control panel that allows users to manage servers through user interface ("UI") elements. In some embodiments, the multi-server control panel provides UI elements that allow users to specify parameters that define or redefine the attributes of the servers. The multi-server control panel of some embodiments displays representation of the servers organized into several tiers, where each tier represents a layer in a server configuration. In other words, each tier represents a logical application layer (such as a load balancing layer, a web server layer, an application server layer, a database server layer, etc.) in a multi-server configuration.

Figure 2:
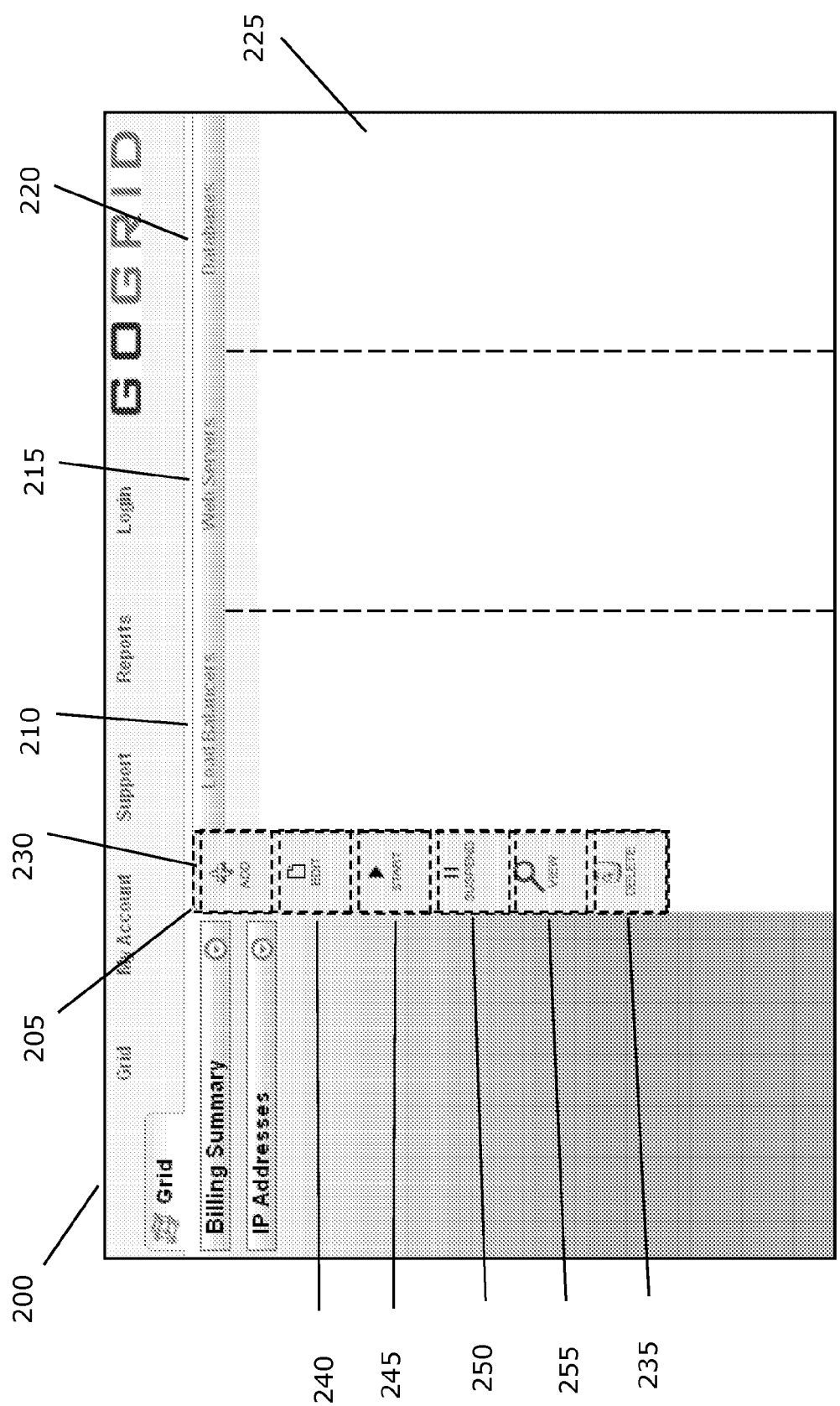
FIG. 2 illustrates an exemplary multi-server control panel of some embodiments of the invention.

FIG. 2 illustrates an exemplary multi-server control panel 200 of some embodiments of the invention. The multi-server control panel 200 includes (1) a display area 225 for displaying representations (e.g., graphical, textual) of servers, and (2) and a set of controls 205 for adding, deleting and managing the servers. In some embodiments, the set of controls 205 includes an add button 230, a delete button 235, an edit button 240, a start button 245, a suspend button 250, and a view button 255.

In the example illustrated in FIG. 2, the display area 225 is organized into columns that represent several tiers. In the example illustrated in this figure, the display area 225 includes a load balancer tier 210, web server tier 215, and database server tier 220. The tier organization allows a user to assess a server topology. This tier organization allows the user to scale the server topology by adding one or more servers to, or deleting one or more servers from, a particular tier using the multi-server control panel. For example, a user can scale the system topology by adding a second web server to support a first web server. The user can also scale the system topology by adding another tier (e.g., by adding an application server to a network configuration that includes a load balancer, a web server, and a database).

Another way in which the this organization allows the user to scale the server topology is by allowing the users to increase allocated resources (e.g., memory, storage, bandwidth, CPU) for any server in the server topology. Some embodiments of the multi-server control panel provide UI elements that allow a user to specify one or more attributes of a server (e.g., one or more attributes of a load balancer, a web server, an application server, a database server, etc). Examples of such attributes include the amount of memory, the OS of the server, and the name of the server.

Sections 1-3 provide several more detailed examples of how a user can use the multi-server control panel of some embodiments to add/delete servers and to specify the attributes of such servers. Sections D provide several more detailed examples of how the user can use the multi-server control panel of some embodiments to edit, start, stop, and restart server.

1. Adding Web Server

Figure 3:
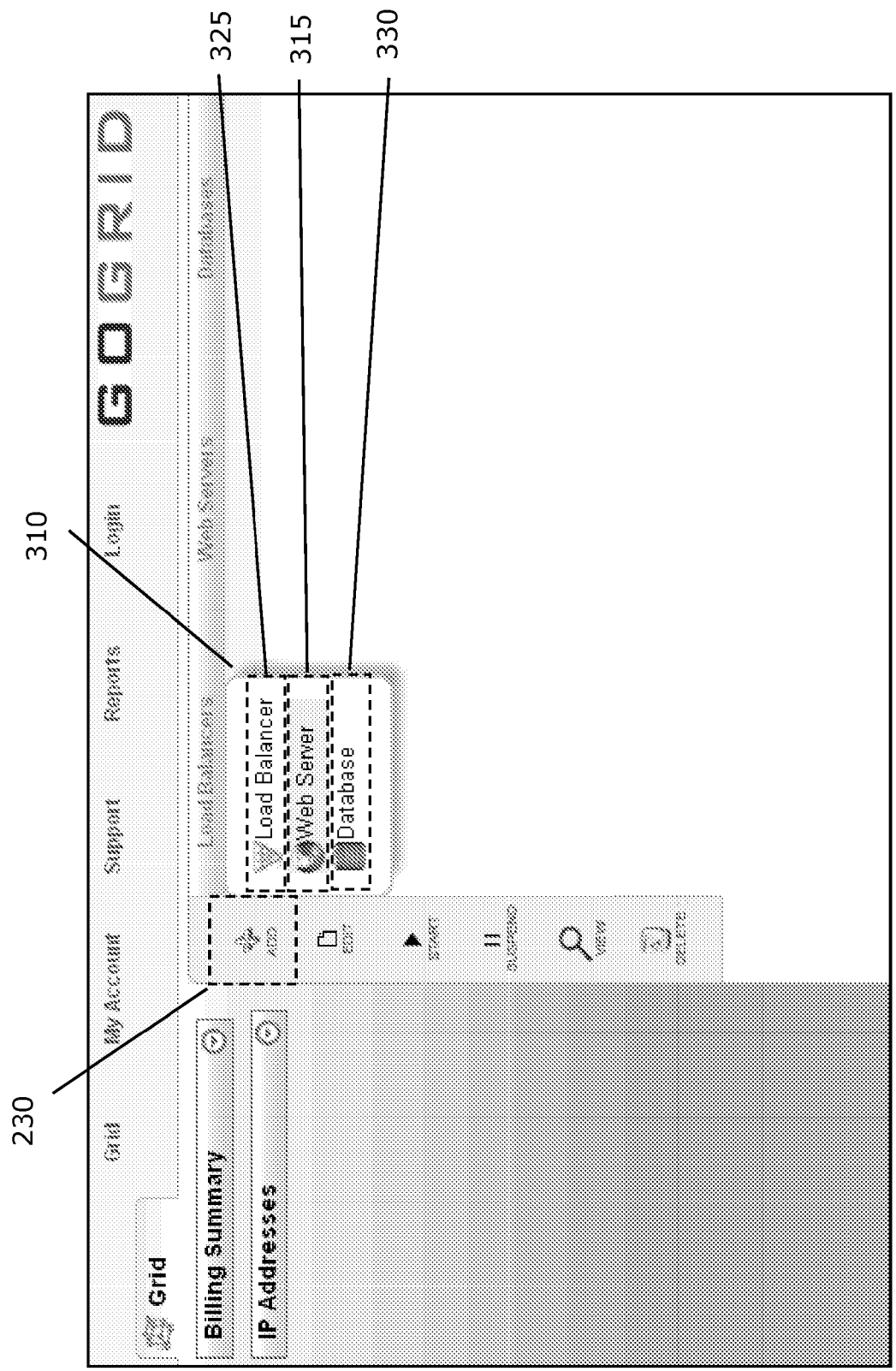
FIG. 3 illustrates an exemplary add button that causes a server list to be displayed.

FIGS. 3-9 present several illustrative examples regarding how a user can add a web server through a multi-server control panel 200. A user can add a web server to a server configuration by selecting (e.g., through a cursor click operation) the add button 230. In the example illustrated in FIG. 3, this selection causes a server list 310 to be displayed. In this example, the server list 310 has selectable icons for a load balancer, web server, and database server. As the user scrolls the server list 310, the selected icon is highlighted. This is shown in FIG. 3 with the icon for the web server highlighted, while the icons for the load balancer and database server are not highlighted.

Figure 4:
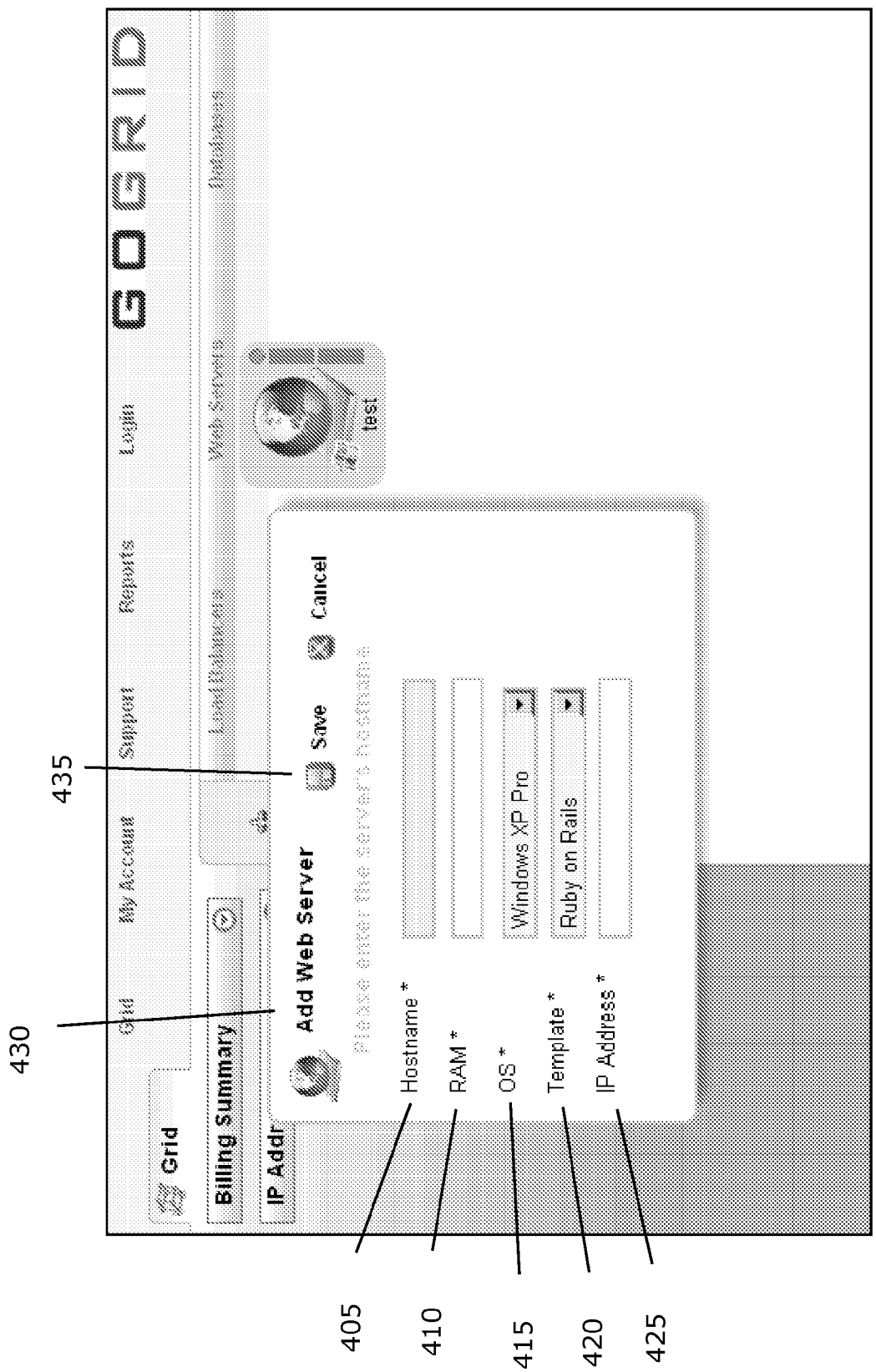
FIG. 4 illustrates an exemplary web server form defining a web server.

The user can select any of the icons in the server list 310 (e.g., by clicking on them or by scrolling to them and pressing the enter key). When the user selects the web server icon 315 in the server list 310, the user is presented with a web server form 430, as illustrated in FIG. 4. This form allows the user to define a web server that will be added to the configuration. The web server form 430 includes a name field 405, memory field 410, operating system ("OS") list 415, template field 420, and address field 425.

The name field 405 allows the users to specify a name or site name (e.g., "www.abc.com") for the web server. The IP address field 425 allows the users to specify an IP address for the web server. In some embodiments, the name field 405 and address field 425 are automatically filled in. For example, if a user specifies a hostname during a sign-up process, the name field 405 is automatically filled in with the site name provided by the user.

The memory field 410 allows a user to specify the amount of memory (i.e., RAM in some embodiments) that the user wants to allocate to the web server. Different embodiments allow the user to specify this amount differently. For instance, some embodiments allow a user to enter a numerical amount for the memory. Other embodiments allow the user to enter a percentage that specifies the percentage of an overall amount of memory that the user has purchased for his entire configuration or a particular tier of his configuration. For instance, a user might select a hosting plan with a hundred gigabyte of memory. In such a case, a user might then enter 10% in the memory field. This entry then allocates ten gigabytes of memory to the web server. If the user subsequently changes to a different hosting plan that includes more memory or less memory, the allocated memory for the web server is automatically adjusted to reflect the change in the pricing plan. In some embodiments, this field is implemented as a pull-down menu that opens to provide a list of selectable memory values that the user can choose from for the web server.

Instead of or in conjunction with the memory field 410, other embodiments might include fields for other resources in the web server form 430. Examples of such other resources include physical resources (such as storage space, number of CPUs, CPU cycles, etc.), and network resources (such as data transfer).

The OS field 415 allows the user to specify the operating system for the web server. In some embodiments, this field is implemented as a drop-down window that opens to provide a list of available operating systems that the user can choose from for the web server. FIG. 5 illustrates that when a user selects (e.g., mouse clicks) the OS field 415, several selectable operating systems are displayed such as "Windows XP Pro", "Windows 2000 Pro", "Red Hat", and "FreeBSD". As the user scrolls the OS field 415, the selected operating system is highlighted. This is illustrated in FIG. 5 with the "Windows XP Pro" highlighted, while the other operating systems are not highlighted. The user can select any of the operating systems in this list (e.g., by clicking on them or by scrolling to them and pressing the enter key).

The template field 420 allows the user to specify the template for a web server. The web server templates of some embodiments are preconfigured web servers that support dynamic web content. The web server templates of some embodiments are preconfigured web servers that include an application server or a web application framework such as Ruby on Rails.

Figure 6:
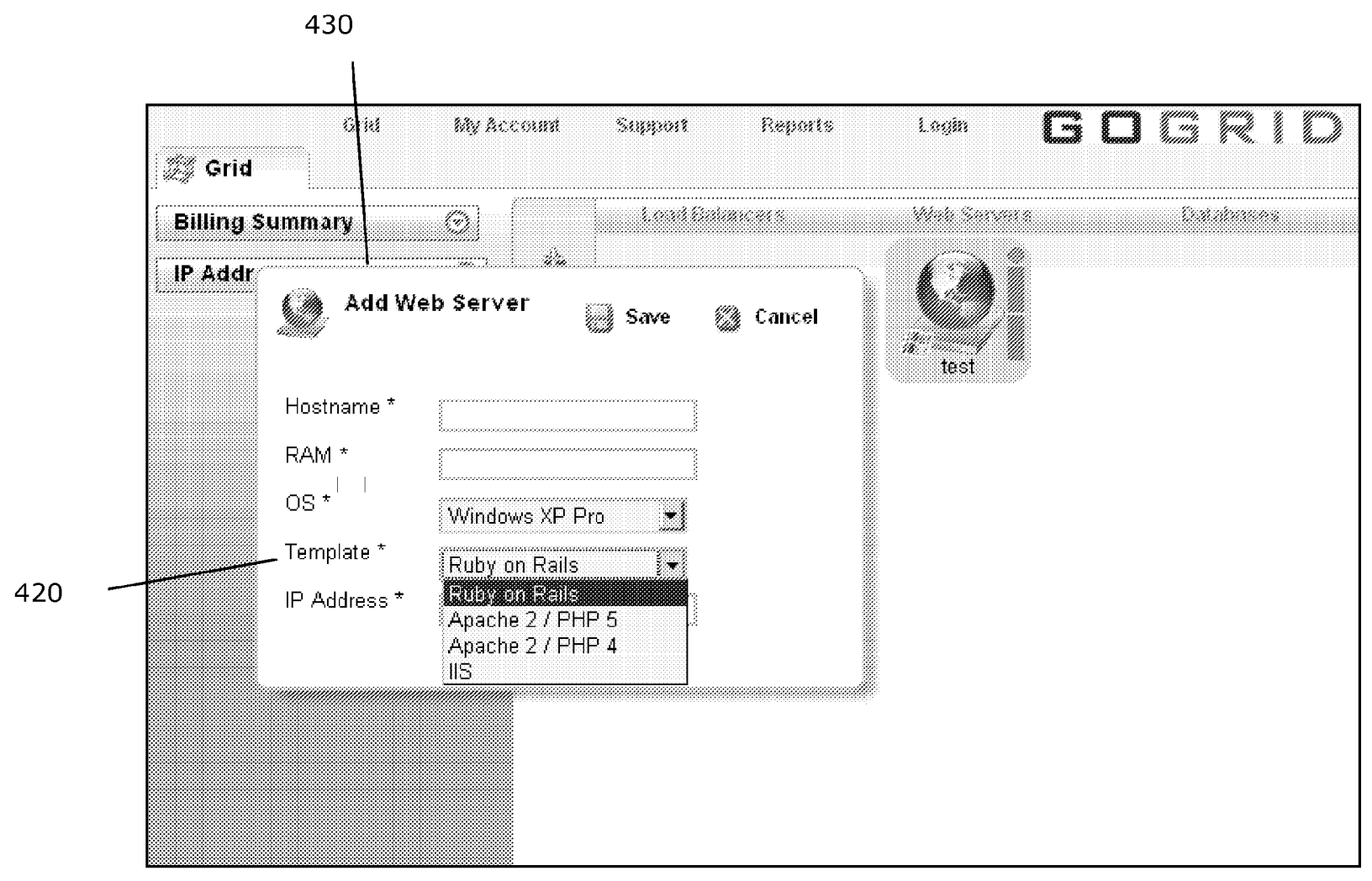

In some embodiments, the template field 420 is implemented as a drop-down window that opens to provide a list of available templates that the user can choose from for the web server. FIG. 6 illustrates that when a user selects (e.g., mouse clicks) the template field 420, several selectable web server templates are displayed such as "Ruby on Rails" and "Apache 2/PHP 5". As the user scrolls the template field 420, the selected web server template is highlighted. This is illustrated in FIG. 6 with the "Ruby on Rails" template highlighted, while the other web server templates are not highlighted. The user can select any of the operating systems in this list (e.g., by clicking on them or by scrolling to them and pressing the enter key).

The web server form 430 includes other fields in other embodiments. For instance, in some embodiments, the web server form includes a description field that allows a user to describe the web server. For example, through the description field, the user can input self-describing information such as the date the web server was added, the content of the web pages provided by the web server, etc.

Figure 7:
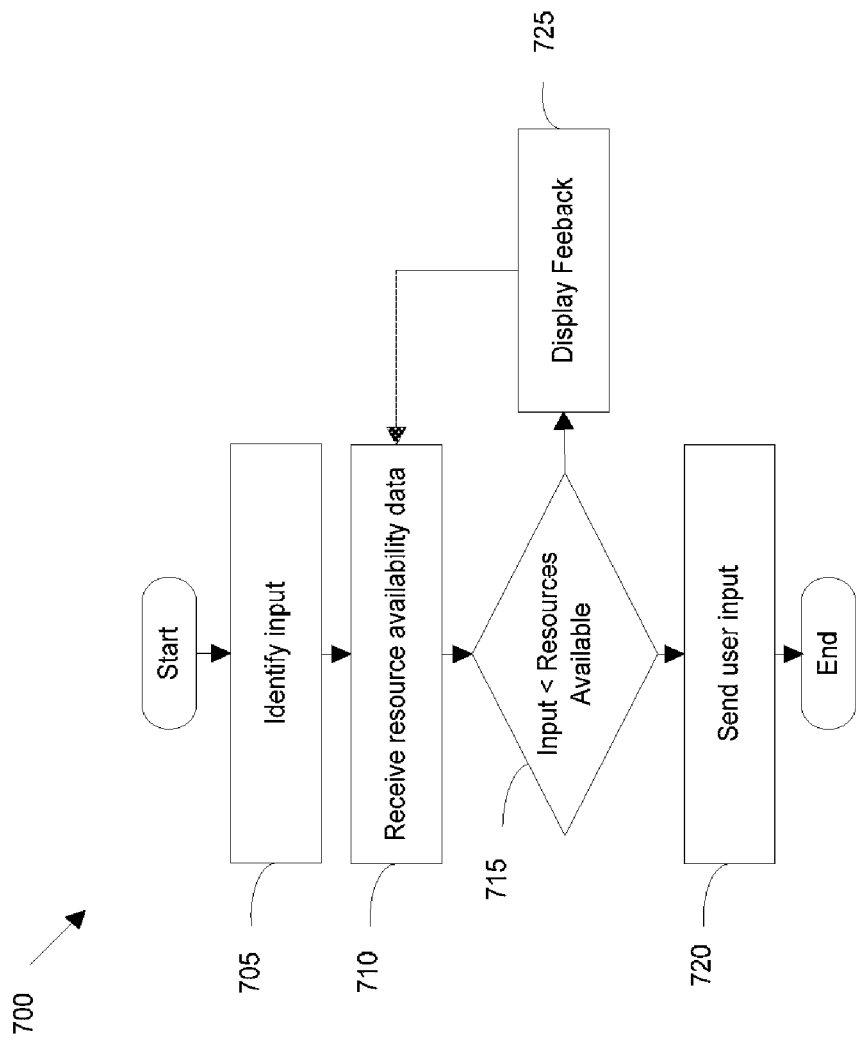
FIG. 7 illustrates an exemplary process that the multi-server panel performs to check whether an amount of a resource specified exceeds an acceptable amount.

In some embodiments, the multi-server control panel limits the entries that a user may make in the fields 405-425 in order to prevent the user from making inconsistent or illegal (i.e., unexecutable) choices. For instance, the front-end logic that implements the multi-server control panel might include one or more processes that limit the amount of resources (e.g., the amount of RAM or other physical resources, network resources, etc.) that a user might specify for his web server. FIG. 7 illustrates one example of such a process.

Specifically, this figure illustrates a process 700 that multi-server panel performs to check whether an amount of a resource (e.g., memory) specified by a user exceeds an acceptable amount (e.g., which may be based on the user's hosting plan, based on network characteristics, etc.). The process of some embodiments begins (at 705) when it identifies a user entry that specifies an amount requested for the server. After identifying the data process (at 710) receives resource availability data of the customer. For example, if the customer has signed up for a hosting plan that includes 20 gigabytes of storage space and has allocated half of it to one server, the resources availability data might indicate that the customer still has 10 gigabytes of storage space left. Next, the process (at 715) determines whether the amount requested is less that the available resource. If the amount request is less, then the process (at 720) commences processing or sends the user input to have it processed. However, if the amount requested is greater than the available resource, the process (at 725) provides the feedback to the user. In some embodiments, examples of different feedbacks that the multi-server control panel provides include: (1) displaying a message that the amount entered exceeds the amount available, (2) displaying a message that recommends a different hosting plan than one the user is currently under, and (3) displaying the entry or selection in a different color to specify its unavailability. Many other similar notifications are provided by other embodiments of the invention. Also, some embodiments provide the feedback after the user has entered all the specifications for the web server and selected a control to confirm or save the specification.

Figure 8:
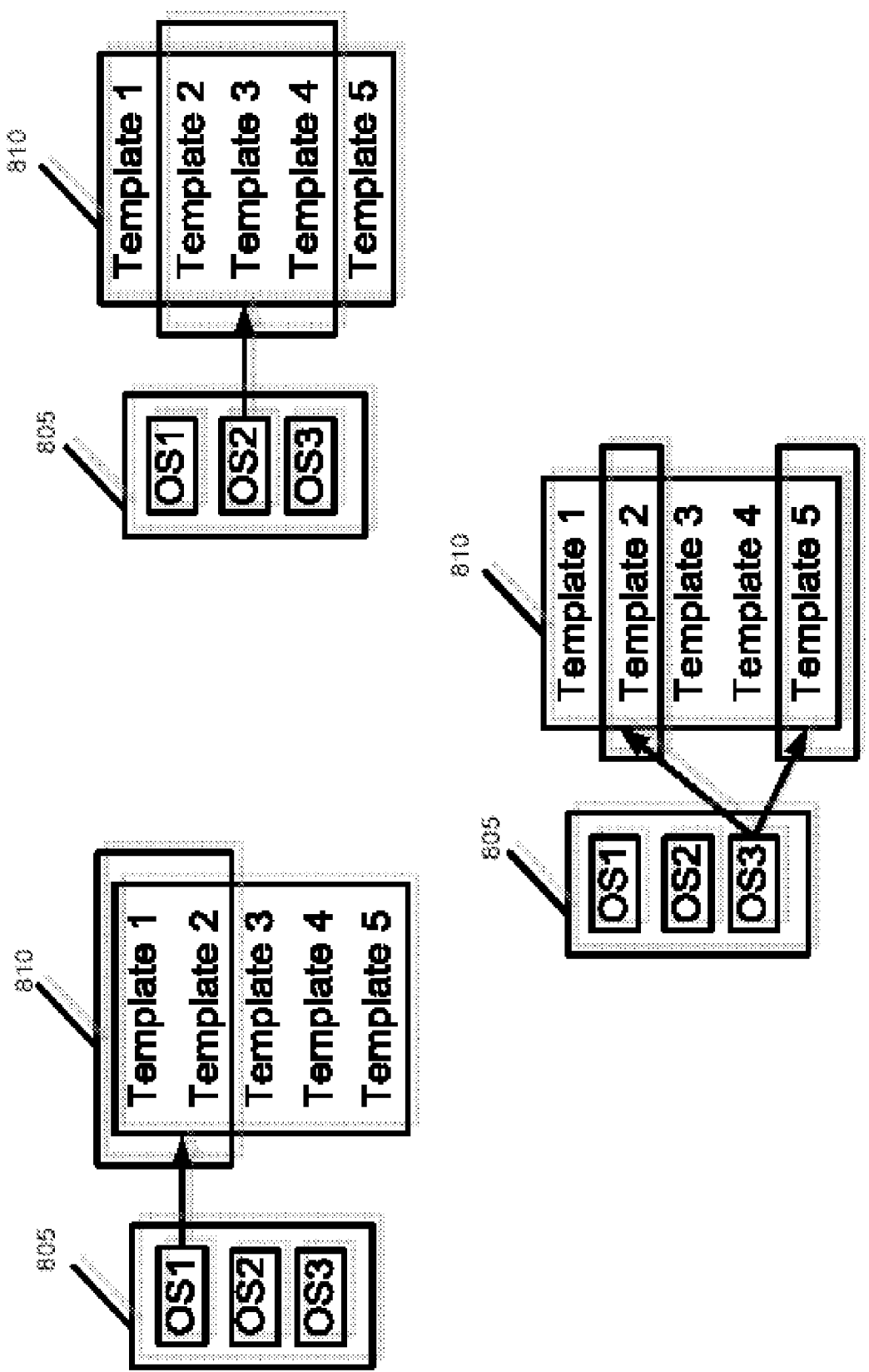
FIG. 8 illustrate an example of how the multi-server control panel might limit the entries that a user may make in order to prevent the user from making inconsistent or illegal choices.

FIG. 8 illustrate another example of how the multi-server control panel might limit the entries that a user may make in order to prevent the user from making inconsistent or illegal (i.e., unexecutable) choices. This example illustrates that the multi-server control panel might limit the selection of a template (e.g., web server template, database template) based on a user's specification of an operating system. For instance, if the user specifies "Windows XP Pro" through the OS field 415, the multi-server control panel might cause all the templates in the template field 420 to be grayed out, with the exception of the "IIS" and "Apace 2/PHP 4" web server templates.

FIG. 8 includes a list of operating systems 805 and templates 810. As shown, the selection of "OS1" from the list of operating systems 805 reduces the selectable templates in the list of templates 810 to only "Templates 1" and "Template 2". Inversely, the selection of "OS2" eliminates the selection of "Templates 1" and "Templates 2. The selection of "OS3" limits the selection of all templates except for one template provided for "OS1" and another template provided for "OS3".

Figure 9:
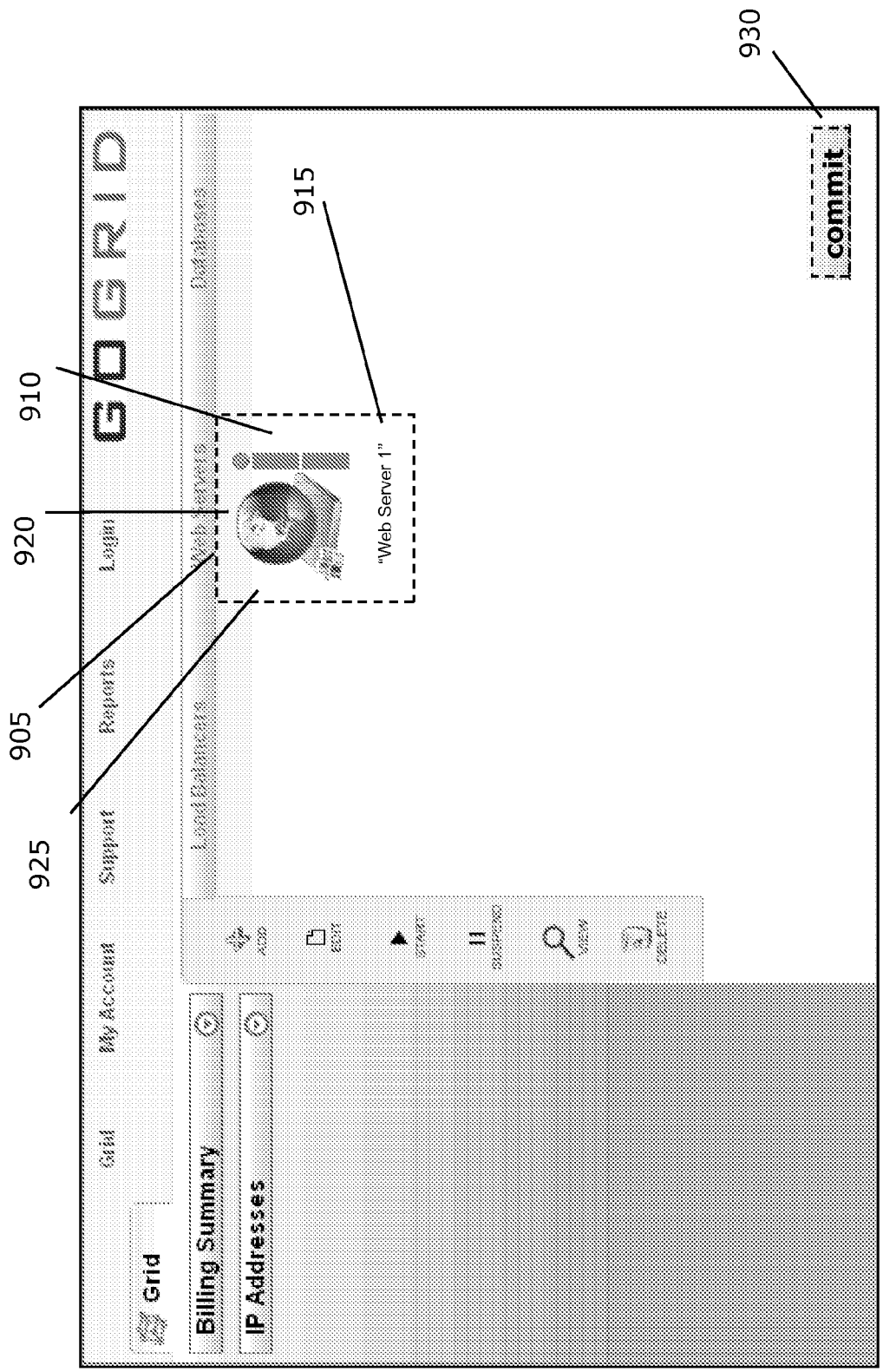
FIG. 9 illustrates an exemplary web server representation displayed in the display area of the multi-server control panel.

FIG. 9 illustrates the display area 225 of the multi-server control panel 200 after the user fills the web server form 430 and selects the save icon 435 on this form. The selection of the save icon 435 causes the front end logic to define the web server to add a graphical representation 905 of this web server to the web server tier that is displayed in the display area 225. Once a user has specified or modified a configuration for a server using the server form (e.g., the web server form) and selects the save icon, the scheduler identifies in real time a location in the hardware grid for the server and the deployment manager deploys the server in real time in the identified location (i.e., identified hardware node). Alternatively, other embodiments have a commit button 930 as illustrated in FIG. 9. Once the user has specified or modified one or more components of the configuration, the user can select the commit button 930 (e.g., can click on this button) to direct the scheduler to perform its mapping or remapping, and to direct the deployment manager to deploy the configuration or modify the deployment of the configuration.

In the example illustrated in FIG. 9, the web server representation 905 has a textual element 915 and a graphical element 925. The textual element 915 identifies the web server as "Web Server 1". The textual element 915 of some embodiments identifies the web server by a specified hostname. For instance, if the user specifies the hostname (e.g., "www.abc.com") through the name field 405 of the web server form 430, then the display area might display the specified name. The graphical element 925 includes a web server icon 920 and a resource meter 910. The web server icon is a graphical representation of the web server. The resource meter 910 is a meter that displays real-time usage of several resources such as CPU and memory. Specific examples of the resource meters will further be discussed below with respect to FIGS. 27A-27C.

2. Adding Database Server

Figure 10:
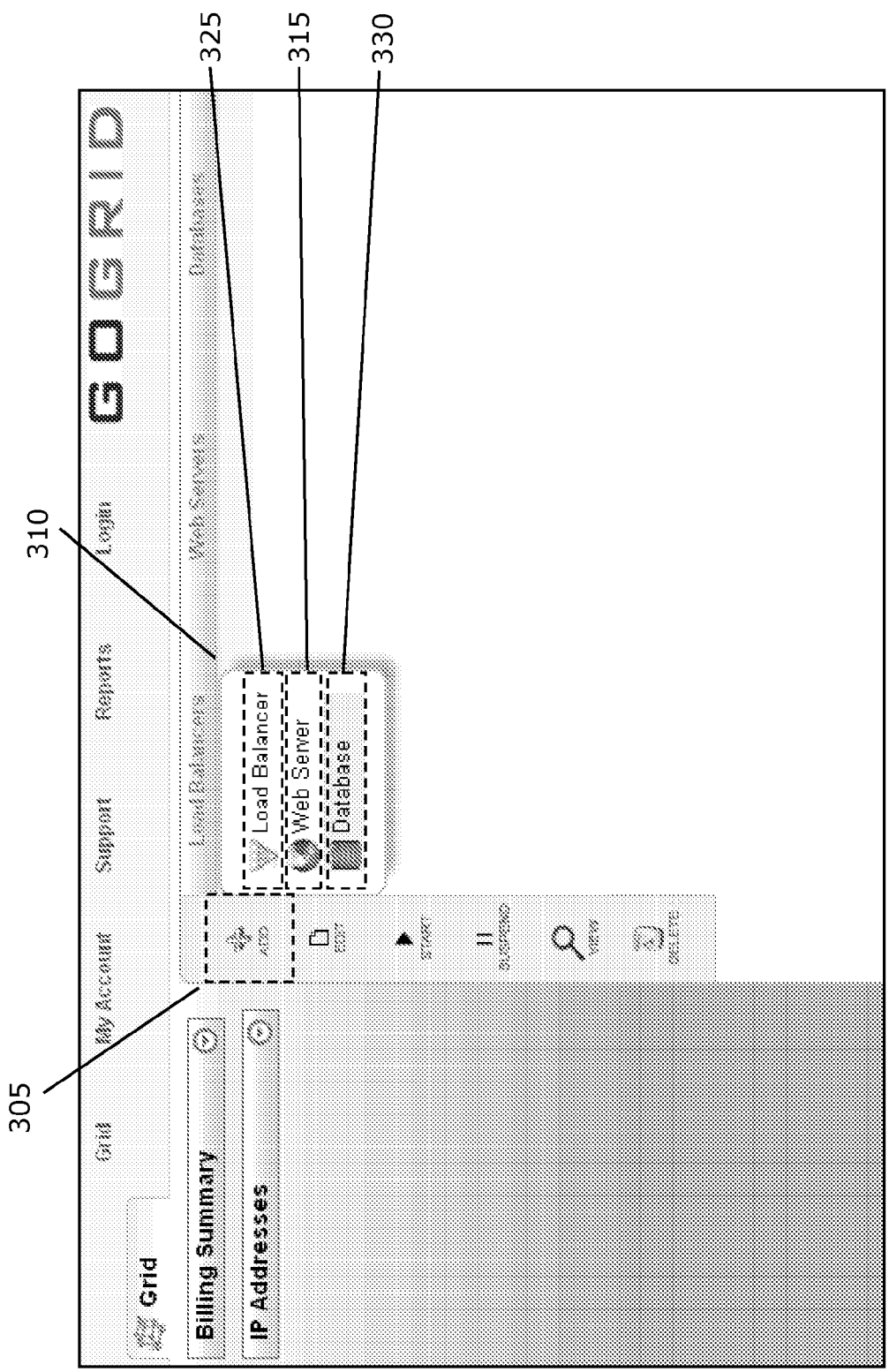
FIG. 10 illustrates a selection of the database icon that causes a database server form to be displayed.

FIGS. 10-13 present several illustrative examples regarding how a user can add a database server through the multi-server control panel 200. A user can add a database server by selecting (e.g., through a cursor click operation) the add button 230, and scrolling the server list 310 to select the database server icon as shown in FIG. 10.

Figure 11:
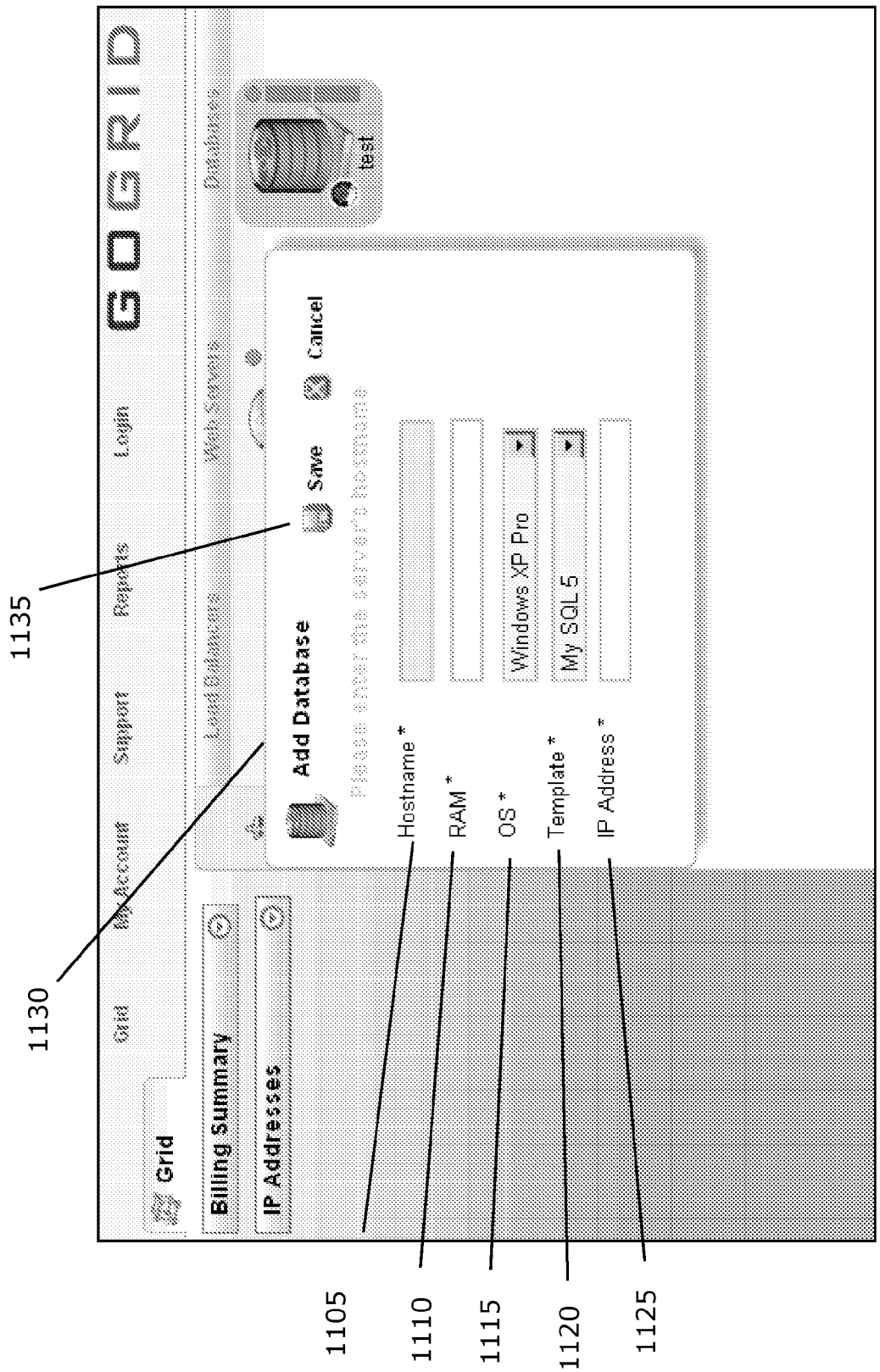
FIG. 11 illustrates an exemplary database server form defining a database server.

When the user selects the database server icon 330 in the server list 310 (e.g., by clicking on them or by scrolling to them and pressing the enter key), the user is presented with a database server form 1130, as illustrated in FIG. 11. This form allows the user to define a database server that will be added to the configuration. The database server form 1130 includes (1) a name field 1105 for specifying the name or site name, (2) memory field 1110 for specifying the amount of memory, (3) OS field 1115 for specifying the operations system, (4) address field 1125 for specifying the IP address, and a (5) database field 1120.

In some embodiments, the database server form 1130 also includes a description field that allows the user to describe the database server. The entries that can be specified by the user for the several of these fields are similar to the ones described above with respect to the web server form 430. Also, the multi-server control panel of some embodiments places the same restrictions on the user entries that can be inconsistent or illegal (i.e., unexecutable).

Figure 12:
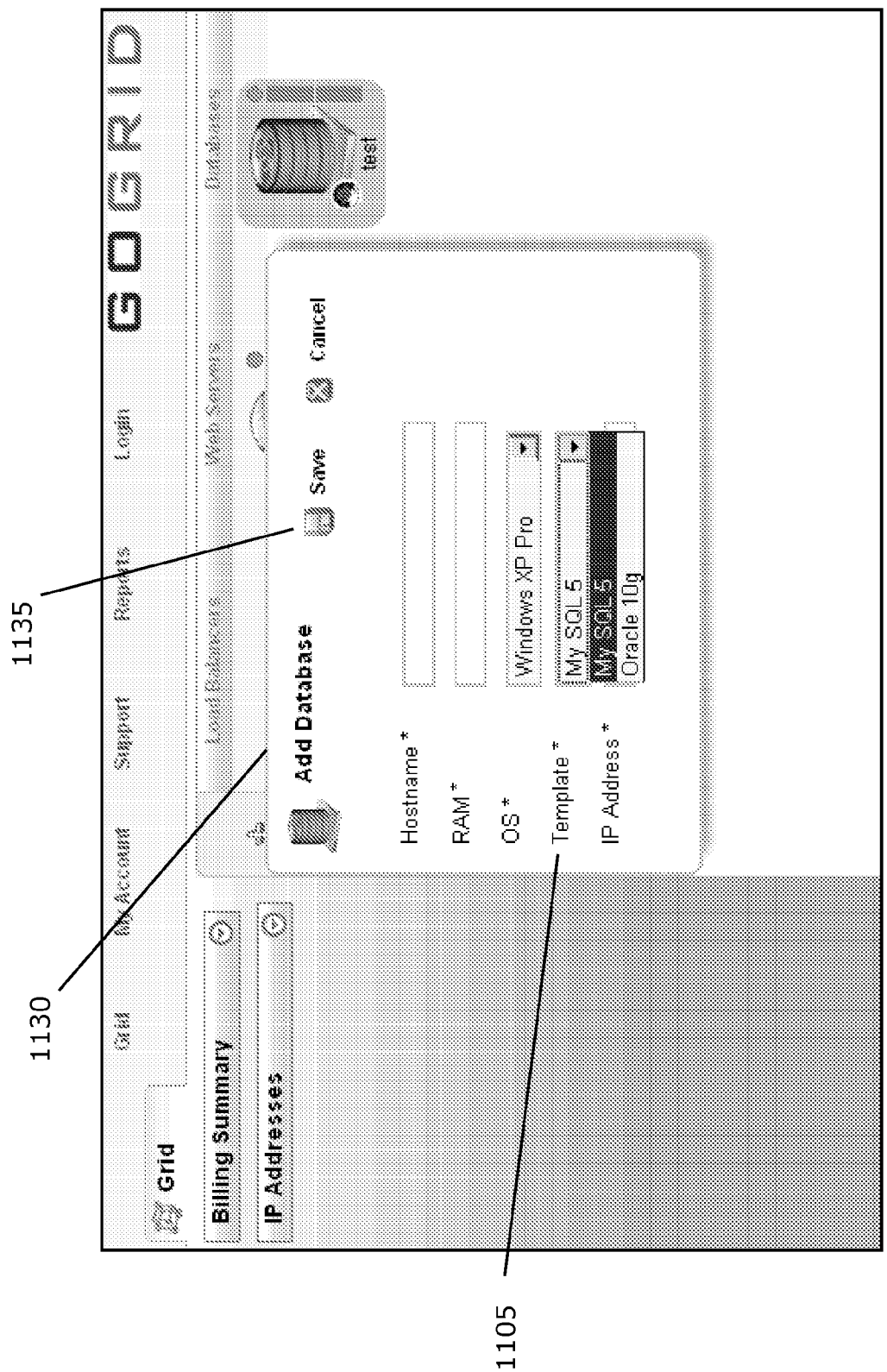
FIG. 12 illustrates a selection of the database field that causes several databases to be displayed.

The database field 1120 allows the user to specify the database for a database server. In some embodiments, the database field 1120 is implemented as a drop-down window that opens to provide a list of available databases that the user can choose from for the database server. FIG. 12 illustrates that when a user selects (e.g., mouse clicks) the database field 1120, several selectable databases are displayed such as "My SQL 5" and "Oracle 10 g". As the user scrolls the database field 1120, the selected database is highlighted. This is illustrated in FIG. 12 with the "My SQL 5" template highlighted, while the "Oracle 10 g" is not highlighted. The user can select any one of the databases in this list (e.g., by clicking on them or by scrolling to them and pressing the enter key).

Figure 13:
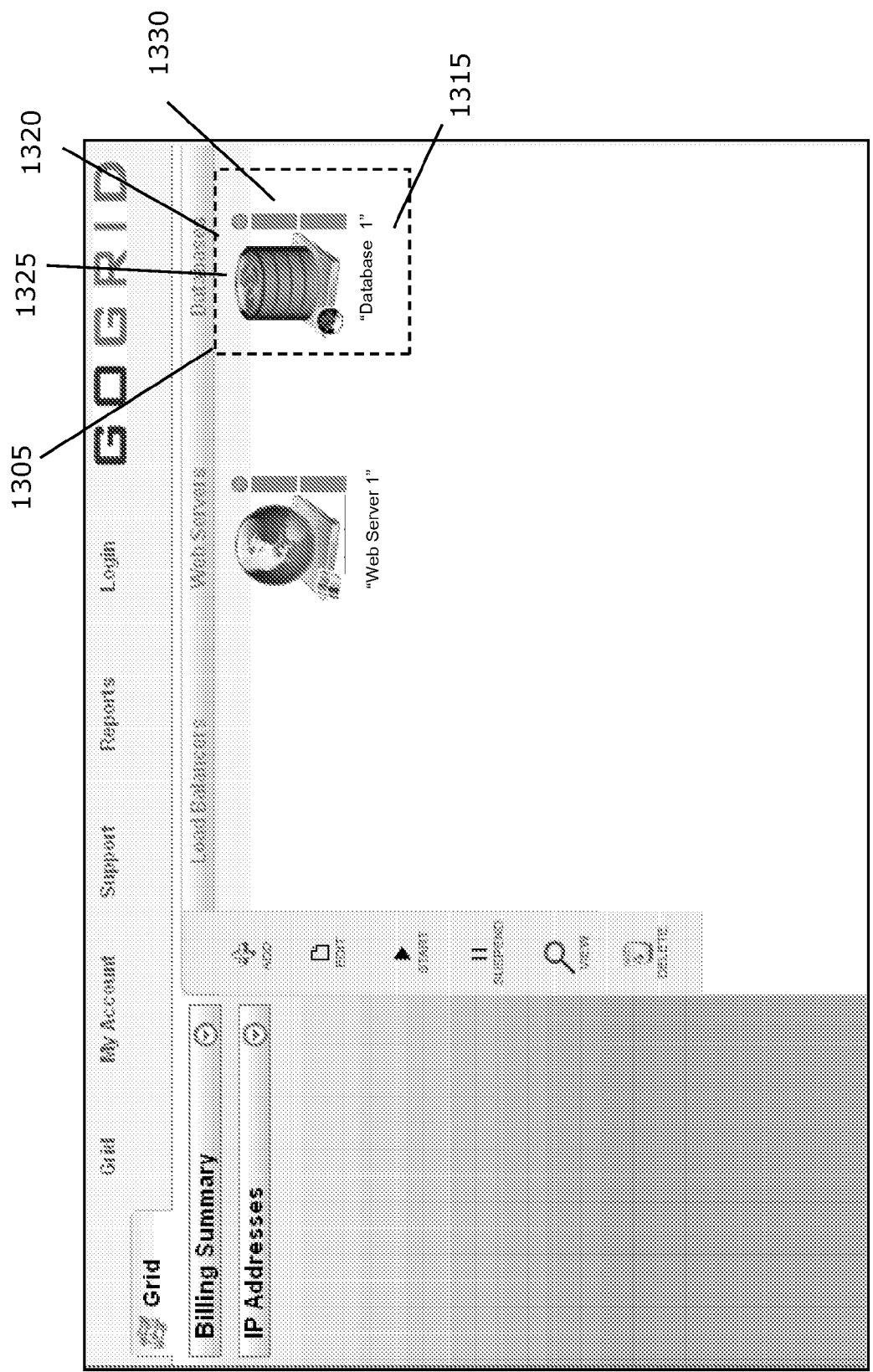
FIG. 13 illustrates an exemplary database server representation displayed in the display area of the multi-server control pane.

FIG. 13 illustrates the display area 225 of the multi-server control panel 200 after the user fills the database server form 1130 and selects the save icon 1135 on this form. The selection of the save icon 1135 causes the front end logic to define the database server to add a graphical representation 1305 of this server to the database server tier that is displayed in the display area 225. In some embodiments, once a user has specified or modified a configuration for a database server using the database server form and selects the save icon, the database server is scheduled and deployed to a hardware node. Alternatively, as described above, some embodiments require a user to submit a commit command (e.g., select a commit button 930) to cause the hosting system to deploy one or more components or to modify one or more parameters of previously deployed components.

Like the web server representation 905, the database server representation 1305 has a textual element 1315 and a graphical element 1325. The textual element 1315 identifies the database server as "Database 1". The textual element 1315 of some embodiments identifies the database server by a specified name. For instance, if the user specifies the hostname (e.g., "www.abc.com") through the name field 405 of the database server form 430, then the display area might display the specified hostname. The graphical element 1325 includes a database server icon 1320 and a resource meter 1330. The database server icon is a graphical representation of the database server. The resource meter 1330 is a meter that displays real-time usage of several resources such as CPU and memory. Specific examples of the resource meter 1330 will further be discussed below with respect to FIGS. 27A-27C.

3. Adding Load Balancer

Figure 14:
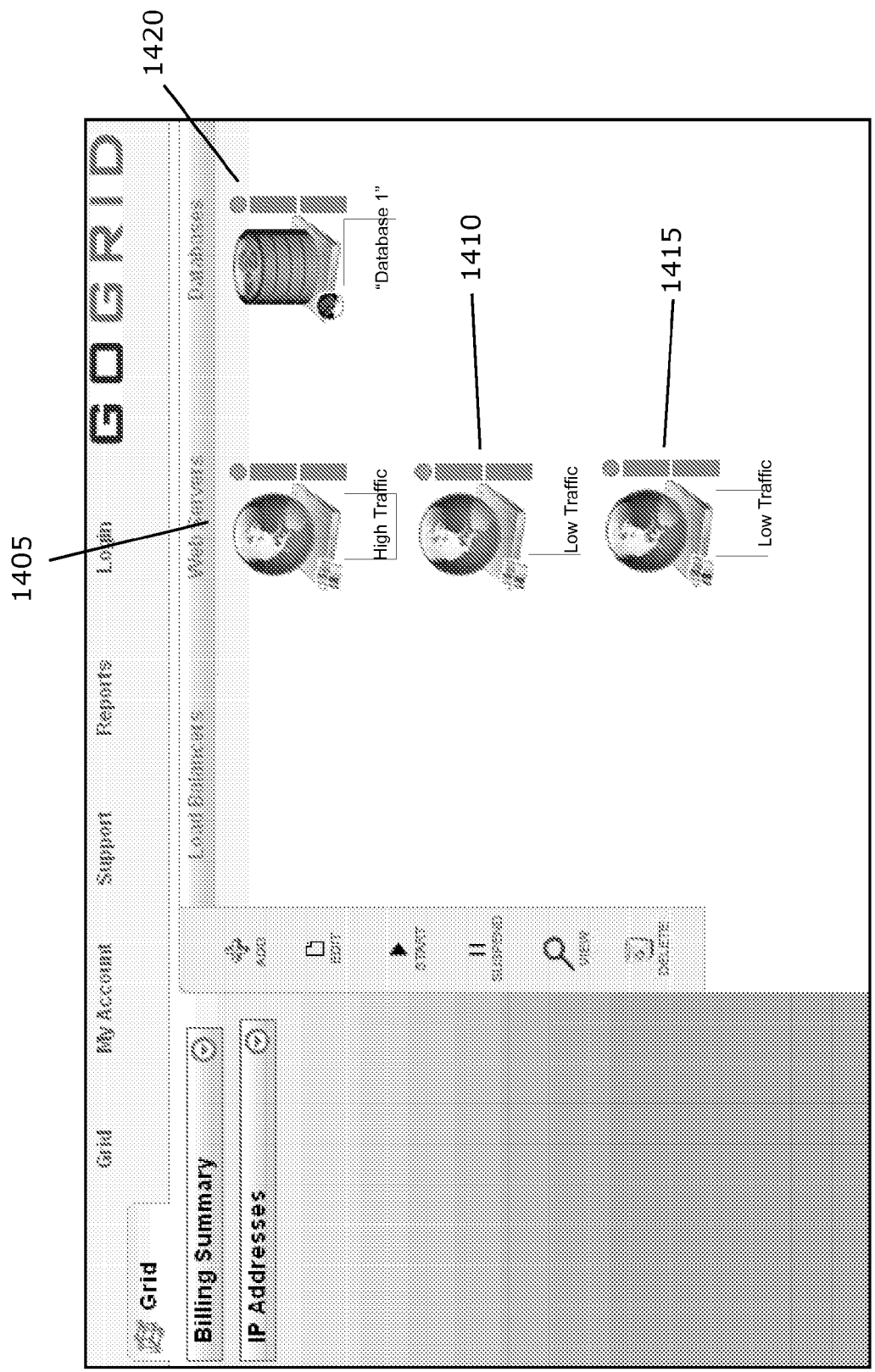
FIG. 14 provides an illustrative example of when a user might add a load balancer to a server configuration.

FIG. 14 provides an illustrative example of when a user might add a load balancer to a server configuration. As illustrated, the display area 225 of the multi-server control panel 225 displays a first web server 1405 representation 1405, a second web server 1410 representation, and third web server representation 1415, and a database server representation 1420.

In the example illustrated in FIG. 14, the first web server representation 1405 is a representation of a web server of the server configuration that is overloaded because of high network traffic. This is illustrated as the textual element of the first web server representation 1405 indicates "High Traffic". The second and third web server representations (1410-1415) are representations of web server that are being added to the configuration to support the first web server. Unlike the first web server representation 1405, the textual elements of the second and third web server representations (1410-1415) indicate "Low Traffic". Also, the database server representation 1420 is a representation of a database in the configuration that provides data to the web servers.

Figure 15:
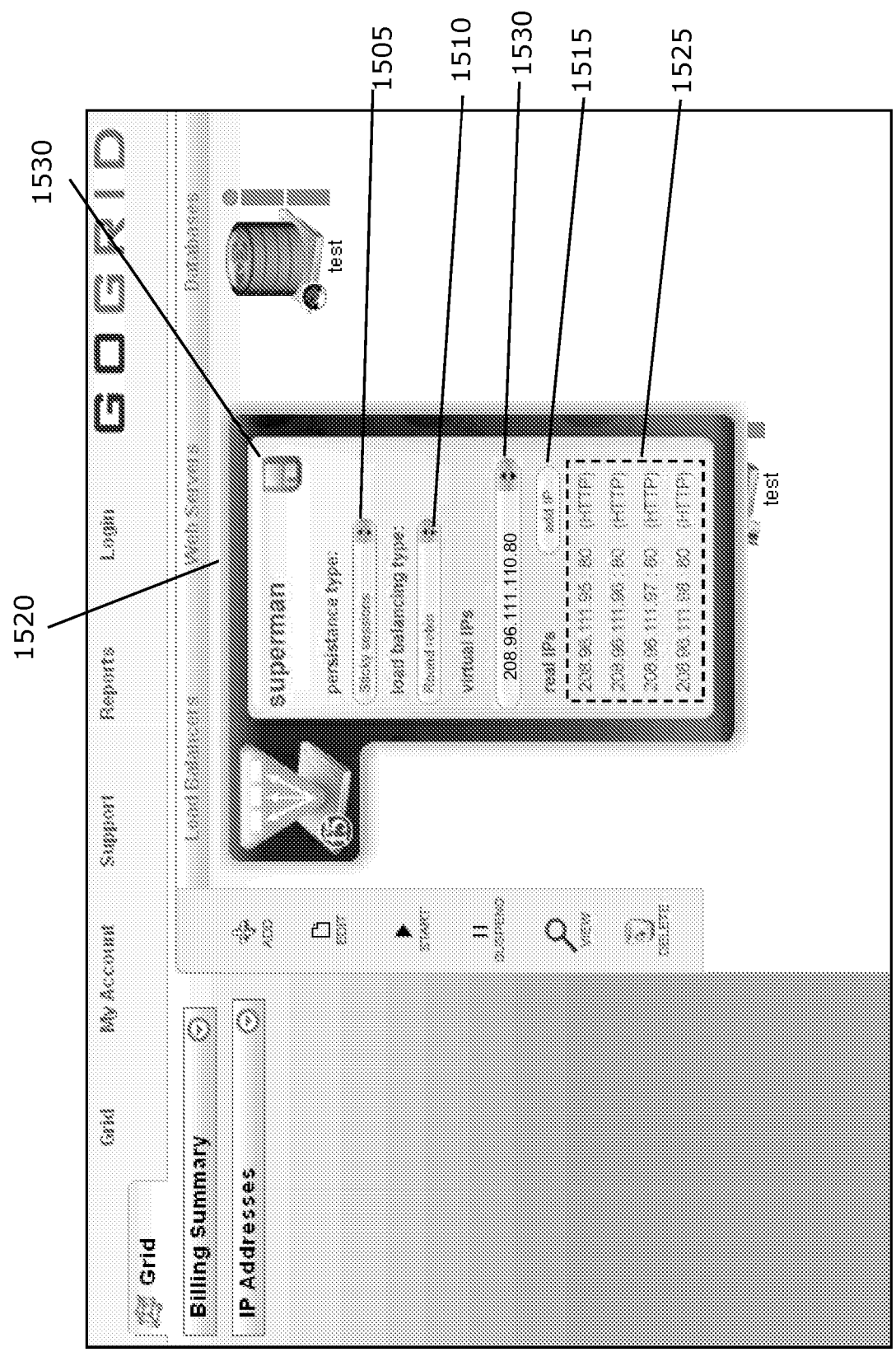
FIG. 15 illustrates an exemplary load balancer form defining a load balancer.
Figure 16:
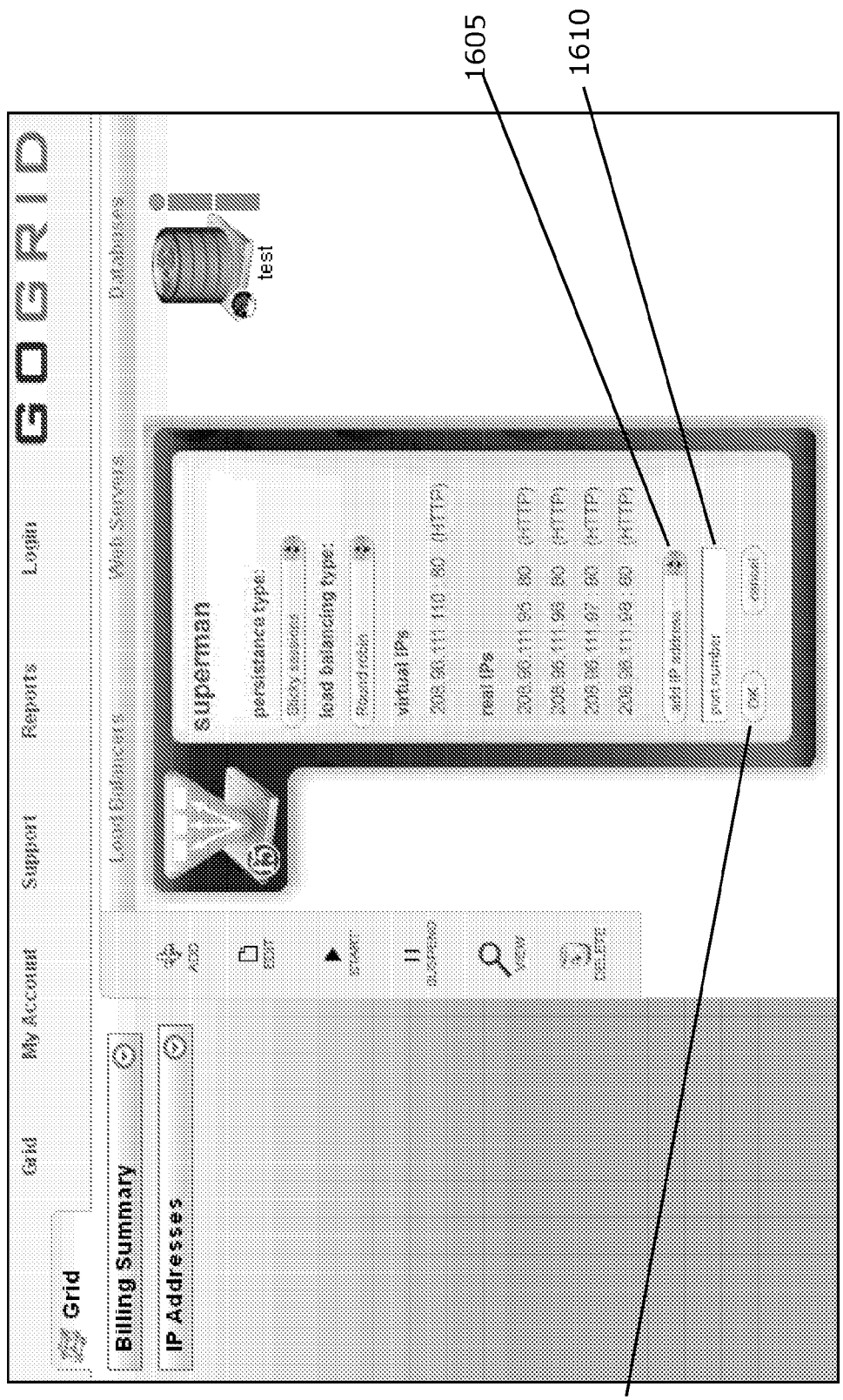
FIG. 16 illustrates the load balancer form after a user has selected a add IP address button.

FIGS. 15-16 present several illustrative examples regarding how a user can add a load balancer through the multi-server control panel 200. A user can add a load balancer by selecting (e.g., through a cursor click operation) the add button 230, and scrolling the server list 310 to select the load balancer icon as shown in FIG. 3. The load balancer added to the server configuration directs network traffic (e.g., incoming client requests) across several servers in the configuration to lower latency and reduce downtime. The load balancer added through the multi-server control panel can be a software based or hardware based load balancer. A user can add a load balancer to the server configuration by selecting (e.g., through a cursor click operation) the add button 230 as shown on FIG. 3 and selecting the load balancer icon 325 in the server list 310.

When the user selects the load balancer icon 325 in the server list 310 (e.g., by clicking on them or by scrolling to them and pressing the enter key), the user is presented with a load balancer form 1520, as illustrated in FIG. 15. This form allows the user to define the load balancer that will be added to the configuration. The load balancer form 1520 includes a persistence field 1505, a method field 1510, a virtual IP field 1530, a list 1525 of real IP addresses, and an "add real IP" button 1515.

The persistence field 1505 allows the users to specify a type of persistence for the load balancer. In some embodiments, the type of persistence specified for a load balancer determines a persistence of a session between a client and a server. For example, when a client application establishes a session with a particular server from a cluster of servers, the "sticky sessions" persistence type can be selected in persistence field 1505 to provide subsequent requests from the client application to be directed to the particular server, rather than other servers from the cluster. In some embodiments, the persistence field 1505 is implemented as a drop-down list that opens to provide a list of available persistence types that the user can choose from for the load balancer. In some embodiments, the list of available persistence type includes "sticky session" persistence and cookie persistence. In the example illustrated in FIG. 15, the persistence field 1505 displays "sticky sessions" as the selected persistence type for the load balancer.

The method field 1510 allows the users to specify a method of load balancing for the load balancer. The load balancing method determines the process in which the load balancer directs the network traffic across several servers (e.g., IP addresses). Several well-known methods include (1) round robin, which selects the servers based on rotation, and (2) least utilized network that selects the servers with least amount of connections. In the example illustrated in FIG. 15, the load balancing method list 1510 displays "round robin" as the selected load balancing method.

The virtual IP field 1530 allows the user to specify a virtual IP address (e.g., virtual IP address/port number pairs) for the load balancer. A virtual IP address is an incoming or public IP address that a load balancer associates with one or more real IP addresses, which can also be incoming or public IP addresses in some embodiments. When hosting servers for a user with the virtual IP address, the load balancer(s) of the hosting system receive requests to the virtual IP address and map these requests to one or more "real" IP addresses (e.g., IP address/port number pairs) of the servers in the hosting system. In some embodiments, the virtual IP field 1530 is implemented as a drop-down menu that opens to provide a list of IP addresses that are available to a user for choosing as a virtual IP address for a load balancer. FIG. 15 illustrates that the virtual IP address specified by the user is "208.96.111.110:80".

In some embodiments, the available IP addresses (for use as virtual or real) are based on a specified hosting plan. For instance, if a user signs up for a particular hosting plan, the multi-server control panel might display ten IP addresses for the servers in the configuration in a network list 1715, as further described below by reference to FIG. 17. However, if the user signs up for a different hosting plan, the multi-server control panel might display twenty IP addresses for the servers. In these embodiments, the user can then use the provided IP addresses as virtual IP addresses or real IP addresses.

Figure 17:
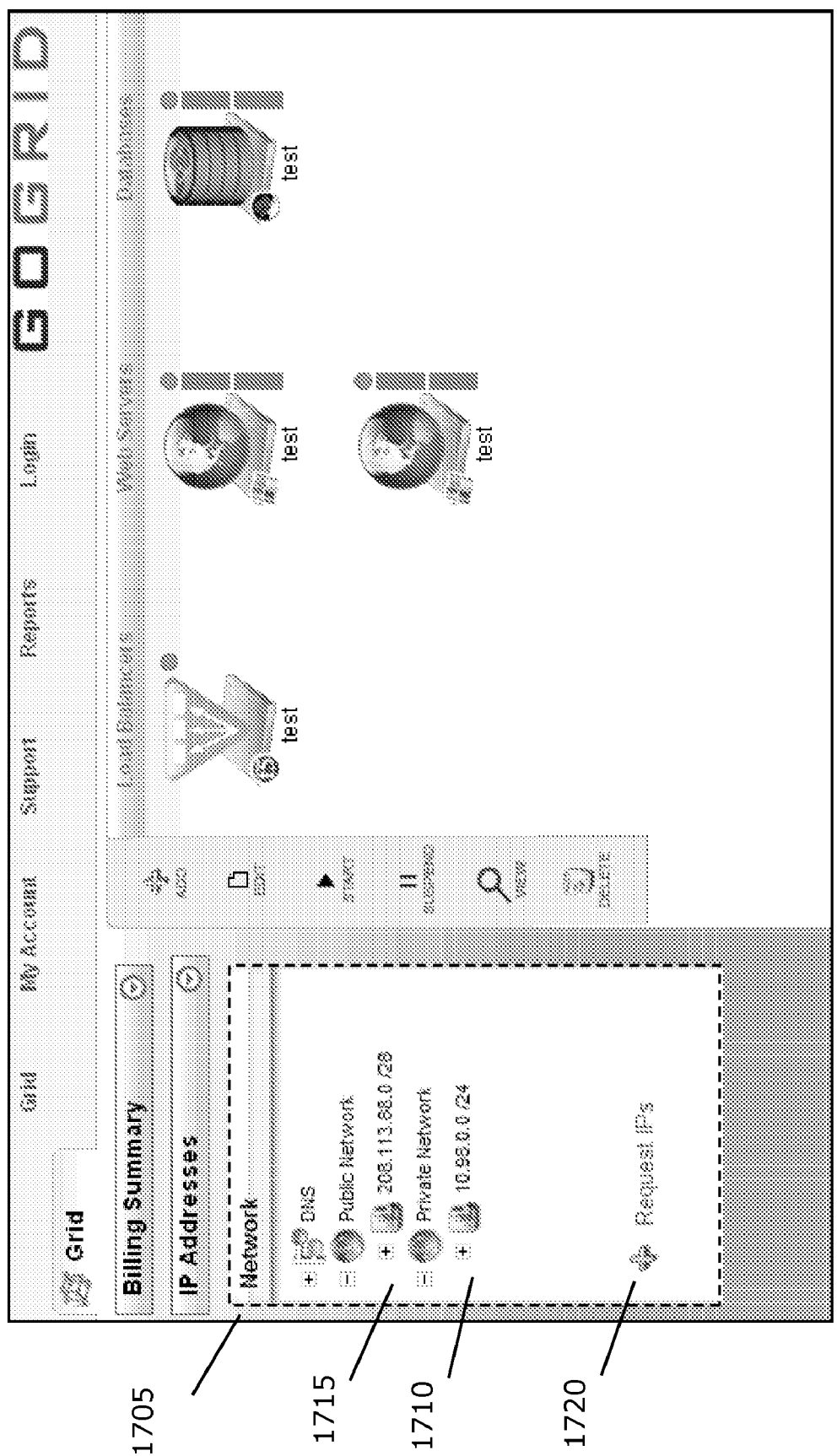
FIG. 17 illustrates an exemplary drop-down window that provides an expandable list of real IP addresses and an expandable list of virtual IP addresses.

In some embodiment, the multi-server control panel provides one or more controls to add IP addresses. This is illustrated in FIG. 17 as the multi-server control panel includes a request IP address control 1720 for requesting additional IP addresses. When the user selects the "request IP" control 1720 a request is sent for processing. Once the request is processed automatically by the front-end logic or processed manually by an administrator, a set of IP addresses is added to an expandable public network list that lists the IP addresses.

As mentioned above, the real IPs are IPs that can be associated with a virtual IP address of a load balancer is used, or can be directly associated with one or more servers (e.g., web servers, application servers, database servers, etc.). In other words, each real IP address can be associated with a non-load balancing server in the server configuration of the user, or with a virtual IP address of a load balancer.

In the form 1520, the list of real IPs provides one or more IPs that are associated with the particular virtual IP that is displayed in the virtual IP field 1530. The "add IP" button allows a user to direct a load balancer to add other real IPs for load balancing. Specifically, when the user selects the add real IP button 1515 in the load balancer form 1520, the user is dynamically presented with other UI elements to specify an real IP address and port number for the load balancer. FIG. 16 illustrates the load balancer form 1520 after the user has selected the address button 1515. In the example illustrated in FIG. 16, the selection of address button 1515 dynamically adds other UI elements to the load balancer form 1520. For example, the selection of address button 1515 has added a real IP list 1605 and port number field 1610.

In some embodiments, the IP addresses included in the IP list 1605 is based on IP addresses not yet assigned to any other load balancer but are assigned to other non-load balancing servers. For example, if three web servers are provisioned, the list might includes the real IP addresses for each of those provisioned servers. The port number field 1610 receives a port number for the IP address. This is because a server can have different applications running on it (e.g., mail server, web server) that utilize one or more ports. For example, when the server includes a web server and a mail server, the user can specify the port number for the web server to ensure that the web server is load balanced, and not the mail server.

In some embodiments, the multi-server control panel not only can display real IP addresses in the load balancer form 1520, but it can also (1) display these IP addresses along with their corresponding non-load balancing servers and (2) display a list of IP addresses in a drop-down window that appears to the left of the display area. FIG. 17 illustrates an example of such a drop-down window 1705. As shown in this figure, this window provides an expandable list 1715 of public IP addresses available to the user. These public IP addresses in some embodiments can be used as virtual or real IP addresses. This window also displays an expandable list 1710 of private IP addresses, which might be used in some embodiments to shield servers (e.g., database servers) that do not need to be directly accessed by the public from direct contact with users outside of the hosting system.

The load balancing form 325 includes other fields in other embodiments. For instance, in some embodiments, the load balancer form 325 includes a description field that allows the user to describe the load balancer.

In some embodiments, the multi-server control panel prevents the user from making inconsistent or illegal (i.e., unexecutable) entries in the load balancer form 1520. Specifically, multi-server control panel ensures that the IP address/port pairs (e.g., virtual IP, real IP) specified by a user is not a duplicate IP address/port pairs (e.g., an IP address/port pairs that is being load balanced elsewhere by a different load balancer). For example, if a user specifies a real IP address/port pairs that is a duplicate, the multi-server control panel of some embodiments displays an error message and/or prevents the user from entering the specification for the load balancer.

Figure 18:
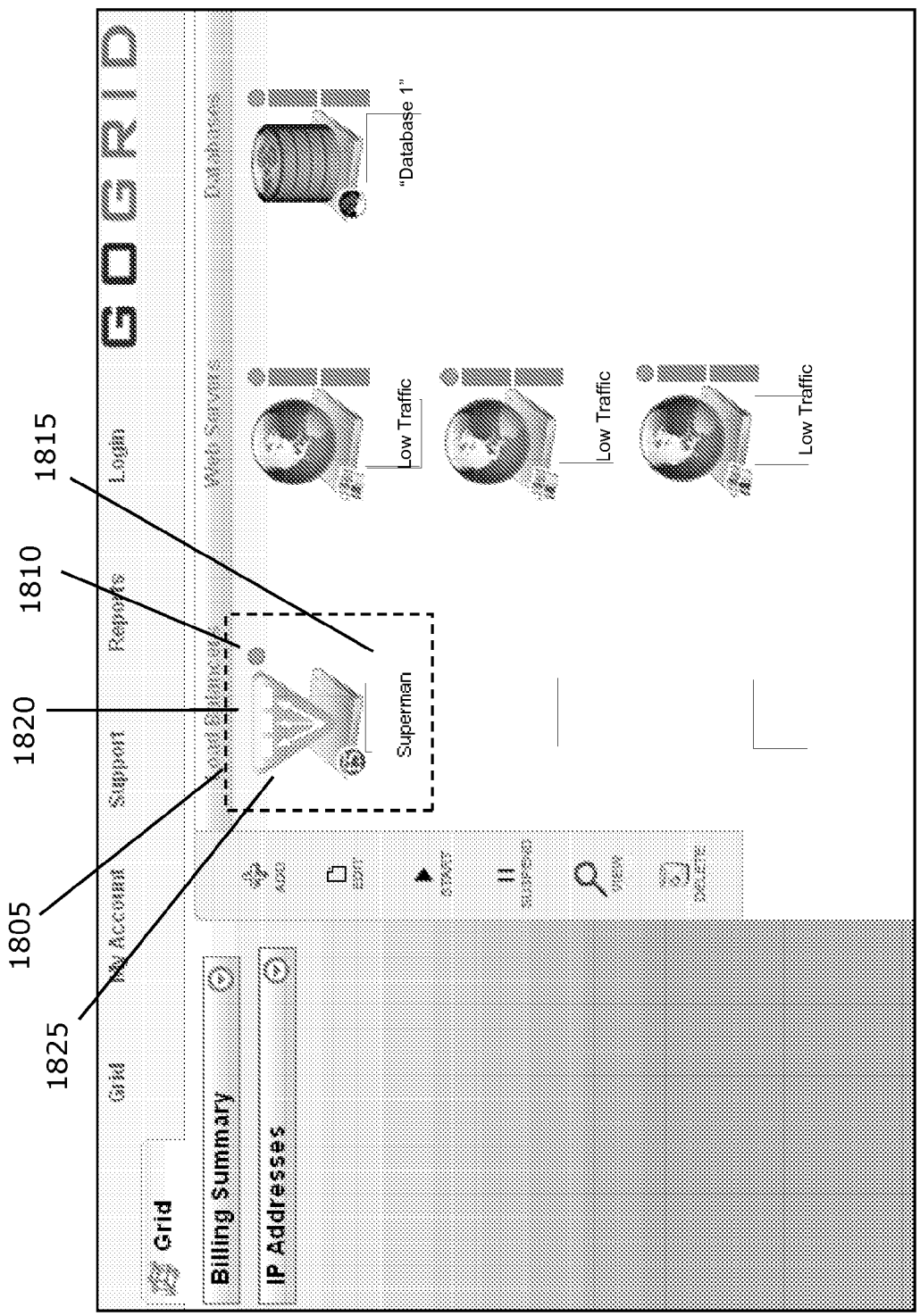
FIG. 18 illustrates an exemplary load balancing server representation displayed in the display area of the multi-server control panel.

FIG. 18 illustrates the display area 225 of the multi-server control panel 200 after the user fills the load balancer form 1520 and selects a save button 1530 on this form. The selection of the save button 1530 causes the front end logic to define the load balancer to add a graphical representation 1805 of this server to the load balancer tier that is displayed in the display area 225. In some embodiments, once a user modifies a configuration for a load balancer using the load balancing form 1520 and selects the save icon, the load balancer is scheduled and deployed to a loading balancing server node. Alternatively, as described above, some embodiments require a user to submit a commit command (e.g., select a commit button 930) to cause the hosting system to deploy one or more components or to modify one or more parameters of previously deployed components.

The display area 225 displays a load balancer representation 1805. Like the web server representation 905 and database server representation 1305, the load balancer representation 1805 has a textual element 1815 and a graphical element 1825. The textual element 1815 identifies the load balancer as "Superman". The graphical element 1825 includes a load balancer icon 1820 and a status identifier 1810. The load balancer icon is a graphical representation of the load balancer. The status identifier indicates 1810 whether the load balancer running. In some embodiments, the color indicator indicates whether the load balancer is running efficiently. Specific examples of the status identifier are described below with respect to FIGS. 27A-27C.

4. Server Controls

As mentioned above, the multi-server control panel 200 of some embodiments displays a set of controls 205 concurrently with the server graphical representations that are illustrated in the display area 225. In some embodiments, the set of controls is always the same. Other embodiments, however, dynamically modify the controls in the set of controls based on what is selected in the display area.

Figure 19:
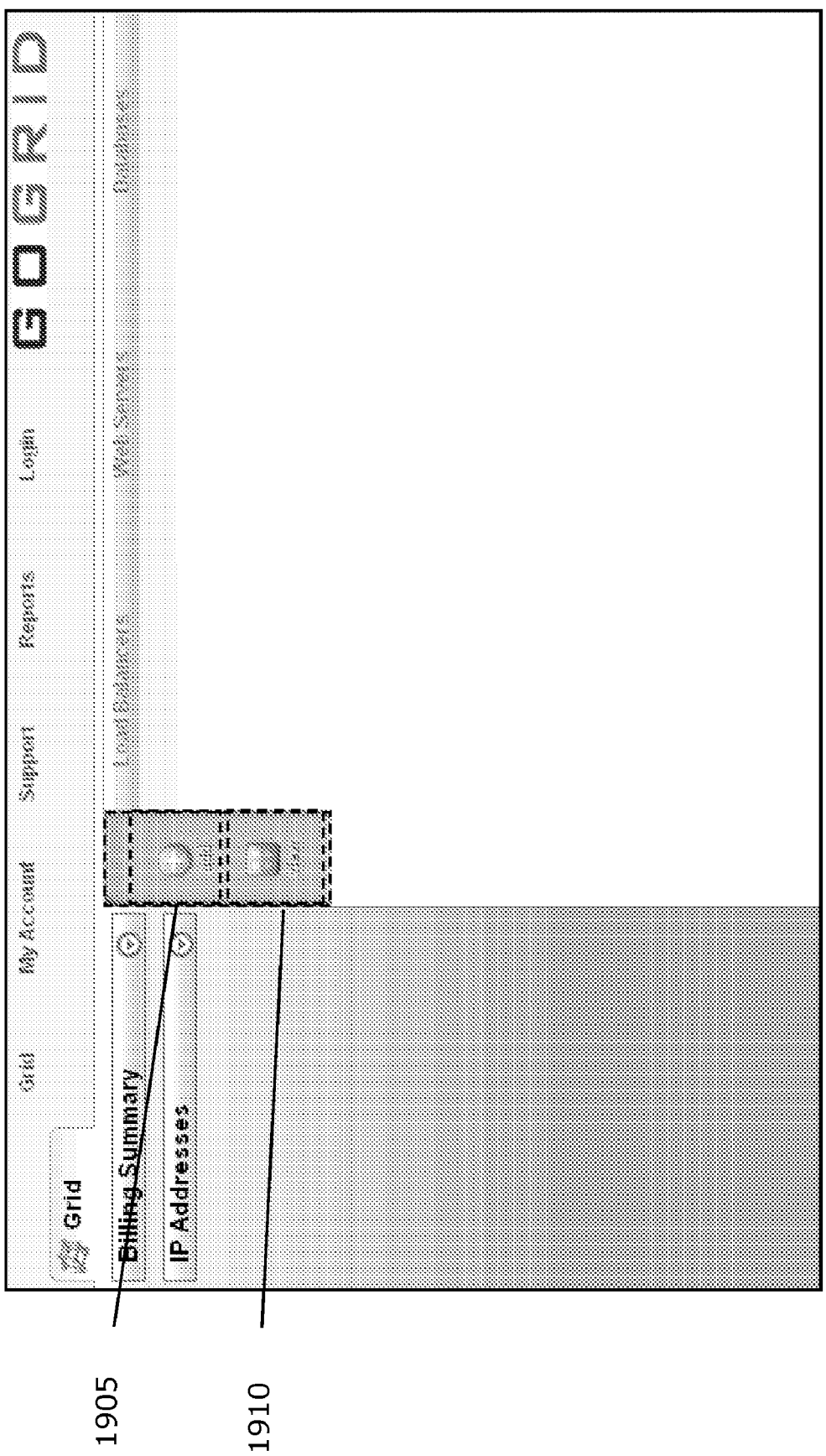
FIG. 19 illustrates an exemplary set of controls provided by the multi-server control when no server representation is selected in the display area.
Figure 20:
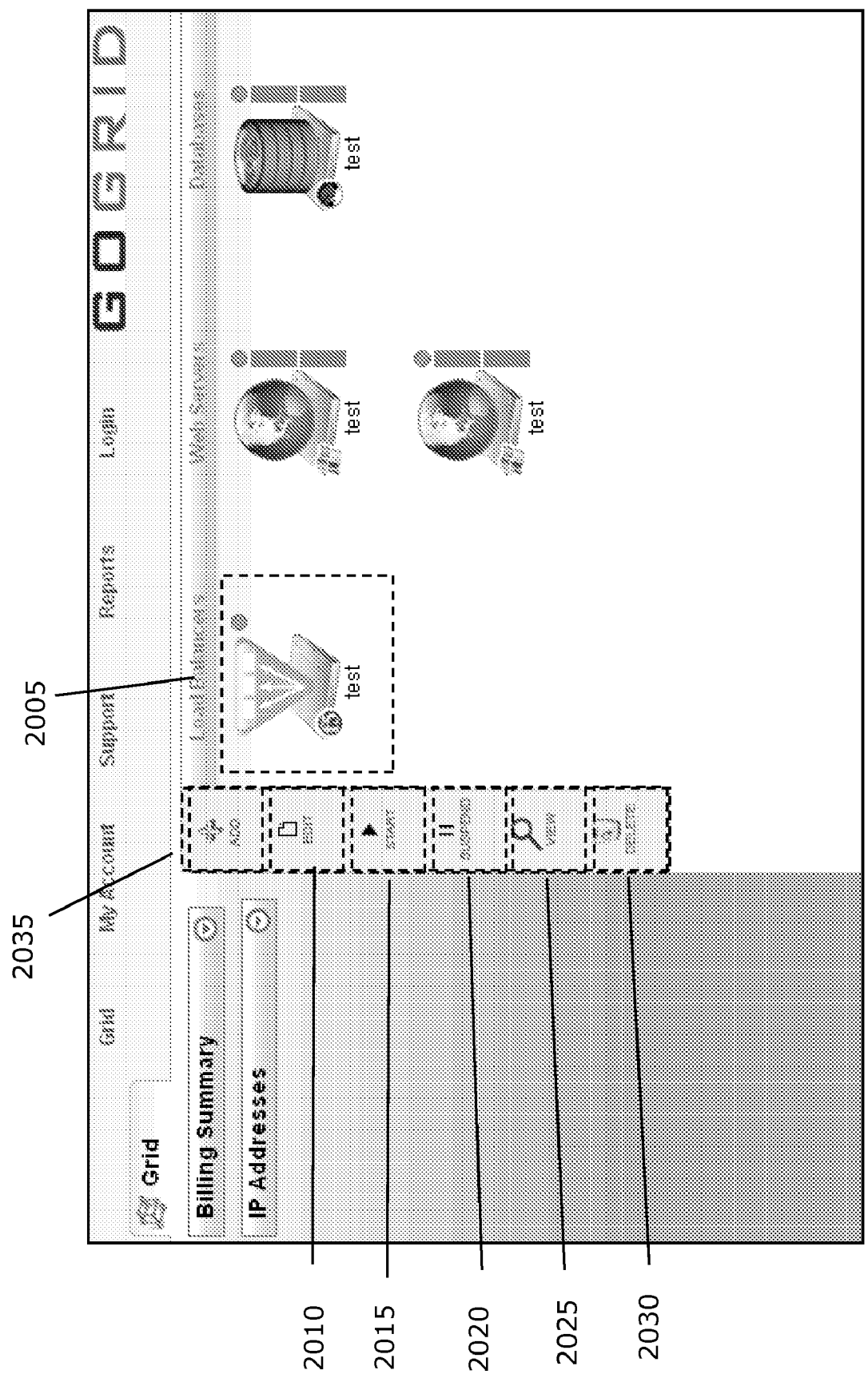
FIG. 20 illustrates an exemplary set of controls provided by the multi-server control when a load balancer representation is selected in the display area.
Figure 21:
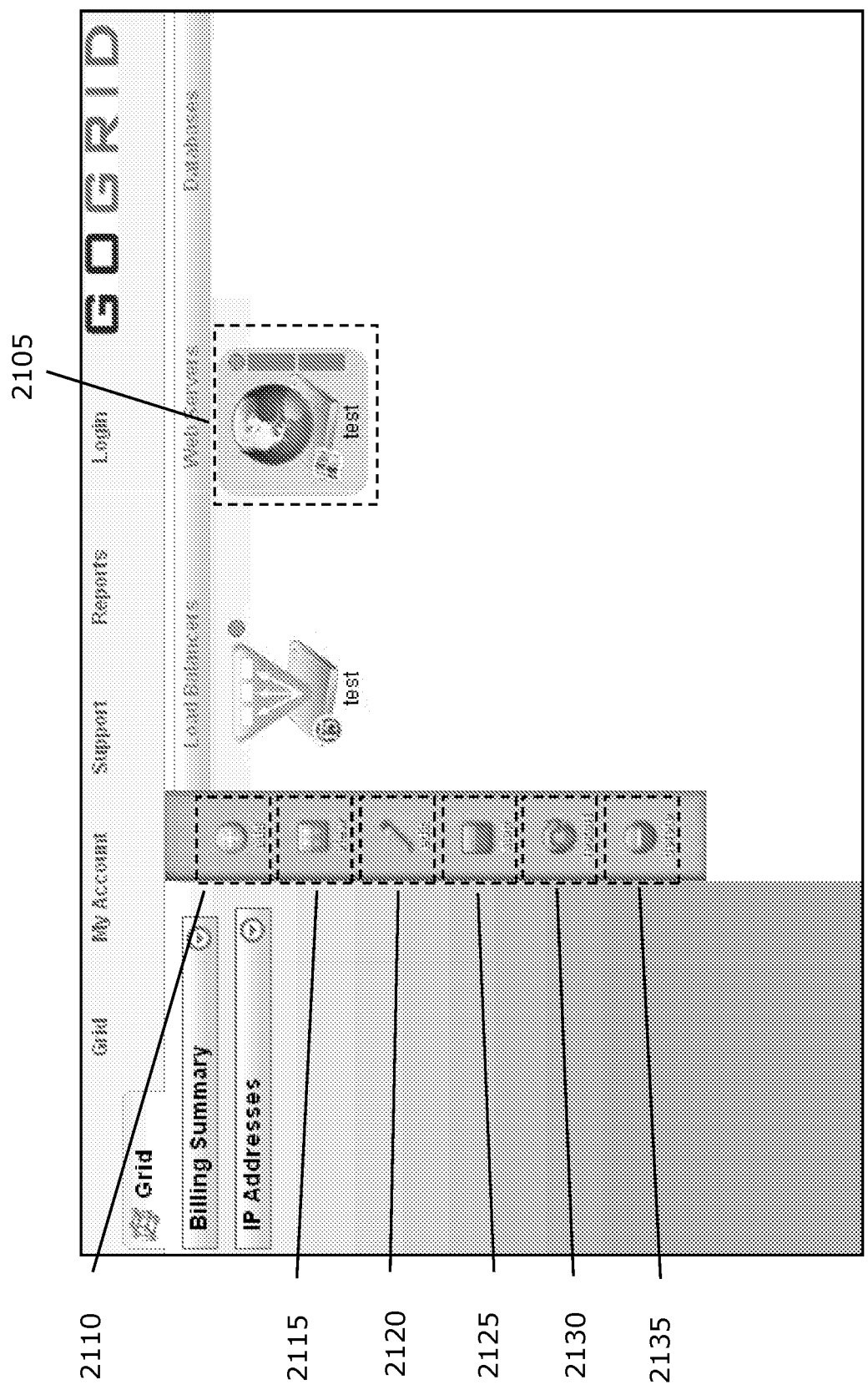
FIG. 21 illustrates an exemplary set of controls provided by the multi-server control when a web server representation is selected in the display area.

FIGS. 19-21 present several illustrative examples regarding the dynamic set of controls 205. FIG. 19 illustrates the set of controls provided by the multi-server control panel when no representation is selected. As illustrated, when no representation is selected, the multi-server of control panel of some embodiments provides only the add button 1905 and the view button 1910.

FIG. 20 illustrates the set of controls 205 provided by the multi-server control panel after the user has selected a load balancer representation from the display area. Specifically, in this example, the selection of the load balancer 2005 causes the multi-server control panel to provide the following controls in the set of controls: (1) the add button 2035, (2) the edit button 2010, (3) the start button 2015, (4) the suspend button 2020, (5) the view button 2025, and the (6) delete button 2030.

FIG. 21 illustrates the set of controls 205 provided by the multi-server control panel after the user has selected a web server representation from the display area. Specifically, in this example, the selection of the web server 2105 causes the multi-server control panel to provide the following controls in the set of controls: (1) the add button 2110, (2) the edit button 2120, (3) the restart button 2130, (4) the view button 2115, and the (5) delete button 2135. In this example, the multi-server control panel does not provide the suspend button when a web server is selected.

Various different controls in the set of controls will now be described. These controls can be part of a static set of controls for all stages of the configurations and all selected types of servers, or they can be part of different dynamic sets of controls that are provided for different stage of the configuration and/or different types of servers. These various controls will be described by reference to FIGS. 19-21 as well as FIGS. 22-26, which provide several other illustrative examples regarding the set controls.

Figure 22A:
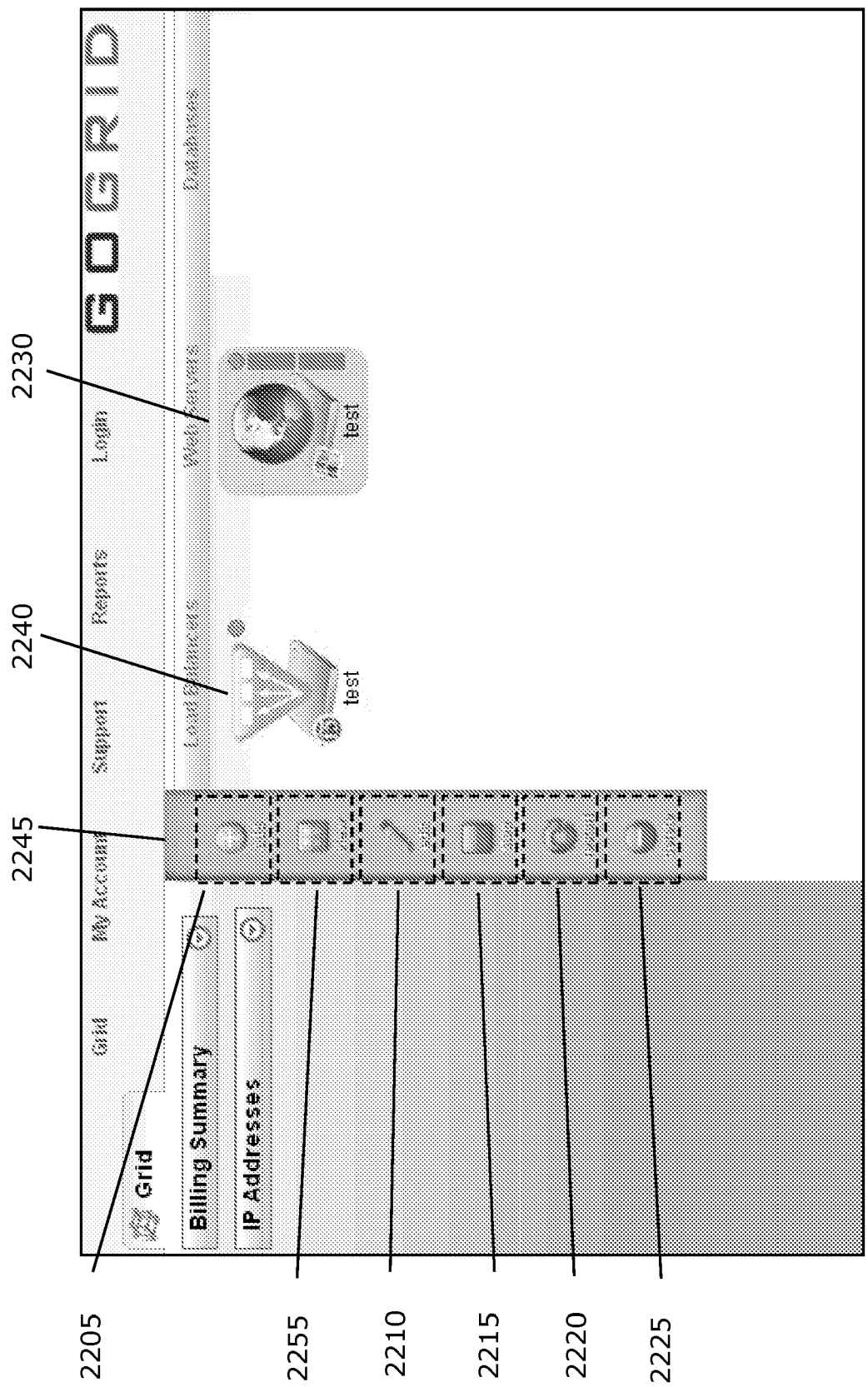
FIG. 22A illustrates an exemplary set of controls provided by the multi-server control panel.

As described above by reference to FIG. 3, the add button 2245 is for opening up the server list 310 that has selectable icons for the load balancer, web server, and database server. The edit button 2210 allows a user to open up a server form for editing one or more parameters of the server (e.g., a load balancer, a web server, database server, etc.) in the server configuration. When the user selects a server representation in the display area 225, the user can select the edit button 2210, as illustrated in FIG. 22A.

Figure 23:
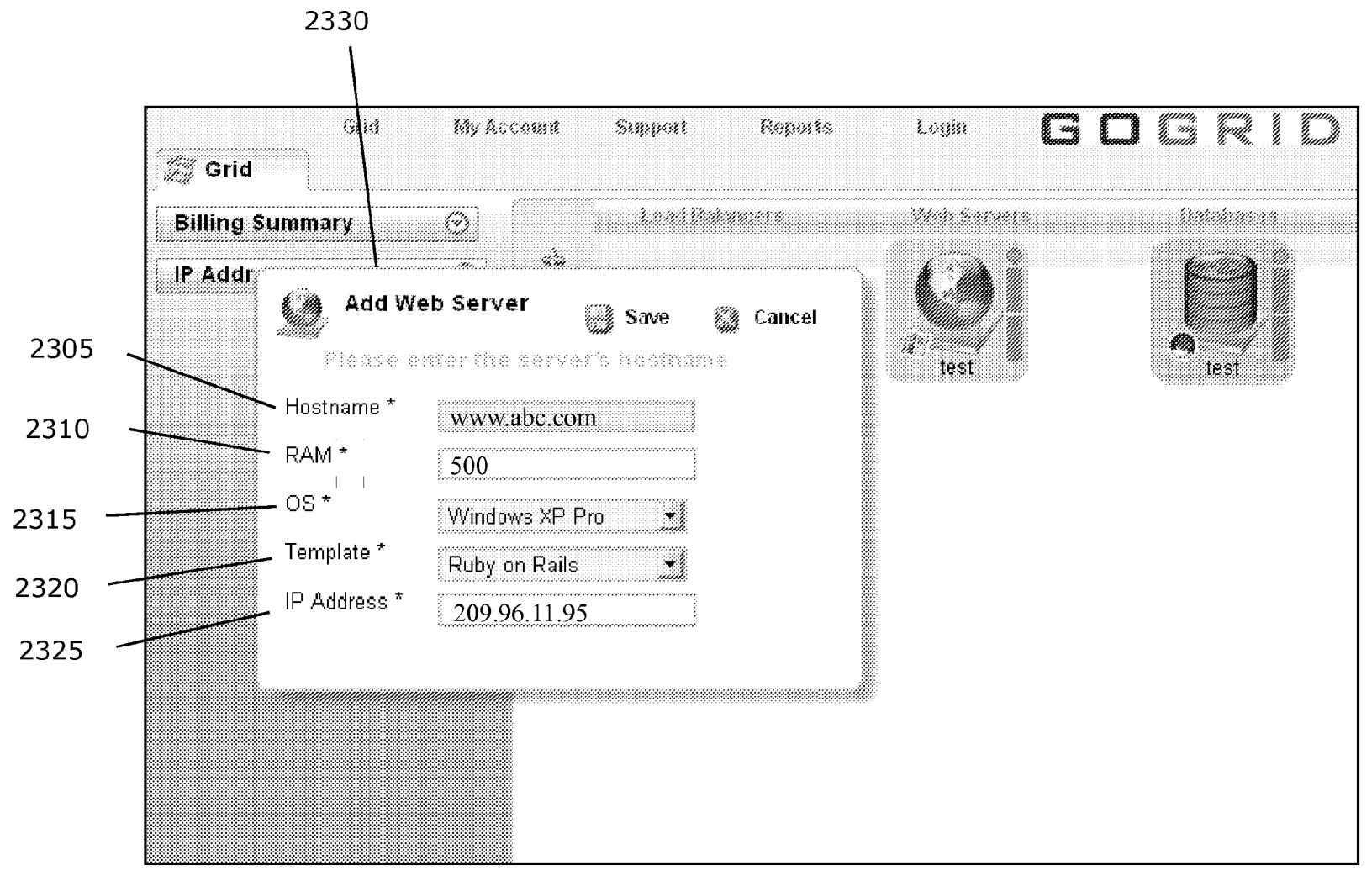

This selection causes the multi-server control panel to present to the user with a server form for the selected server representation. This form allows the user to redefine (i.e., reconfigure) the server in the server configuration. FIG. 23 illustrates one such example for the case where the user has selected a web server representation 2230 in the display area 225 and then selected the edit button 2210. As shown, the multi-server control panel provides a server edit form 2330. The server edit form 2330 includes (1) a name field 2305 for specifying the name or site name, (2) memory field 2310 for specifying the amount of memory, (3) OS field 2315 for specifying the operating system, (4) address field 2325 for specifying the IP address, and (5) template field 2320 for specifying the server template (e.g., web server template). These fields are similar to the ones described above with respect to the web server form 430 and database server form 1130.

In some embodiments, the server edit form (e.g., web server edit form) is identical to the server form (e.g., web server form) that is displayed to the user when the server is initially specified. The multi-server control panel of some embodiments places the same restrictions on the user entries to the server edit form 2330 that are inconsistent or illegal (i.e., unexecutable). Also, the multi-server control panel of some embodiments places restrictions on how the user can reconfigure the server by graying out a particular field or providing different sets of fields than those provided in the web server form 430. For example, the server edit form 2330 might gray out or not include the OS to prevent the user from making such changes to the server.

FIG. 23 also illustrates that the multi-server control panel of some embodiments automatically fills in the server edit form 2330 with one or more entries (e.g., user specified entries). This is illustrated in FIG. 23 as all the fields of the server edit form 2330 are automatically filled in with the current values for these fields. For example, the name field 2305 of the server edit form 2330 displays the entry "www.abc.com", and the memory field 2310 displays the entry 500 megabytes.

Figure 24:
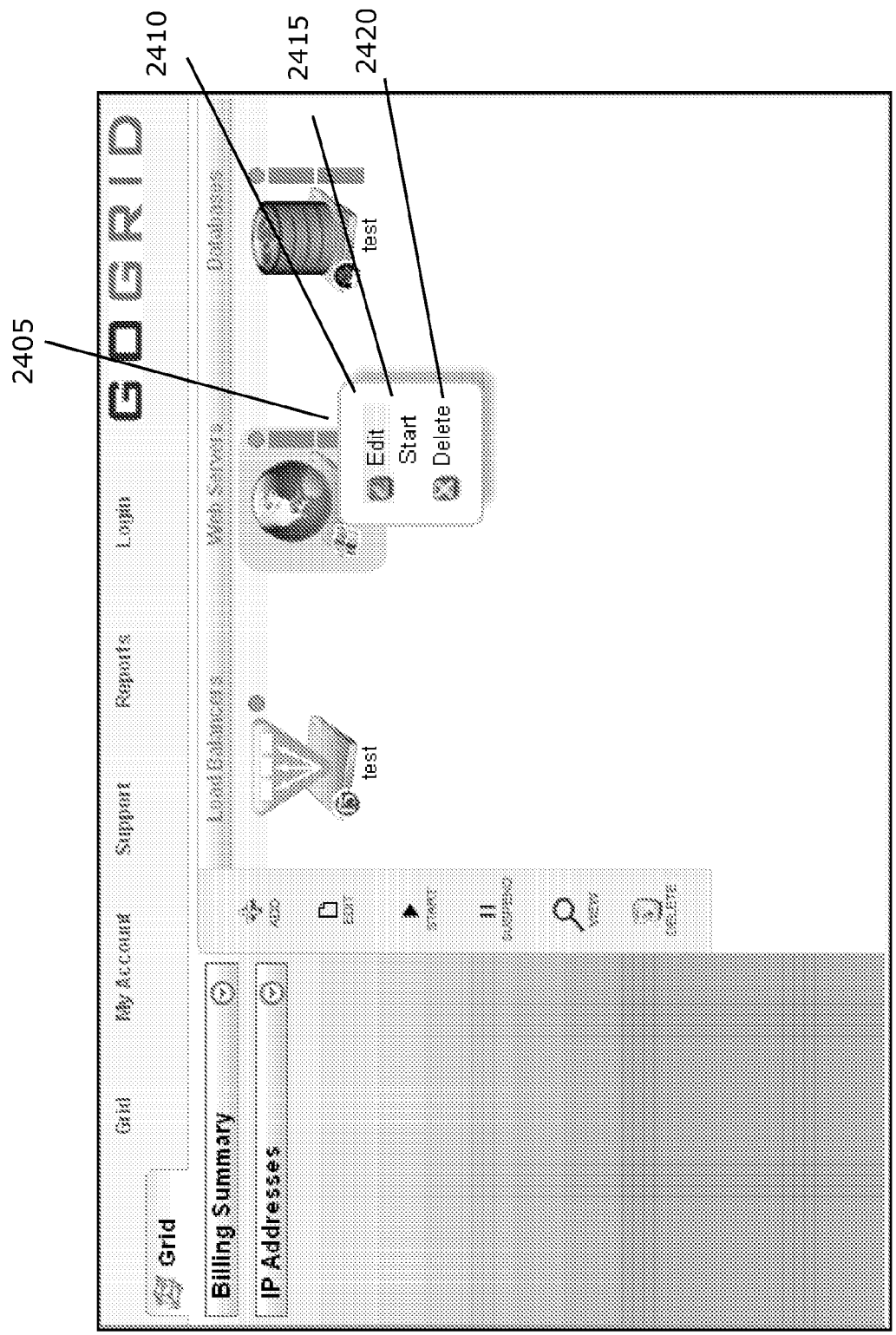
FIG. 24 illustrates an exemplary alternate method of how a user can access a server edit form for reconfiguring a server.

FIG. 24 illustrates a different method of how a user can access the server edit form 2330. When the user selects a server representation (e.g., through a right mouse click, double clicking, etc.), the user is presented with a pop-up menu 2405, as shown on FIG. 24. The pop-up menu 2405 includes an edit icon 2410, start icon 2415, and delete icon 2420. A user selection of the edit icon 2410 in the pop-up menu 2405 presents the user with the server edit form 2330 as illustrated in FIG. 23. When the user selects the start icon 2415, the server that corresponds to the selected server representation is automatically started. For example, if a web server of the server configuration is in a suspended or stopped mode, the user selection of start icon 2415 initiates the automatic starting of the web server.

In some embodiments, the delete icon 2420 allows the user to delete the corresponding server in the server configuration. For example, by selecting a database server (e.g., through a right mouse click, double clicking, etc.) and selecting the delete icon 2420, the corresponding database server can be deleted automatically from the server configuration.

In the example illustrated in FIG. 22, the delete button 2225 and start button 245 provide the user with similar functionality as the delete icon 2420 and start icon 2415. The delete button 2225 allow the user to delete a server in the server configuration, and the start button 245 allows the user to start the server. Also, the stop button 2215 allows the user stop a server, the restart button 220 allows the user to restart the server, and suspend button 2020 allows the user to suspend the server.

As mentioned above, the suspend button 2005 is a special type of control that is dynamically provided to a user when the user selects a load balancer representation in the display area. For example, when the user selects the load balancer representation in the display area, the user is provided with a set of control that includes the suspend button.

Figure 25:
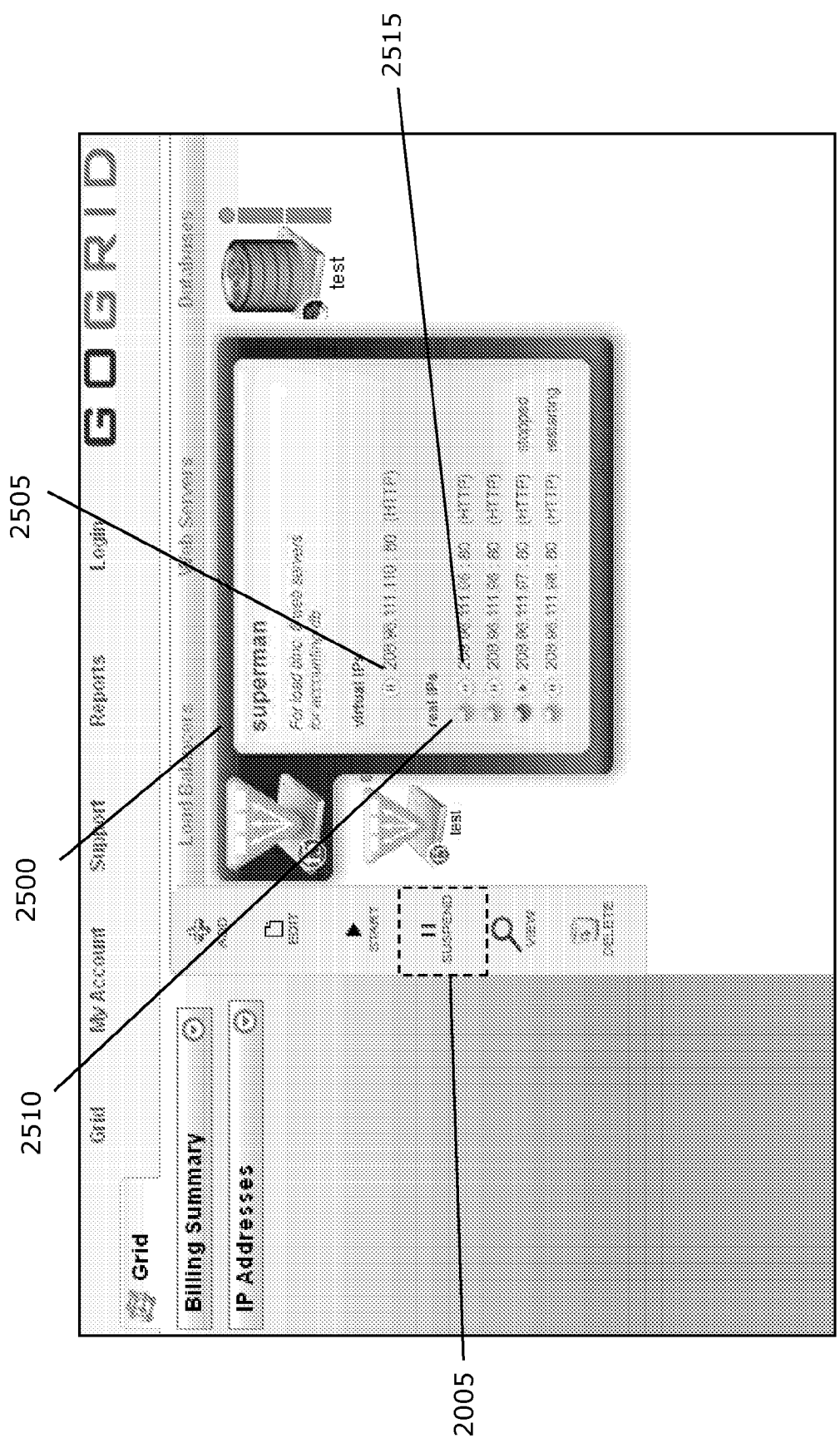
FIG. 25 illustrates a suspend screen that is displayed when a user selects a load balancer representation and then selects a suspend button.

FIG. 25 illustrates a suspend screen 2500 that is displayed when a user selects a load balancer representation and then selects the suspend button 2005. The suspend screen lists the virtual IP address and all the real IP in a load balancing pool that is associated with the listed virtual IP. This screen also provides several controls that allow the user to control IP addresses (e.g., real IP address/port number pairs). Specifically, as shown in FIG. 25, the suspend screen includes three types of control, which are a pause/play control 2505 for the virtual IP, a pause/play control 2515 for each real IP listed in the suspend screen, and an IP status indicator 2510 for each real IP listed in the suspend screen.

A user can remove and a real IP address and port pair from the set of real IP addresses (e.g., load balancing pool) by selecting the real IP's corresponding pause/play control. This can be useful when a user decide to perform maintenance on a particular server without affecting all the servers associated with the virtual IP address associated with the paused real IP address. In the example illustrated in FIG. 25, a selection of the pause/play button for a particular real IP changes the appearance of the pause/play button in the displayed list. For instance, in FIG. 25, the first pause/play button is displayed as a pause symbol that indicates that its corresponding real IP address is currently operational (i.e., corresponding real IP address is in the load balancing pool), while the third pause/play button displays a play symbol that indicates that its corresponding real IP address is not operational (i.e., not currently a member of the load balancing pool).

The status indicator of each real IP appears adjacent to the real IP's pause/play button. This indicator displays through color the status of its corresponding real IP address. For example, when a real IP address is removed from the set of real IP addresses (i.e., when it is paused) by a user selection of its pause/play button, the status indicator changes from one color to another (e.g., green to red).

The pause/play button 2505 of the virtual IP button allows the user to stop a virtual IP address. For example, when a user selects the virtual IP button, all incoming requests from a client addressing the virtual IP are not routed to any real IP addresses in some embodiments. This pausing then can be used to quickly take offline a configuration that is associated with a particular virtual IP address.

Some embodiments provide the suspend button when non-load balancing servers (e.g., web servers, application servers, database servers) are selected in the display area 225. This suspend button can then be used in these other embodiments to suspend a real IP address that is associated with the selected server (e.g., an IP address that is associated with the selected server but is not associated with any load balancing server).

In some embodiment, several of these controls (e.g., restart button, stop button) allow the user to control multiple servers at the same time. For example, in some embodiments, a user can select several representations in the display area 225 and select a particular control (e.g., delete button, suspend button) to perform the function associated with the particular control on all servers that correspond to the selected representations.

Figure 22B:
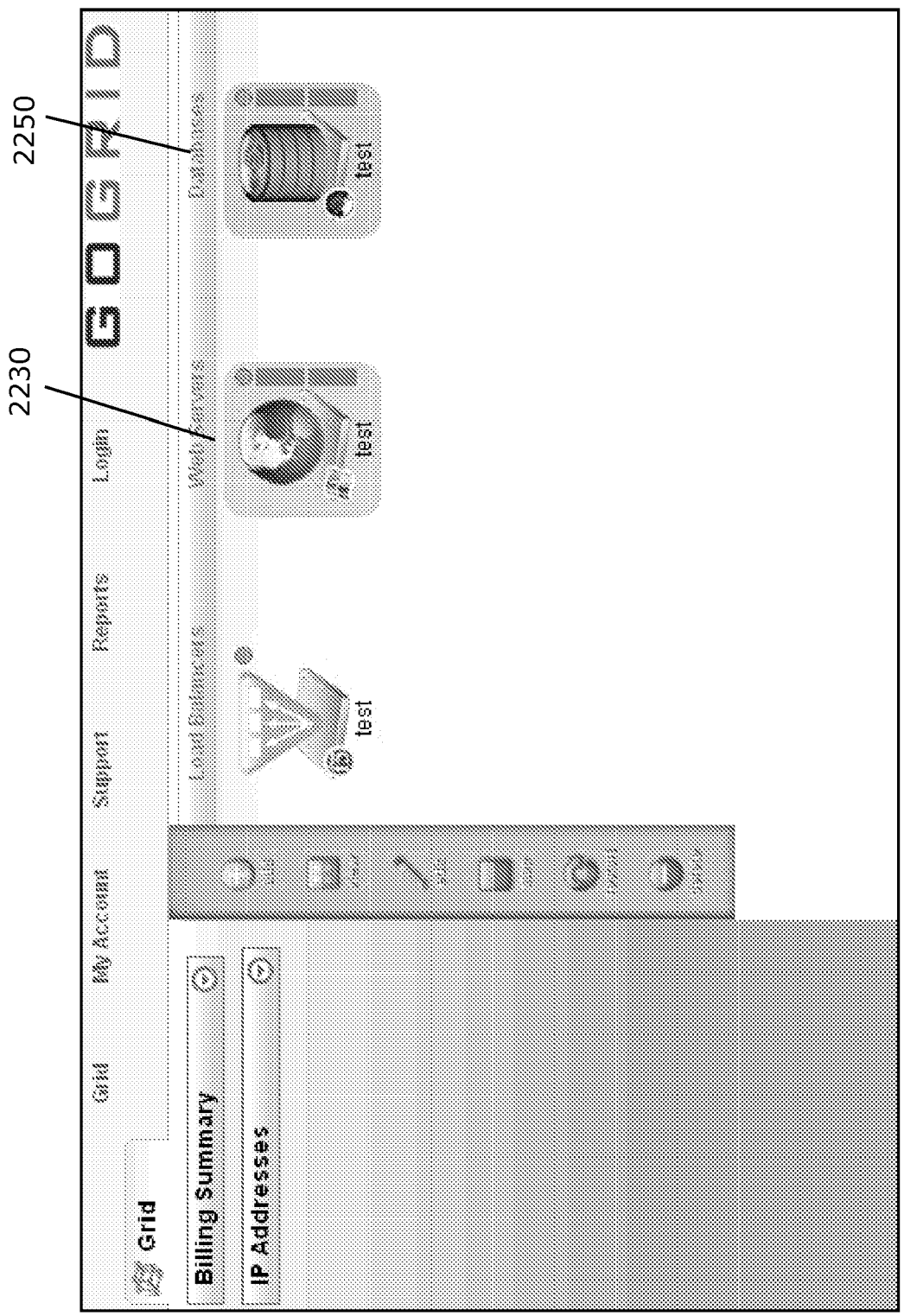
FIG. 22B illustrates selection of several representations from the display area.

The selection of several different representations is illustrated in FIG. 22B. When a user selects a sever representation in the display area 225, the selected representation is highlighted. In the example illustrated in FIG. 22B, the web server representation 2230 and database server representation 2250 are the selected server representations as they are both highlighted. The multi-server control panel of some embodiments provides several ways in which a user can select several server representations. For instance, the user can drag a cursor (e.g., by moving a cursor controller such as a mouse) over several representations, or the user can select a first server representation and select any subsequent server representations by holding down a keystroke (e.g., shift key). Once several server representations are selected, the user can control the corresponding servers by selecting a control (e.g., restart button, stop button). For example, a user can select the restart button 2220 to restart all selected servers, or the user can select the stop button 2215 to stop all the selected servers.

Figure 26:
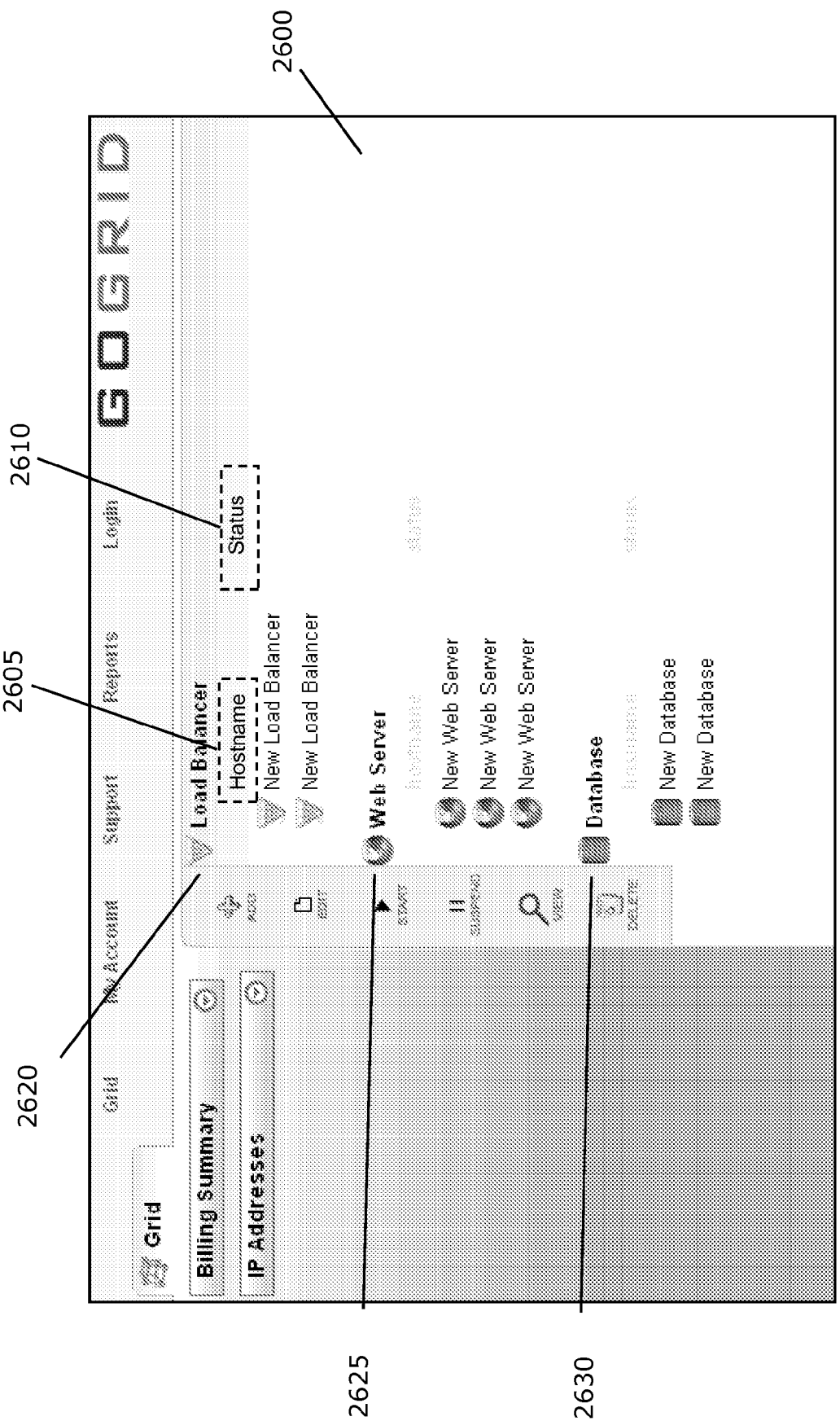
FIG. 26 illustrates an exemplary detail view of the multi-server control panel.

In the example illustrated in FIG. 22, the view button 2255 allows a user to change the display area's view. A user selection of the view button 2255 presents the user with a detail view 2600 as illustrated in FIG. 26. The detail view 2600 includes a name column 2605, status column 2610, database row 2630, web server row 2625, and load balancer row 2620. The database row 2630 is for listing database servers in the server configuration, the web server row 2625 is for listing web servers, and the load balancer row 2620 is for listing load balancers.

The name column 2605 of the detail view 2600 displays the name or site name associated with the servers. For example, if the user has specified a name of "wwe.abc.com" for a web server, then the name column 2605 might indicate the specified name of the web server. The status column 2610 displays the status of the servers in the configuration. For example, if a server is stopped, then the detail view of some embodiments displays an indication (e.g., textual indication, graphical indication) that the server is in such mode. Some embodiments of the multi-server control panel indicates the status of a server in the detail view 2600 through a status identifier or resource meter. Specific examples of the status identifier and resource meter are described below with respect to FIGS. 27A-27C. In some embodiments, the multi-server control panel provides the detail view 2600 that displays other types of data (e.g., date the server was added, time running). For instance, if a web server in the configuration has been running for one month and three days, the detail view 2600 might indicate the month and days running In some embodiments, when the user selects a particular control (e.g. start button, delete button), the multi-server control panel 200 displays a message. For example, if a user attempts to delete an application server in the server configuration using the delete button 2225, the multi-server control panel of some embodiments displays a warning message (e.g., a message that indicates irreversibility of deleting the application server).

In addition to the control described above, some embodiments of the multi-server control panel provides a clone control and a back-up control. The clone control allows a user to clone a selected server. For example, when a user selects a server representation in the display area and selects the clone control, a snapshot image is taken of the server that corresponds to the server representation. The snap shot image taken includes the configuration data (e.g., the name of the server, the amount of ram) and the stored data (e.g., stored web site) of the server. In some embodiments, the selection of the clone control causes the front-end logic to define the cloned server to add a graphical representation of this server to a particular server tier that is displayed in the display area 225.

The back-up control allows a user to back-up a selected server. In some embodiments, when a user selects a server representation in the display area and selects the back-up control, a snapshot image is taken of the selected server with date/time stamp and version number, and stored. In some embodiments, the selection of the back-up control causes the front end logic to provide a list of available back-up images by for a user to select from after the user selects the add button as illustrated in FIG. 3.

B. Monitoring Configurations

As mentioned above, the front-end UI logic of some embodiments can receive resource usage data for each server in a particular configuration so that the multi-server control panel can display the usage data in real time. Some embodiments of the multi-server control panel receive resource usage data for a set of servers in the server configuration and display the usage data. Several examples of real time display of usage data are described in sections A and B below.

1. Real-Time Resource Utilization Meter

Figure 27A:
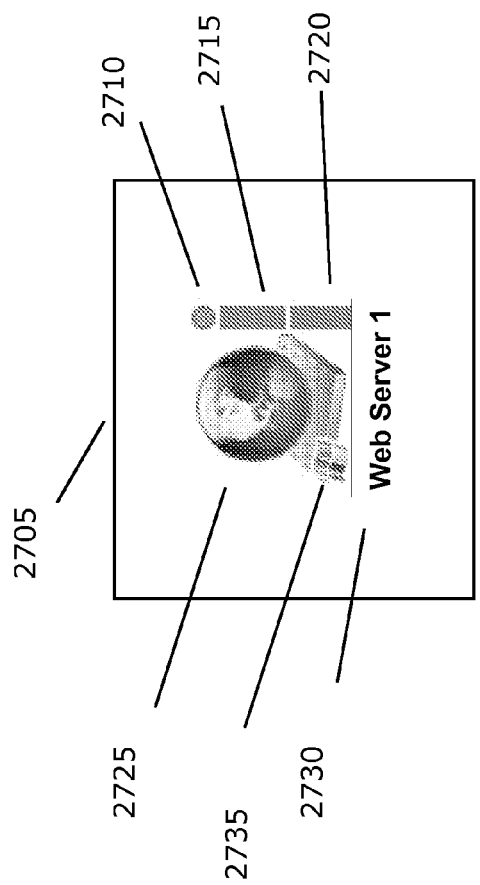
FIGS. 27A-27C present several illustrative examples of the multi-server control panel that displays resource usage data in real-time.
Figure 27B:
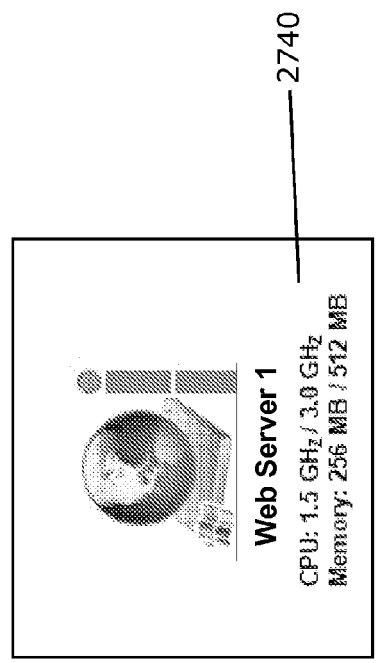
Figure 27C:
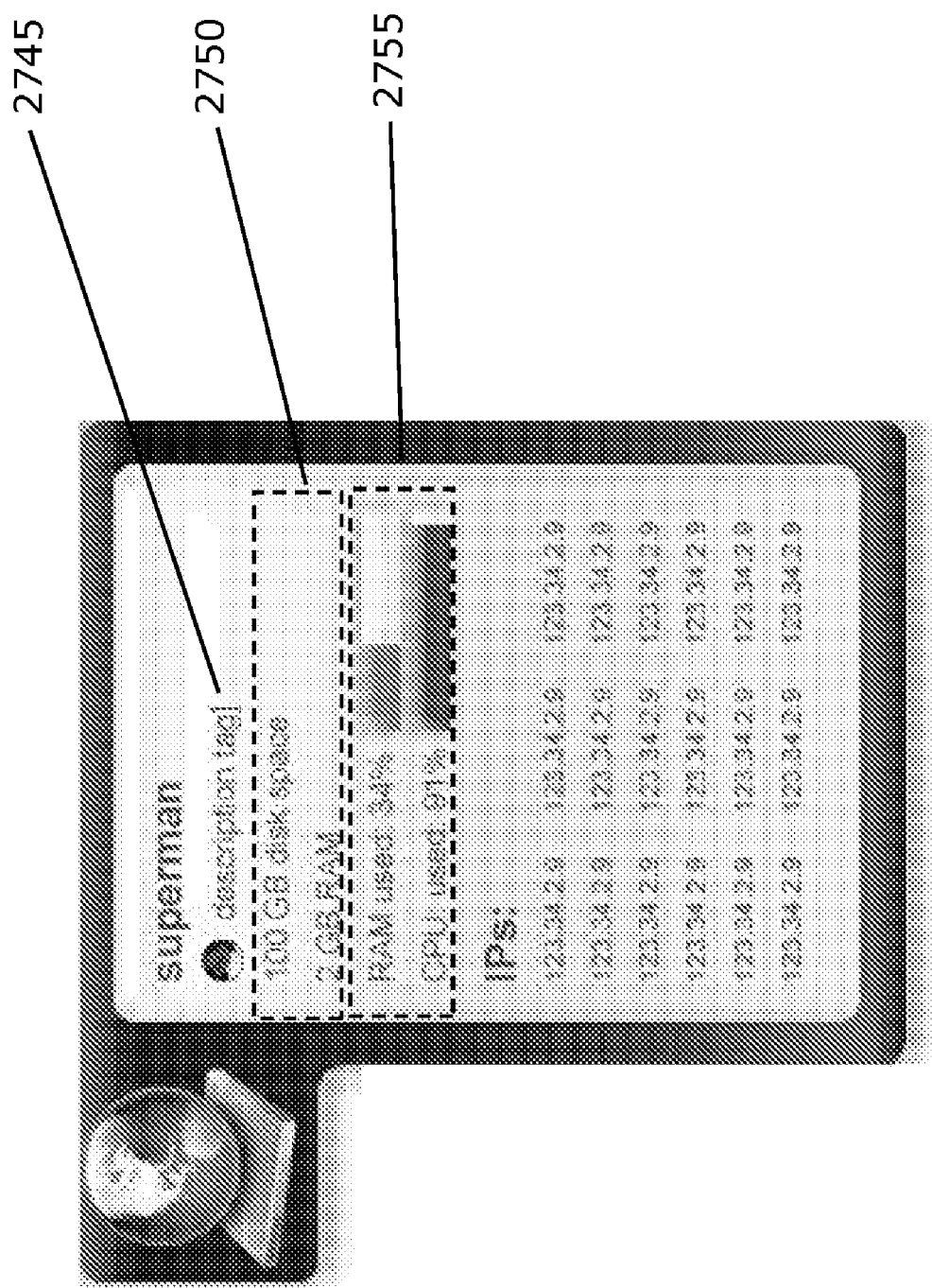

FIGS. 27A-27C present several illustrative examples of the multi-server control panel that displays resource usage data in real-time. FIGS. 27A-27B includes a server representation 2705. The server representation 905 has a textual element 2730, server icon 2725, status identifier 2710, top resource meter 2715, and bottom resource meter 2720.

The textual element 2730 of the server representation 2705 identifies the corresponding server in the server configuration. The textual element 2730 of some embodiments identifies the server by a specified hostname. For instance, if the user specifies the hostname (e.g., "www.abc.com") through the host field 405 of the web server form 430, then the display area of some embodiments displays the specified hostname.

The server icon 2725 is a graphical representation of the corresponding server in the server configuration. In some embodiments, the graphical representation provides a graphical display of more configured parameters associated with the server that it represents. For instance, in the example illustrated in FIG. 27A, the server icon 2725 displays a symbol 2735 that indicates that the web server is operating on a windows operating system. Instead of or in addition to the OS indication, the server icon 2725 of some embodiment displays other indications that convey other configured parameters of the server.

The resource utilization meter (2710 or 2715) displays the real-time resource usage for the corresponding server in the server configuration. In the example illustrated in FIG. 27A, the top resource meter 2715 represents CPU usage, and the bottom resource meter 2720 represent memory usage. Each meter displays the real-time usage by fluctuating (e.g., moving a bar within the meter) in accord with the real-time usage of the corresponding server. In some embodiments, the fluctuating graphical display is indicative of usage of said resource at different instances in time and/or is indicative of real time or near real time usage of the resource.

Also, the fluctuating graphical display changes color in some embodiments when the usage of the particular resource exceeds a particular threshold. For instance, in some embodiments, the bar within a meter changes color when resource usage goes over a predetermined threshold for the resource. One such example is when the CPU usage goes over a 50 percent allotted capacity, the top resource meter 2715 might change from one color to another color (e.g., green to yellow). The threshold in some embodiments is an expected usage rate over a duration of time based on the amount of a particular resource that is assigned to the particular user. Hence, the top and bottom meters (2710 and 2715) can indicate different colors at different instances in time to specify excess usage of the resource. These fluctuating display and the changing colors provide a quick visual indication of the CPU and memory being overloaded or "thrashed." Hence, these icons are referred to as "thrash-o-meters" in some embodiments. Instead of or in conjunction with CPU and memory, some embodiments of the multi-server control panel provides real-time usage of other resources. These other resources include network resources (e.g., network traffic, data transfer) and other physical resources (e.g., storage space).

The status identifier 2710 indicates whether the corresponding server in the server configuration is running. For example, when the server in the configuration is stopped, the status identifier 2710 of some embodiments indicates the server is stopped by displaying a particular color (e.g., gray, black). Also, the status identifier 2710 indicates whether the corresponding server is running efficiently. In some embodiments, the status identifier 2710 changes color when usage for one of the resources represented by the resource utilization meter (2710 or 2715) goes over a threshold value. For example, when the memory usage goes over 75 percent capacity, the status identifier 2710 of some embodiments changes color from one color to another color (e.g., yellow to red). In some embodiments, the status identifier 2710 changes color when usage for both resources represented by the utilization meters goes over the threshold values. For example, if the memory usage goes over 50 percent capacity and the CPU usage stays below 50 percent capacity, then the status identifier may stay the same color (e.g., green). However, if the Ram usage also goes over 50 percent, then the status identifier may change color (e.g., from green to yellow).

When a user moves a cursor over the server representation 2705, some embodiments of the multi-server control panel display the real-time usage data in numerical format. FIG. 27B illustrates displaying real-time usage data when the user has moved a cursor (e.g., cursor controller such as mouse) over the server representation 2705. In the example illustrated in FIG. 27B, the server representation 2705 includes numerical data 2740. The numerical data 2740 indicates the real-time resource usage for the memory usage and CPU. For example, the numerical data 2740 indicates that about half of the CPU and memory are being utilized for the corresponding server in the configuration. In the example illustrated in FIG. 14, the multi-server control panel translates the usage data and displays a simplified textual data. For example, instead of displaying numerical data indicating the amount of network traffic, the multi-server control panel displays the textual data, which indicates that the network traffic of the web server corresponding to the server representation 1405 is reaching high capacity.

FIG. 27C illustrates an alternate embodiment of the multi-server control panel that displays real-time usage data when a user has moved a cursor (e.g., cursor controller such as mouse) over the server representation. FIG. 27C includes a description area. The description area has a includes (1) a real-time section 2750 for displaying resource usage for both CPU and memory, (2) description 2745 tag for displaying a user specified description of the server, and (3) a resource section 2755 for displaying allocated resources. Also, in the example illustrated in FIG. 27C, the memory usage and CPU usage are displayed as percentages, rather than an amount.

2. Resource Usage Summary Area

Figure 28:
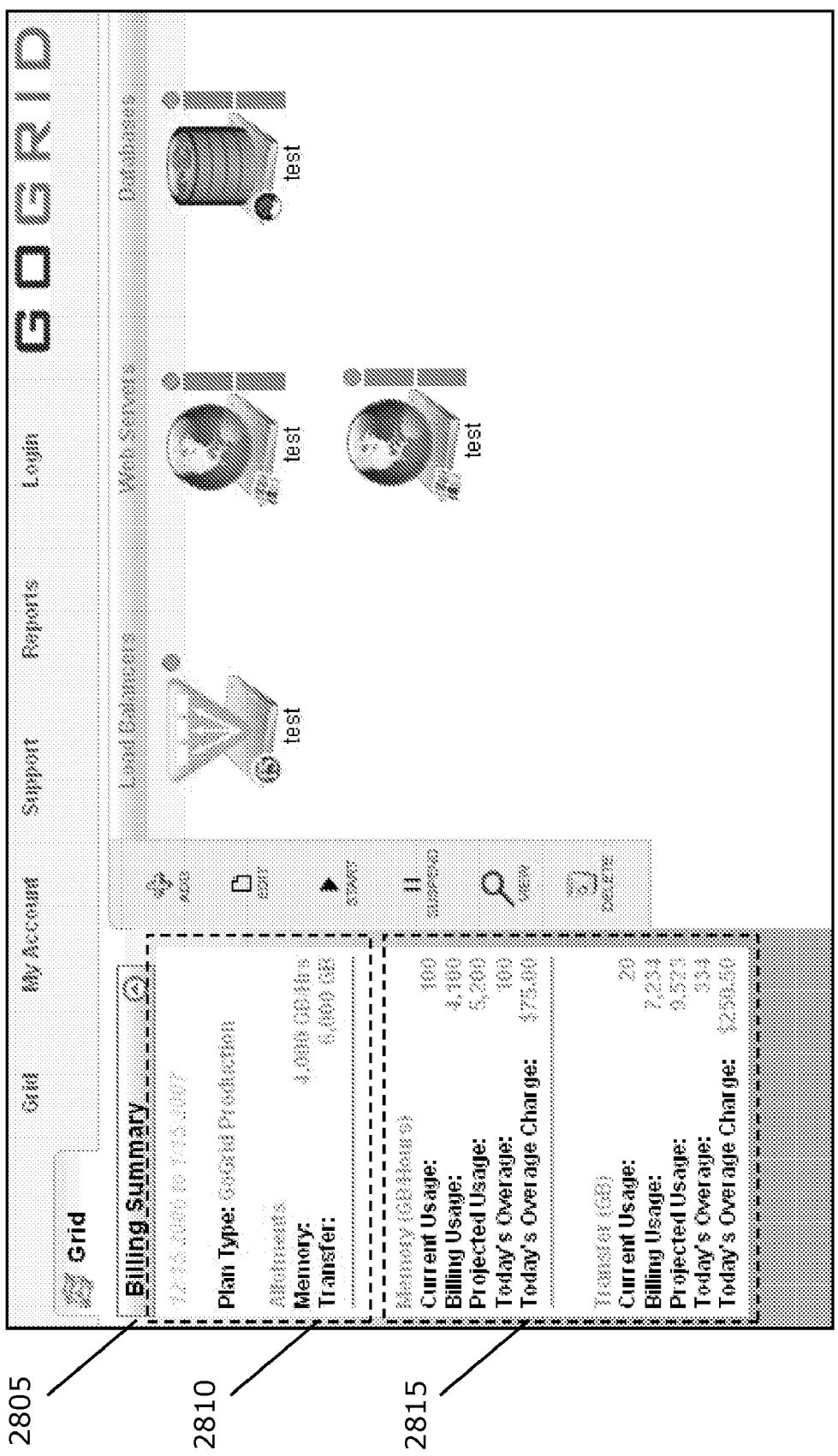
FIG. 28 presents several illustrative examples of the multi-server control panel that displays resource usage data for a set of servers in the server configuration.
Figure 29:
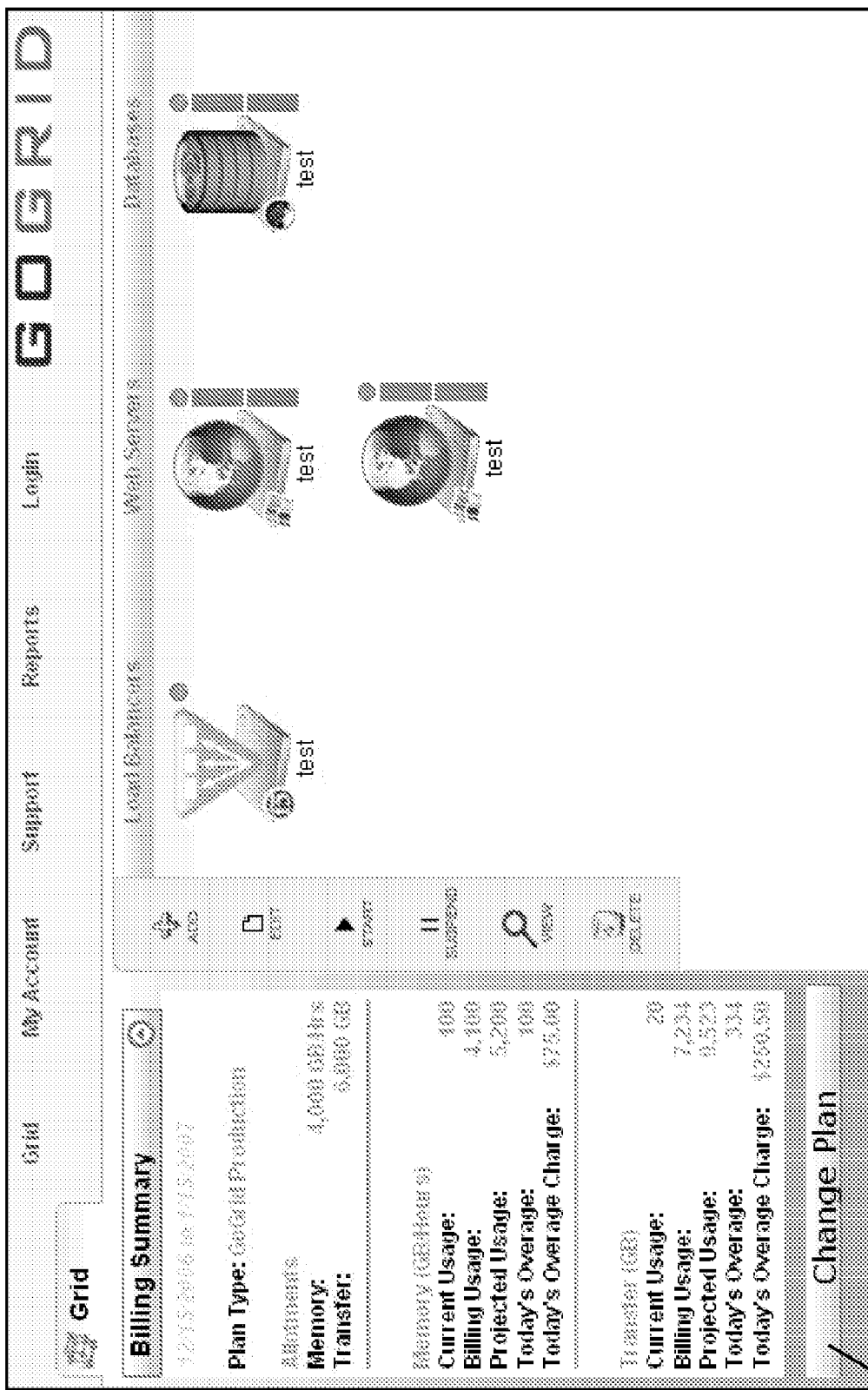
FIG. 29 presents an example of a control button displayed when a set of server goes over an allotment in a specified period.

FIGS. 28-29 present several illustrative examples of the multi-server control panel that displays resource usage data for a set of servers in the server configuration. FIGS. 28-29 include a billing summary area 2805 that displays resource usage data for a set of servers in the configuration. The summary area 2805 has a plan type section 2810 and usage section 2815. The plan type section 2810 displays the amount resource allotted for the set of servers in a specified period (e.g., monthly). In the example illustrated in FIG. 28, the set of servers is allotted 6 GB of data transfer, and 4,000 GB/Hrs of memory.

Figure 42:
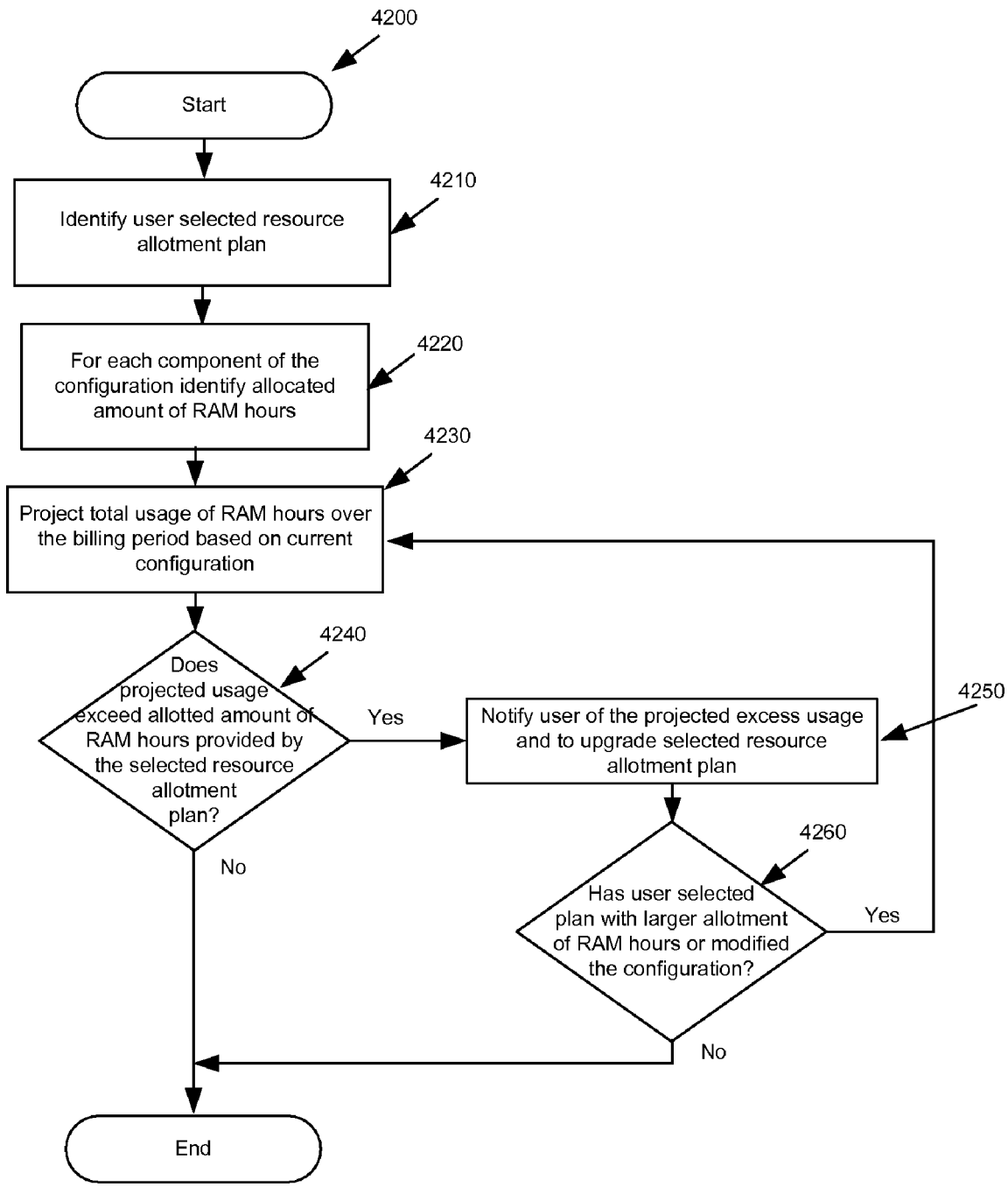
FIG. 42 presents a process that conceptually illustrates several operations performed by the data collector and data analyzer to perform the billing services at the time of specifying the configuration.

The usage section 2815 displays several usage and billing data for the set of servers. Specifically, the usage area displays (1) the current usage, (2) billing usage, (3) projected usage, (4) overage, and (5) overage charge. The usage area displays these data for both the memory usage and data transfer usage. The current usage indicates the last measured resource usage data for the set of servers. For example, in FIG. 28, the current usage for memory indicates that the last measured memory usage data for the set of servers is 100 GB. The billing usage indicates the total usage for the set of servers in the specified period. For example, in the example illustrated in FIG. 28, the billing usage of the data transfer indicates that about 7.234 GB has been transferred by the set of servers in the specified period. The projected usage indicates the projected usage for the set of server in the specified period. This projected usage data is the projected usage data at step 4230 of the projection process as illustrated in FIG. 42. Also, the overage indicates how much the set of servers is over for the current day, and the overage charge indicates the cost for the overage for the current day. Several embodiments of computing memory hours, computing overages, and projecting usage are described below in Section IV.

In some embodiments, the multi-server control provides one or more UI elements when the set of servers in the configuration goes over an allotment. FIG. 29 illustrates an example of one such dynamic UI element. The multi-server control panel includes the billing area 2905 of FIG. 29 and the change plan control 2905. When the set of servers goes over an allotment in a specified period, the multi-server panel control dynamically provides the plan control 2905. The plan control 2905 when selected opens up an order form (not shown) for the user to specify a different plan for the set of servers. In some embodiments, the multi-server control panel displays a message that recommends a type of plan for the set of servers based on the projected usage. For example, if the projected usage for data transfer is about 10 GB, then the multi-server control panel displays a message recommending a hosting plan that includes at least 10 GB of data transfer.

C. Security

In some embodiments, the multi-server control panel provides a role-based access control to prevent unauthorized users from performing certain operations such as deleting and editing servers. The multi-server control panel of some embodiments provides UI elements that allow a user to define a role for other users. For example, one user might define a role of another user as an "employee" that can perform certain operations such as start and stop servers, but cannot perform other operations such as edit and delete server.

Figure 30:
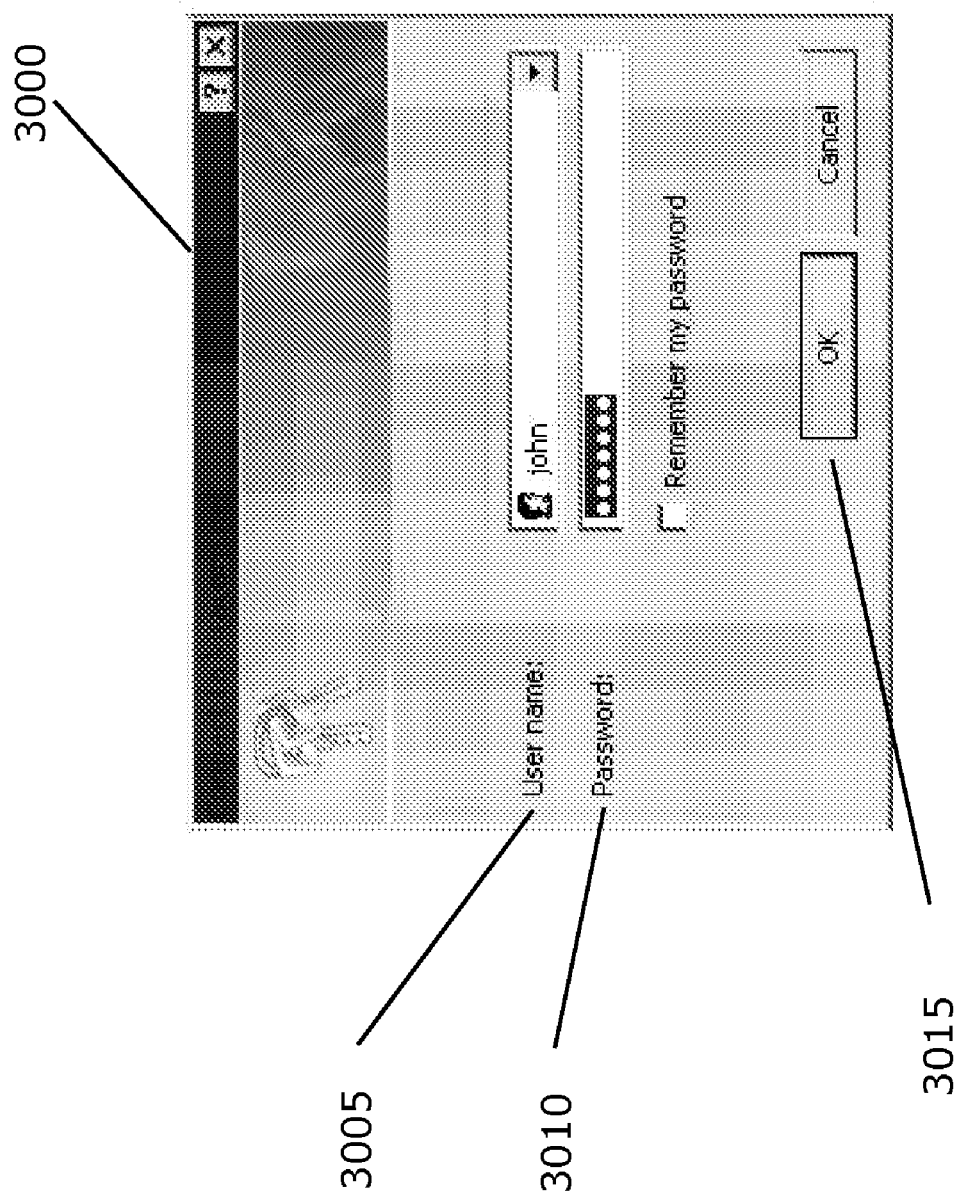
FIG. 30 illustrates an exemplary log-on form of the multi-server control according to some embodiments.

In some embodiments, the multi-server control panel provides a log-on form 3000 for the user to specify a user name and password. FIG. 30 provides an exemplary log-on form 3000 of the multi-server control according to some embodiments. The log-on form includes a user name field 3005, a password field 3010, and a confirm button 3015. The user name field 3005 allows the user to specify a user name, and the password field 3010 allows the user to specify a password for the user name. When the user selects the confirm button 3015, the specified user name and password is sent to the front-end logic for processing. In some embodiment, the user name and password is sent to the front-end logic securely (e.g., sent through a https request). Once the front-end logic receives the user name and password, the front-end logic determines whether a matching user name and password is stored. After determining that a match exists, the front-end logic provides access to the set of controls based on a role associated with the specified username.

III. Back-End Logic

A. Scheduler

Once a user finishes specifying a configuration through the front-end manager 110, the front-end manager 110 passes the configuration to the back-end logic for processing, assignment, and allocation. As illustrated in FIG. 1, the back-end logic is partially formed by the scheduler 130 and the deployment manager 150 of some embodiments.

Figure 31:
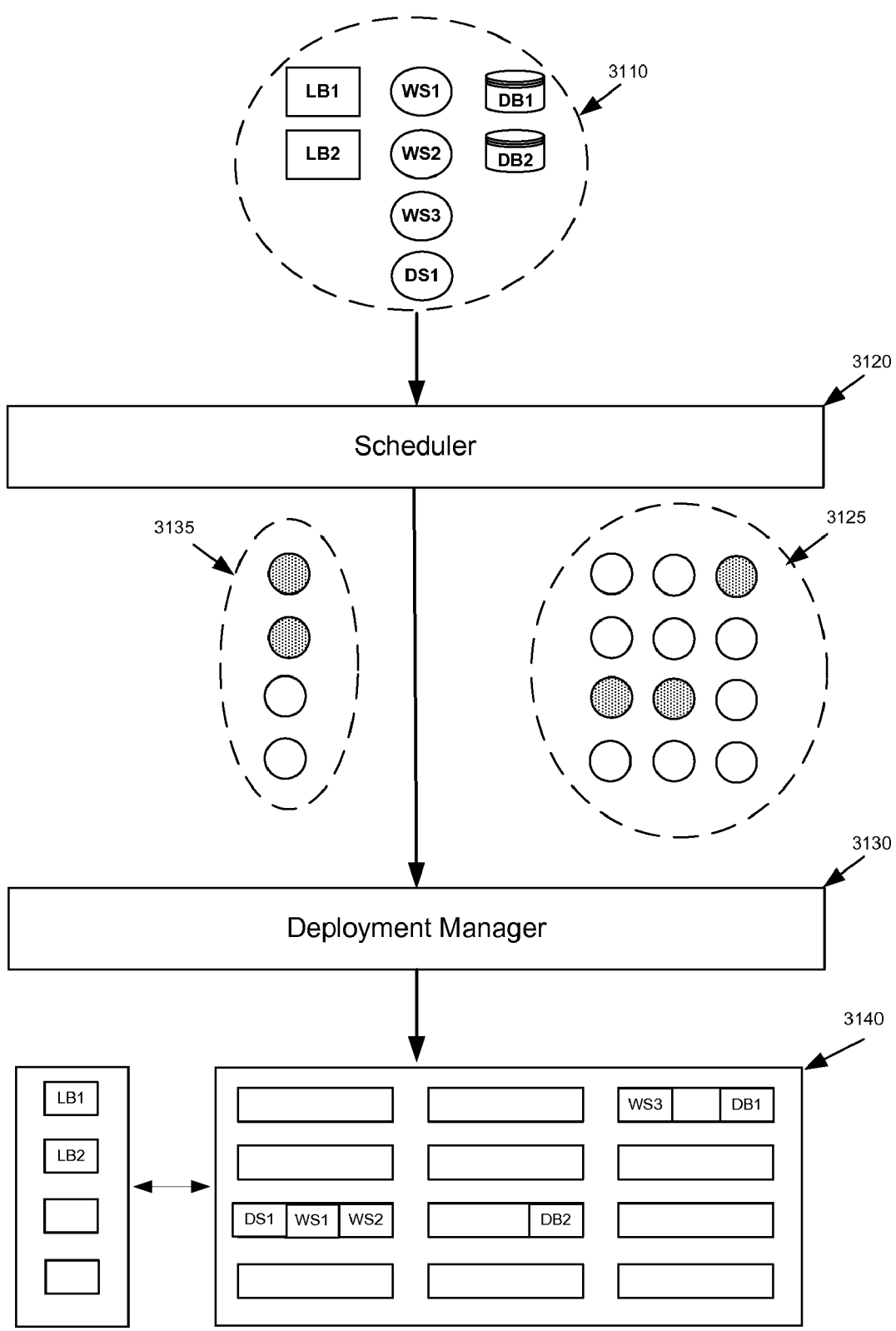
FIG. 31 illustrates a conceptual example of passing a configuration 3110 to the back-end logic.

FIG. 31 illustrates a conceptual example of passing a configuration 3110 to the back-end logic. As illustrated in this figure, the configuration 3110 includes a set of components for a server configuration. The scheduler 3120 of the back-end logic receives the configuration 3110 as a set of objects or database records that represent the set of components (e.g., the servers and their associated software) in the configuration. The scheduler 3120 then generates a map 3125 that logically assigns the components of the configuration to a set of available hardware resources within a grid of hardware nodes 3140. In some embodiments, the generated map need only configure devices without having to allocate the resources of such devices. For example, the resources of the load balancers cannot be physically allocated to a particular configuration, however the scheduler specifies a configuration for the load balancers 3135 so that communications are passed between the load balances 3135 and other components placed on the hardware nodes 3140. Specifically, the scheduler specifies mapping a virtual I.P. address used to access the load balancers 3135 to a real IP address assigned to a web server of the configuration.

The scheduler passes the generated map to the deployment manager 3130, which uses the generated logical assignment to physically assign the components in the configuration to the hardware nodes 3140. In some embodiments, each node implements one or more of the functional components. However, it should be apparent to one of ordinary skill in the art that a particular component of the configuration can be mapped across multiple nodes or the entire configuration may be mapped to a single node of the grid. Additionally, though the process performed by the scheduler has thus far been described to occur after the user has completed specifying the entire configuration, it should be apparent to one of ordinary skill in the art that the processes performed by the scheduler alternatively occurs as each component is configured and placed within the configuration. In this manner, the scheduler maps the components as they are added.

Moreover, in some embodiments, the entire process of FIG. 31 is performed in real-time. Real-time operation defines a consecutive series of events that the hosting system performs in response to an action initiated by the user. For instance, when the user specifies a configuration, the configuration is directly passed from the front-end logic to the scheduler, which performs the mapping of the modified configuration as it is received from the front-end logic. The scheduler then provides the mapping to the deployment manager which physically allocates the specified resources within the mapping as they are received. Accordingly, real-time functionality performs operations without human intervention in the instance at which they are received. While real-time requests might be placed in a queue during processing, the real-time processing provided by some embodiments should be distinguished from batch processing which receives multiple operations from multiple users and performs all operations at predetermined points in time (e.g., every hour). Some embodiments further provide real-time feedback regarding the configuration after it is deployed. In this manner, the user may instantaneously (e.g., less than 1 minute, in a few minutes or within an hour) respond and modify in real-time the configuration based on the real-time feedback.

Figure 32:
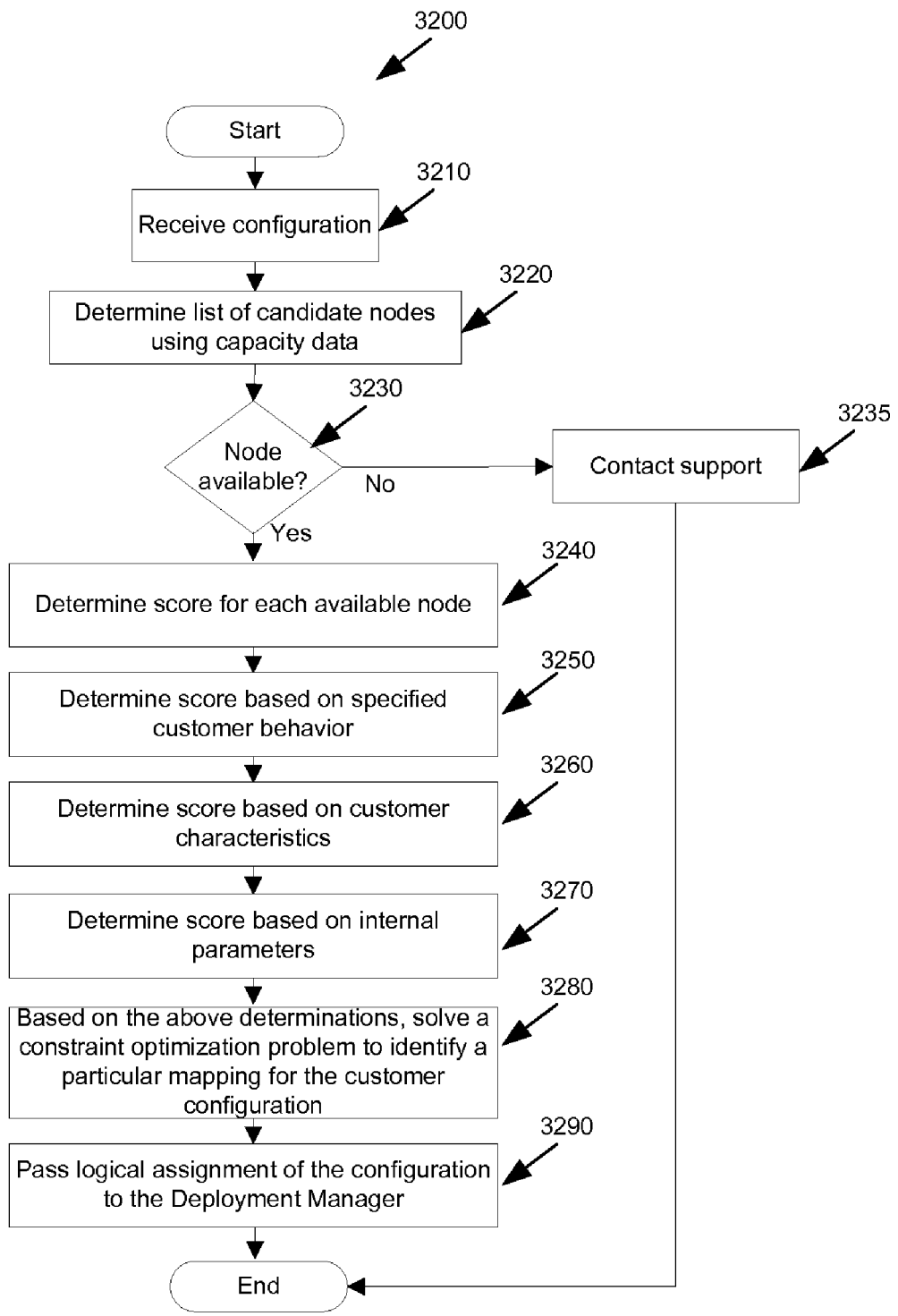
FIG. 32 presents a scheduling process that conceptually illustrates several operations performed by the scheduler to logically assign a server configuration to a set of hardware nodes (i.e., to generate a logical mapping of the components in the configuration to the hardware nodes).

FIG. 32 presents a scheduling process 3200 that conceptually illustrates several operations performed by the scheduler to logically assign a server configuration to a set of hardware nodes (i.e., to generate a logical mapping of the components in the configuration to the hardware nodes). In some embodiments, the scheduler generates a logical assignment that is optimal for a particular configuration based on a variety of factors relating to the available physical hardware resources, the current or predicted usage of such nodes (e.g., the memory, storage, or network utilization), the user configuration, characteristics of the user who ordered the configuration, and internal cost optimization parameters.

As shown in FIG. 32, the scheduling process initially receives (at 3210) a request to map a specified configuration to a set of hardware nodes from the front-end manager. The scheduling process determines (at 3220) a list of candidate nodes within the grid of hardware nodes that have sufficient unallocated resources to implement one or more functional components of the configuration. In some embodiments, the scheduling process generates the list of nodes based on those nodes with certain unallocated amounts of Random Access Memory (RAM). However, it should be obvious to one of ordinary skill in the art that various other criteria are used by some embodiments to determine the available list of nodes. For example, in conjunction with or instead of the unallocated amount of RAM, some embodiments additionally consider the available number of processor (CPU) cycles on a particular node, the available disk storage on the particular node, the frequency in which the particular node is accessed, and/or the available network bandwidth between the node and any external interfaces.

After 3220, the scheduling process checks (at 3230) whether one or more such nodes exist within the grid of nodes. If no such node exists, the scheduling process is unable to logically assign the configuration and the scheduling process raises (at 3235) an error condition to present to the user through the front-end manager. Additionally, some embodiments provide notification to the operator of the hardware node grid.

However, if a list of candidate nodes exist, then a possible assignment for the configuration to the hardware grid exists. To determine the assignment, the scheduling process determines (at 3240) a score for each node within the candidate list based on the nodes current state which does not include the deployment of the current configuration. The score for each node represents the quantity and quality of the available resources on the particular node. In some embodiments, the score is based on factors such as the amount of a particular unallocated resource available on the node or assigned components on the node that compete for the same resources of the node. For instance, the score for a first node may indicate that the first node includes 50% unused CPU cycles, 512 megabytes of unallocated RAM, and 1.5 Mbps of unallocated network bandwidth, while a score for a second node may indicate that the second node includes 10% unused CPU cycles and 10 gigabytes of unallocated disk storage. When numerically quantified, the first node score will result in a higher value than that of the second node score.

Additionally, the scheduling process at 3240 accounts for components that compete for the same resource of the node, by identifying the ratio of networking intensive components (e.g., web servers) to storage intensive components (e.g., data or application servers) on a particular node. As web servers tend to require greater network bandwidth and as data servers tend to require greater storage throughput, it would be more efficient for a single hardware node to have an even distribution of web to data servers so that no single node is overly dependent on network throughput or storage throughput.

If a node included several data servers but only one web server, it is likely that the web server would become overrun by data requests. Due to the limited network throughput, the single web server would only be able to service an amount of requests that would be less than the data computational capacity of the multiple data servers. In this manner, the data servers would be underutilized while the web server would become overrun, therefore creating an inefficient allocation of resources.

It should be apparent to one of ordinary skill in the art that a node score in some embodiments may include multiple values. For instance, the score for the first node may include a first value to quantify the amount of unallocated CPU cycles, a second value to quantify the amount of unallocated RAM, and a third value to quantify the amount of unallocated network bandwidth. Therefore, when traversing the list of candidate nodes, some embodiments are able to identify and determine nodes with particular amounts of unallocated resources.

After identifying available nodes (at 3220) and computing a score for each node (at 3240), the scheduling process quantifies (at 3250-3270) a set of factors unrelated to the available hardware resources, but rather related to the specified configuration and the user. Specifically at 3250, the scheduling process computes a score for each node based on the customer behavior parameters specified within the configuration. For instance, if the user specifies a configuration with two web servers and specifies that a first web server will experience heavy traffic loads while the second web server will experience light traffic loads, then the scheduling process computes a higher score for the first web server and a lower score for the second web server. The higher score indicates that the first web server requires additional network bandwidth or other resources (e.g., RAM, CPU cycle, disk storage) and should be assigned to a node that is able to handle such higher loads. Therefore, rather than blindly assign the two web servers as if they required the same amount of resources, the scheduling process analyzes expected behavior and assigns accordingly.

It should be apparent to one of ordinary skill in the art that various other customer behavior parameters are similarly accounted for by the scheduling process when computing the behavior score. For instance, some configurations may specify the use of compressed data. Since compressed data requires additional CPU cycles to decompress the data and additional RAM to store the compressed data alongside the decompressed data as it is being decompressed, some embodiments compute a score to reflect the additional resources needed for a configuration specifying data compression. In other embodiments, a first configuration may specify an expected packet rate similar to that of a second configuration, however because the first configuration specifies a packet size that is larger than that specified in the second configuration, it is likely that the first configuration would utilize greater bandwidth than the second configuration if placed on the same node. Therefore, some embodiments account for the packet rate and packet size parameters of a configuration and map the configurations accordingly.

At 3260, the scheduling process determines a score for each node based on various customer characteristics that account for the volatility of a particular configuration and the risks associated with the particular customer. For instance, a configuration for a blogging service may be subject to excessive spamming, a configuration containing sensitive or valuable information may be subject to excessive hacking, and a configuration that involves financial transactions may be subject to excessive fraud. Due to the nature and risks of hosting such configurations, the scheduling process includes a constraint optimization score that accounts (at 3260) for such risks and maps such configurations according to the risk calculation.

Therefore, if the constraint optimization score from the user characteristics determines that a particular configuration is highly subject to attack, the scheduling process maps components associated with the risky configuration to isolated nodes. In this manner, the scheduling process reduces the risk of downtime to other configurations that could otherwise be affected by having the risky configuration allocated to the same node.

At 3270, the scheduling process determines a score for each pairing of a node and a component in the configuration based on sets of internal parameters. For example, the scheduling process associates internal costs for certain parameters of the configuration. One such example is license fees for the selected operating system of the configuration. This factor is not germane to the customer behavior or availability of hardware. From the user perspective, it is irrelevant where the operating system is logically assigned so long as the functionality is as specified within the configuration. However, the scheduling process can avoid additional licensing costs for the operating system if all operating systems of a particular type are physically allocated to a single node as opposed to being disbursed across multiple nodes. Therefore, the scheduling process computes (at 3270) a score for each node/component pair that accounts for the software licensing fees as one example. Other embodiments might compute scores to account for other internal parameters.

It should be apparent to one of ordinary skill in the art that the list of criteria presented in FIG. 32 is not exhaustive and that other criteria may be added or used instead of the enumerated lists above to compute the score associated with either available hardware nodes or the configuration. For example, some embodiments additionally consider the frequency of access to a configuration, the duration of access to a configuration, and the amount of traffic per access, etc. Also, it should be apparent to one of ordinary skill in the art that instead of computing scores, some embodiments of the process 3200 consider some or all the enumerated factors as constraints. For instance, the licensing costs in some embodiments are addressed as a constraint within a constraint optimization equation.

Using the determined scores that account for the node availability, customer behavior, customer characteristics, and/or internal parameter, the scheduling process defines and solves (at 3280) a constraint optimization problem to identify a particular mapping for the configuration. Solving the constraint optimization problem in some embodiments involves finding an optimal solution for an objective function that is defined in terms of the previously computed scores, in view of certain constraints. The search for this solution is performed across several dimensions, in order to allow the scheduling process to optimally distribute the configuration across the most underutilized hardware nodes in a manner that is tailored to each individual configuration. In this manner, the scheduling process of some embodiments eliminates configurations in which allocated hardware resources remain underutilized and unnecessarily provisioned for a majority of time, but which become incapable of handling traffic loads during peak hours. Additionally, by distributing the configuration to as many disparate nodes as possible, some embodiments provide a level of improved reliability or fault tolerance. Therefore, if one node fails, then a certain component of the configuration will fail, while the other components not assigned to the node can continue operations. Similarly, the scheduler of some embodiments does not logically assign the database servers to a single centralized storage area network (SAN). Rather, by distributing storage across multiple nodes, storage services are also provided a level of fault tolerance not otherwise present within a centralized SAN deployment.

Once the scheduling process finishes 3280, a mapping for the configuration will have been created and stored within a database. The mapping is the passed (at 3290) to a deployment manager which then physically allocates the logical assignment to actual hardware.

B. Deployment Manager

Figure 33:
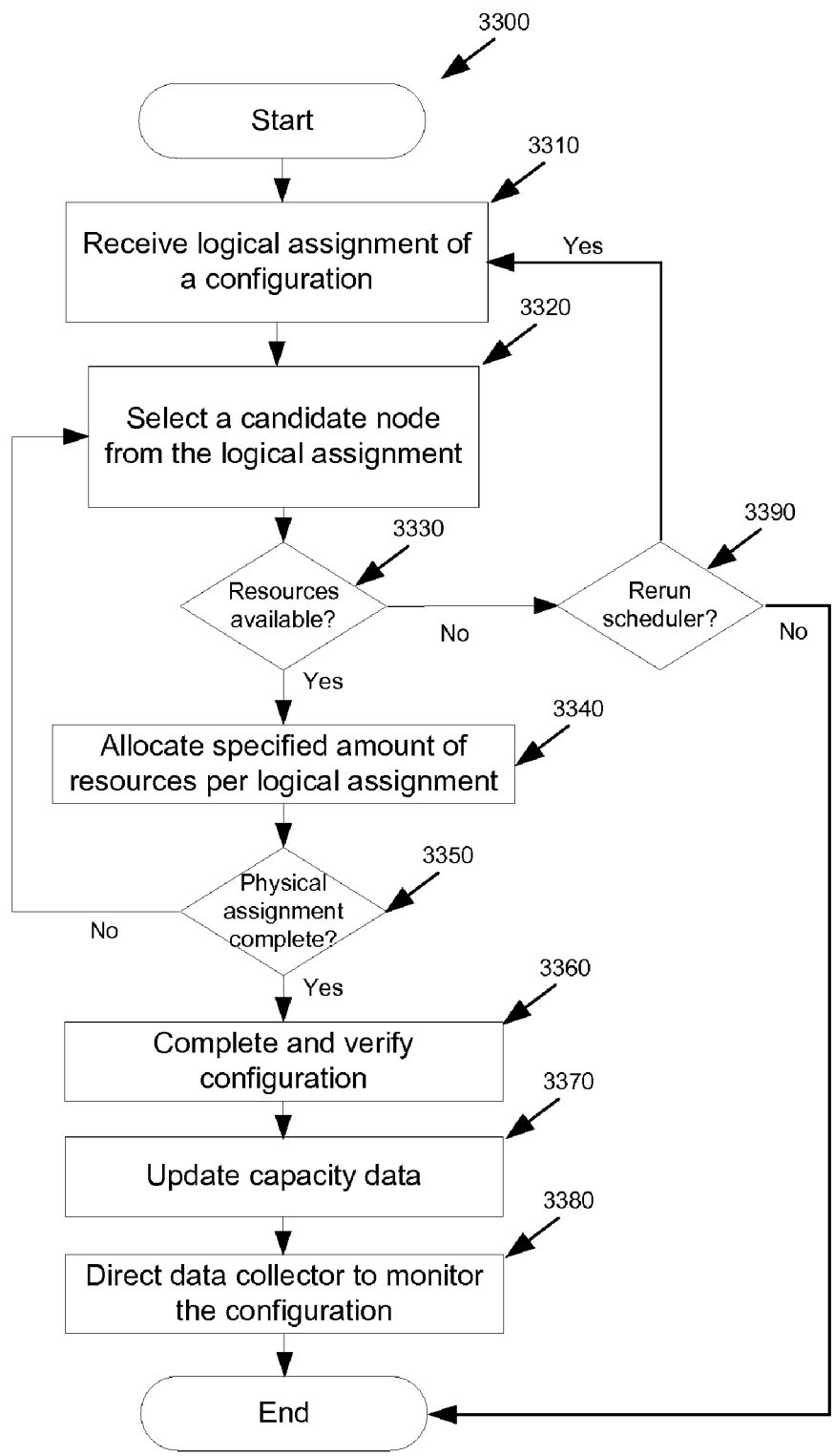
FIG. 33 presents a deployment process that conceptually illustrates several operations performed by the deployment manager to allocate resources within a grid of hardware nodes based on the logical assignment received from the scheduler.

FIG. 33 presents a deployment process 3300 that conceptually illustrates several operations performed by the deployment manager to allocate resources within a grid of hardware nodes based on the logical assignment received from the scheduler. The process begins when the deployment process initially receives (at 3310) from the scheduler a logical assignment of a configuration. In some embodiments, the scheduler pass a logical assignment for an entire configuration, while in other embodiments the logical assignment includes a single components of a configuration that is mapped immediately after the user has specified the component within the front-end provisioning logic. Based on the logical assignment, the deployment process selects (at 3320) a first node within the grid of hardware nodes for allocation and configuration. The deployment process conducts a check to verify (at 3330) that the specified amount of resources are available on the particular selected node and have not been assigned to a different configuration by a different instance of the deployment process.

The deployment process of some embodiments allocates several different resources of a node when physically mapping a component of the configuration. Some embodiments allocate a specified amount of RAM, CPU cycles, and storage for the particular node. The verification performed at 3330 accounts for all such parameters prior to allocation. Should the necessary amount of resources be unavailable, the deployment process returns (at 3390) the configuration to the scheduler to be rerun.

If the resources at the selected node are available, the deployment process allocates (at 3340) the resources to the particular configuration and the deployment process determines (at 3350) whether the logical assignment of the configuration has been fully allocated. The deployment process will have completed the logical assignment after all nodes specified within the logical assignment have been physically allocated. If the mapping of the logical assignment is not complete, the deployment process selects the next node specified to be allocated and performs the allocation steps described at 3330-3340.

If the mapping is complete, the deployment process verifies (at 3360) the configuration to ensure the allocated configuration operates as specified in the configuration. As a configuration may be distributed amongst several distinct hardware nodes, the deployment process verifies that all such nodes correctly communicate with one another so as to appear as a single server entity. Additionally, some embodiments of the deployment process verify that performance is not impacted due to the distribution across multiple nodes (i.e., excessive latency in the inter-communication between the nodes).

After successful verification (at 3360), the deployment process updates (at 3370) the capacity data of the grid of nodes to reflect that the newly allocated resources are no longer available to other configurations. With the physical allocation of resources complete, the deployment process directs (at 3380) the data collector to begin monitoring the newly deployed or modified configuration. In other words, the deployment process directly initiates the data collector or indirectly places a record of the newly allocated configuration in the database from which the data collector is notified to begin monitoring of that configuration.

Figure 34:
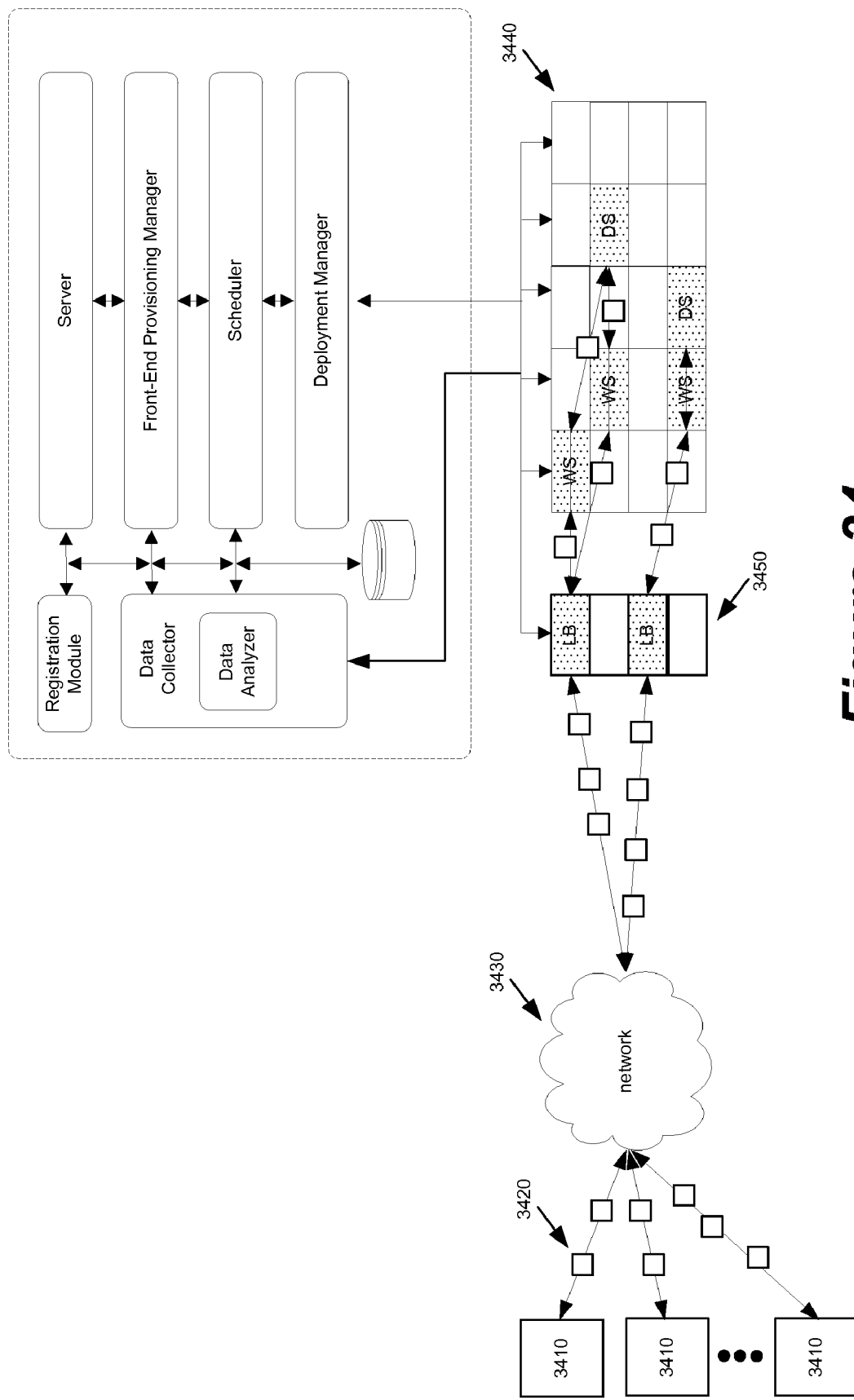
FIG. 34 illustrates a running configuration that receives and processes data requests from set of users after the configuration has been deployed to the grid of hardware nodes by the deployment manager.

FIG. 34 illustrates a running configuration that receives and processes data requests from set of users after the configuration has been deployed to the grid of hardware nodes by the deployment manager. FIG. 34 includes a set of users 3410 that send and receive data 3420 through a network 3430 to the hardware nodes 3440 of the hosting system that implement configuration. As described above, a configuration becomes operational after the deployment manager physically allocates the resources specified within a configuration to the set of hardware nodes 3440. As shown in FIG. 34, the configuration implemented within the set of hardware nodes 3440 includes two load balances 3450, three web servers, and two database servers. The configuration is optimally distributed across multiple nodes, where each node implements a functional component of the configuration.

The set of users 3410 are users that require the services of the configuration 3440. Through the network 3430, the users 3410 send data requests and receive data packets from the running configuration. The users 3410 access the configuration by specifying one or more virtual I.P. addresses of the configuration or by specifying real I.P. addresses of the configuration.

In some embodiments, the users 3410 specify a domain name that is translated to the specific virtual IP address assigned to a load balancer 3450 of the configuration. The packets are then routed through the network 3430 to the set of hardware nodes 3440. As described in the discussion with reference to FIG. 1, the load balancers 3450 of some embodiments are dedicated F5 load balancing server appliances that are independent of the set of hardware nodes 3440, while in other embodiments the load balancers 3450 are components within the grid of nodes 3440.

The load balancers 3450 receive the requests and translate the virtual IP addresses from the outside network into a set of local IP addresses. The local IP addresses specify the locations of the web servers and database servers of the configuration within the grid of nodes 3440 and are therefore used for routing. In some embodiments, some or all of the local IP addresses are internal IP addresses that are not accessible from outside of the hosting system, while other local IP addresses are public IP addresses (i.e., could be accessible from outside of the hosting system) that are tied to the load balancers. In other embodiments, all of the local IP addresses either are private internal IP addresses or are public IP addresses.

A virtual server configuration can include as many components as needed while only requiring a single virtual IP address to access the functionality provided by all such components. As such, the entire configuration appears as a single functional unit to the users 3410. However, some embodiments do not use the load balancers 3450, and therefore have users 3410 interact directly with the web servers implemented on the hardware nodes 3440 by using the real IP addresses assigned to such web servers.

After the nodes 3440 service the requests from the users 3410, the responses are then routed back through the network 3430 to the users 3410 with the virtual IP address or real IP address used as the source address field. As will be described below, as the requests 3420 are processed by the nodes 3440, a certain amount of allocated resources are consumed. Such resource usage is monitored and recorded for purposes of analyzing the performance of the configuration and billing users for the allocated resources and any overage usage of the resources. This monitoring will now be described in Section C below.

C. Data Collector and Data Analyzer

Figure 35:
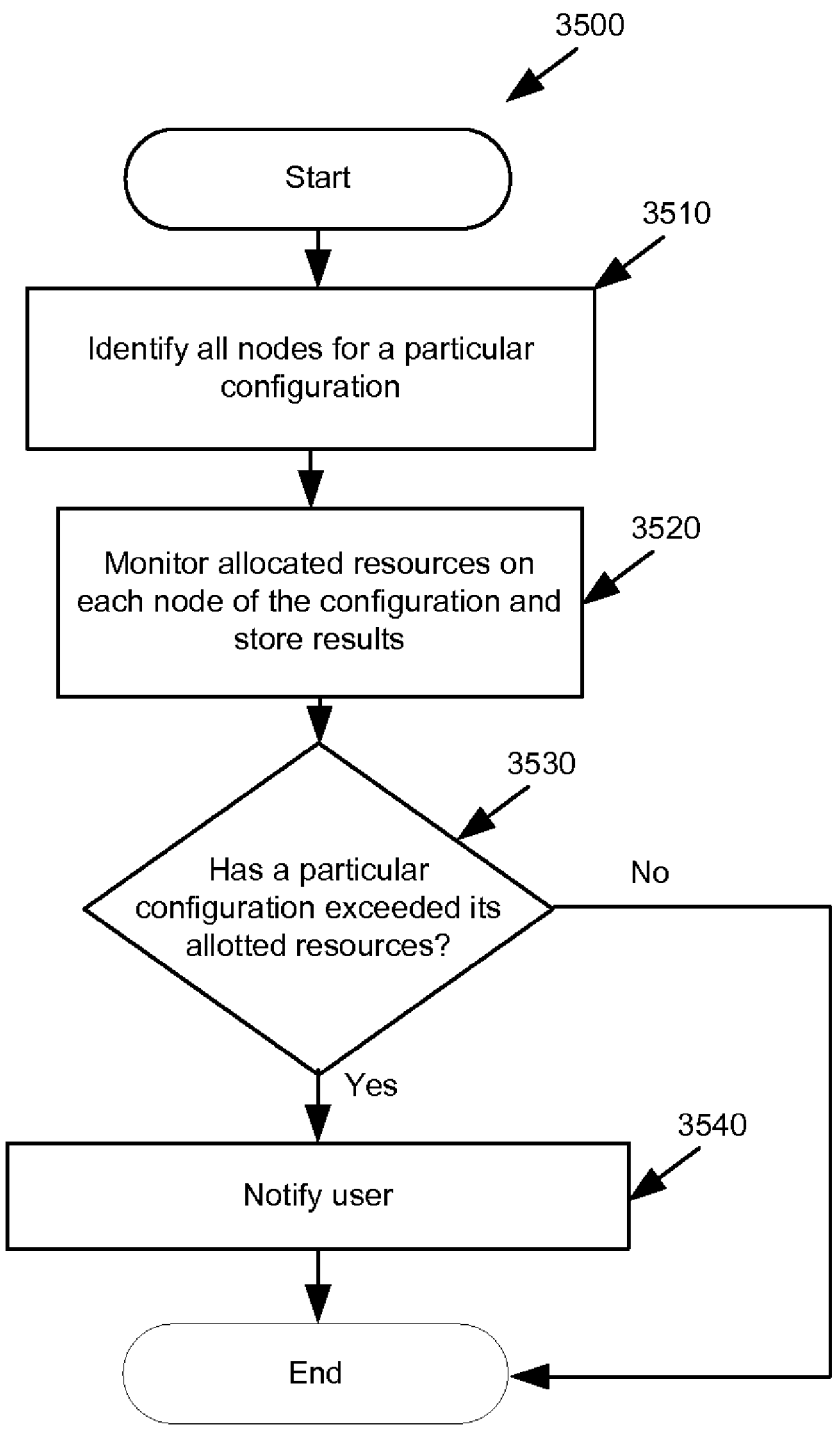
FIG. 35 presents a monitoring process that the data collector of some embodiments performs to track and record the resource consumption of a particular configuration that has been deployed in a node array.

FIG. 35 presents a monitoring process 3500 that the data collector of some embodiments performs to track and record the resource consumption of a particular configuration that has been deployed in a node array. In some embodiments, the data collector performs the process periodically (e.g., once every minute) for each particular deployment.

As illustrated in FIG. 35, the monitoring process 3500 initially identifies (at 3510) a list of nodes allocated to the particular configuration. The process then identifies (at 3520) the amount of resources consumed by the configuration on each node and stores data pertaining to the usage of the resources within a database. Monitoring in some embodiments is performed across a set of parameters (e.g., CPU cycles and allocated RAM). In some embodiments, the set of parameters are user adjustable, though some such embodiments track all available parameters while presenting only the user specified set of parameters to the user. For instance, some embodiments of the data collector collect and record the number of packets entering and exiting a particular configuration, the number of actual bits entering and exiting a configuration, and the amount of allocated RAM while only displaying the amount of allocated RAM to the user.

In some embodiments, the collected data can be used by the data analyzer to identify peak usage times over specified intervals. Such data can further be used to generate trend charts for billing purposes or for customer analysis purposes. The database storing the monitored data therefore contains a historical log for the performance of each configuration. Moreover, the data analyzer can use the monitored data to determine whether the particular configuration has exceeded the amount of resources allocated for the configuration. In some embodiments, exceeding an amount of allocated resources identifies for the user potential bottlenecks within the configuration. For instance, a particular web server may become overrun with data packets and begins to drop packets or the latency to service such packets falls below an acceptable threshold. Alternatively, in some embodiments, a configuration exceeds a particular resource when the user of the configuration is about to pay or begins to pay overage charges due to the configuration consuming more than its allotted set of resources for the particular billing period. For instance, a particular configuration may have been allotted 200 gigabytes of RAM hours, but prior to the end of the billing period, the configuration has already consumed greater than 200 gigabytes of RAM hours. Accordingly, the monitoring process of 3500 identifies (at 3530) that the resources for the configuration have been exceeded.

If during the course of monitoring it is discovered that a particular configuration has exceeded its allocated resources, then the monitoring process notifies (at 3540) the user that an allocated resource has been exceeded. Some embodiments provide notification via email while some other embodiments provide real-time notification to the users via the front-end logic, specifically the "Thrash-O-Meter" described in Section II above. In response to such real-time feedback, a user can allot in real-time additional resources by selecting a plan that provides a larger resource allotment for the particular billing period in order to avoid overage billing. Alternatively, the user can access the front-end logic in real-time to reconfigure the existing configuration.

Reconfiguration allows users the ability to reduce the resource allocation (e.g., the allocated RAM) of underutilized components of an existing configuration. As a result, the total resource consumption of the configuration as a whole is reduced and potential or additional overage charges may be avoided. Reconfiguration also allows users the ability to remove components from a configuration (e.g., deleting a web server) or to pause a component within the configuration so that the paused component is not consuming resources though it is still present within the configuration.

D. Reconfigurability

Monitoring when combined with the ability to reconfigure a custom configuration on the fly provides a powerful tool for the scalability of virtual servers. Such functionality allows users to adjust to changing needs as they occur, resulting in lower operational costs for the users while increasing resources availability across the grid of hardware nodes as users need only allot resources as needed instead of having to allot resources based on a worst case scenario. Moreover, reconfiguration of a configuration can avoid overage charges by allowing a user to scale back an existing configuration so as to reduce resource usage over a period of time as described above. The user can then reconfigure back to the original configuration at the start of a next billing cycle.

In some embodiments, reconfiguration allows users the ability to adjust to expected or unexpected demand. Users can identify potential bottlenecks within the configuration through the "Thrash-O-Meter" described above. Some such bottlenecks occur as a result of a component of the configuration or node having an insufficient resource allocation for the load it is to process.

Figure 36:
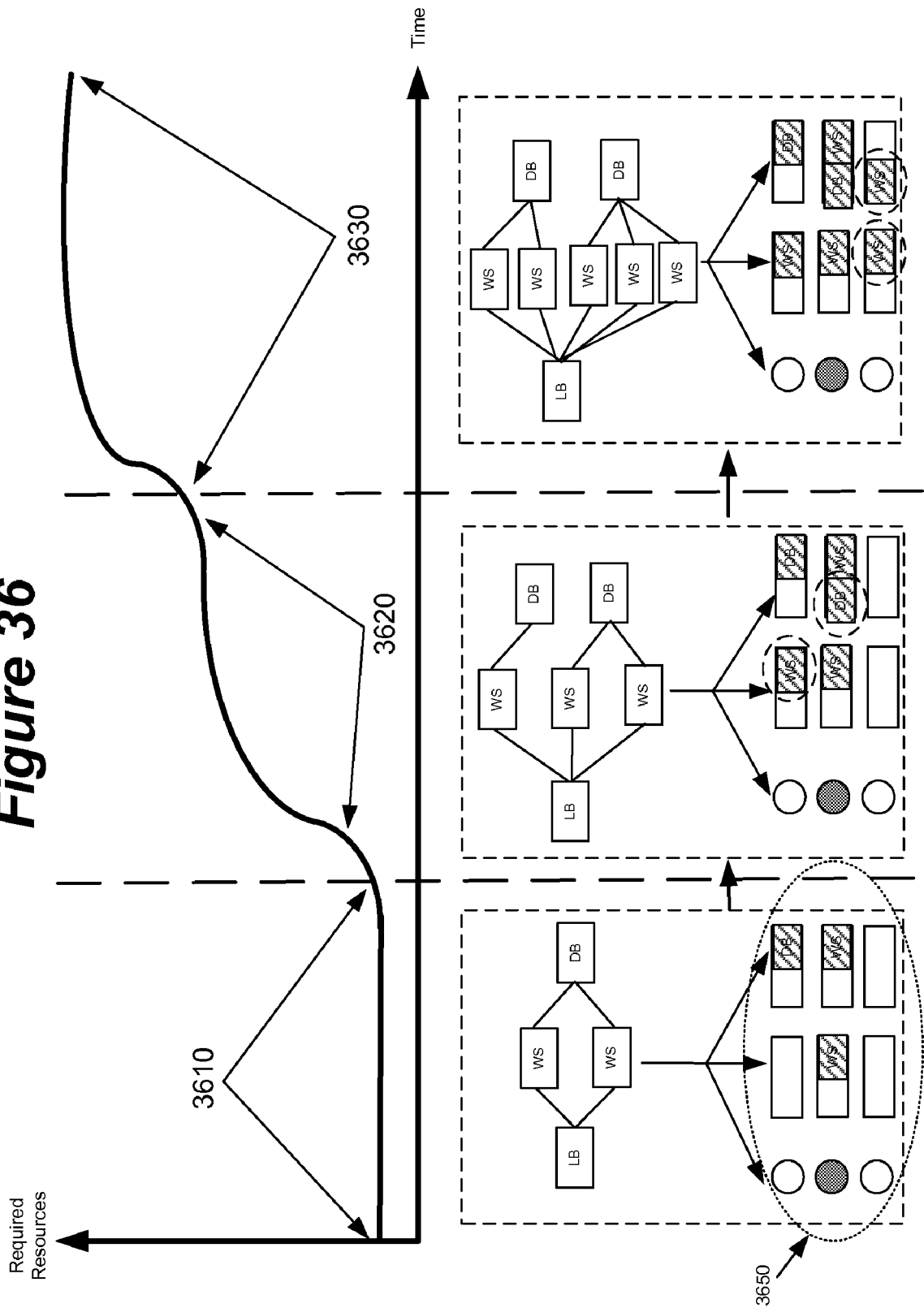
FIG. 36 presents a conceptual illustration for reconfiguring a particular configuration in response to greater resource needs occurring during operation of the particular configuration.

FIG. 36 presents a conceptual illustration for reconfiguring a particular configuration in response to greater resource needs occurring during operation of the particular configuration. As shown in FIG. 36, a configuration (at time 3610) specifies a load balancer, two web servers, and a database server which are mapped and deployed to four nodes in the hardware grid 3650. As the configuration continues to operate, unexpected increases in server resource demand requires additional resources to be added to the configuration in order for continued stable operation of the configuration. Therefore, the user at time 3620 configures additional resources in response to the increased demand. Specifically, the user adds an additional web server and database server to the configuration through the graphical interface provided by the front-end provisioning manager. In real-time, the added resources are then automatically scheduled and deployed to six nodes in the grid of hardware nodes after the user provides the modified configuration.

Accordingly, the user graphically expands or reduces the configuration at any time from any location through the front-end provisioning manager by adding, removing, or modifying components within the configuration or by allocating additional or fewer resources to the existing components within the configuration. Such changes to the physical deployment occur within instants of the user modifying the graphical configuration. Additionally, all such changes within the physical deployment occur without human intervention.

Similarly, at time 3630, the configuration experiences another increase in resource demand. As before, the user dynamically provisions additional resources (e.g., a fourth and fifth web server) to circumvent any performance issues that would otherwise occur in a static configuration which would be unable to timely adjust to the unexpected changes in demand.

Figure 37:
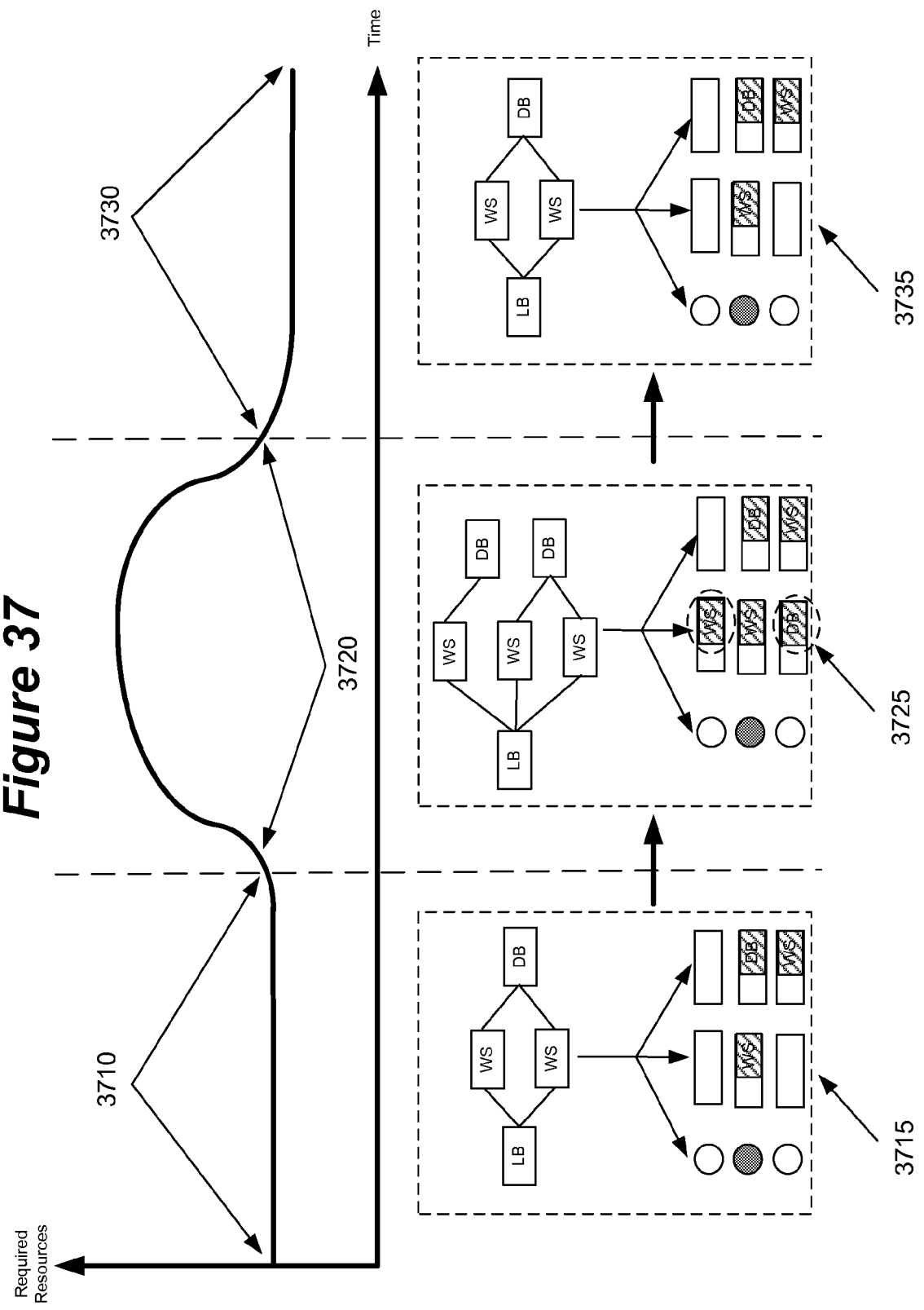
FIG. 37 presents a configuration subject to transient behavior and reconfiguration of the configuration to meet such transient behavior.

The reconfiguration functionality provided by some embodiments further provides users the ability to adjust a configuration to accommodate for expected transient behavior. For instance, some users are able to predict when peak loads or spikes in demand are likely to occur. In some such embodiments, such anticipated resources needs fluctuate during certain periods of the day or during specific intervals of the year, such as the holiday season. The reconfiguration functionality provided by some embodiments allows users to granularly scale and rescale their hardware resources in accordance with such anticipated resource needs as they occur and readjust as they dissipate. In this manner, users need not wastefully allocate resources over an entire billing period simply to account for those intervals where traffic is likely to peak. Such static configurations must account for worst-case scenarios as opposed to the on-the-fly reconfiguration functionality provided by some embodiments. The on-the-fly reconfiguration of some embodiments allows users to adjust their needs as they occur. In this manner, users need only allocate resources for present demand and can readjust the configuration in response to future demand as it occurs. FIG. 37 presents a configuration subject to transient behavior and reconfiguration of the configuration to meet such transient behavior.

As illustrated in FIG. 37, the data collector monitors the transient behavior of a particular configuration. Over a period of time 3710, the configuration experiences a steady traffic pattern for which the configuration 3715 of one load balancer, two web servers, and a database server is able to service.

During a period of time 3720, the configuration experiences a spike in traffic that results in the overwhelming of allocated resources of the initial configuration. As described above, such transient behavior may be expected during certain seasons or time periods of the day. Typically, users would have to allot a static set of resources in anticipation of a worst case scenario. Such resources would be fixed for a particular period of time in order to protect the user against such spikes. Should the user desire to expand the configuration within that fixed period of time, the user will have had to acquire the resources at the start of the static period. This type of resource allocation is inefficient and cost prohibitive to many users who are either unable to accurately predict future needs or growth or are unwilling to pay for resources that go wasted for the majority of the static period.

However, the dynamic reconfiguration provided by some embodiments allows users to meet demand as they occur. To accommodate the increased demand, the user at time 3720 increases the resources allocated to the configuration for the duration of the transient behavior. In FIG. 37, an additional web server and database server have been allocated to the configuration. Moreover, the load balancer has been reconfigured to include the added web server when balancing the traffic.

As the ebb of increased traffic subsides at time 3730, the increased capacity allocated during time 3720 is no longer necessary. Therefore, at time 3730, a second reconfiguration occurs and the configuration is restored to the original configuration of time 3710. In this manner, only the required amount of resources is ever assigned to a particular configuration. As such, users need not waste funds on allotted resources to cover a worst case scenario over an entire billing period. Rather, users pay for allocated resources based on their individual needs and behavior.

Similarly, the reconfiguration functionality provided by some embodiments allows for new functional components of a configuration to be staggered into already existing configurations at any time without requiring the user to pay for the resources ahead of time. In this manner, users can implement a basic service as they continue to develop their business model. As new functional pieces are generated, they can be deployed as needed and additional resources can be purchased as needed. Moreover, if a user needs to fine tune an existing configuration without interrupting service or quickly deploy and modify existing configurations with little to no downtime, the reconfiguration functionality of some embodiments facilitates such services as the reconfiguration is automatedly performed by machine logic specified in the scheduler and deployment manager without human intervention.

In some embodiments, reconfiguration is the additional resource allocation to the existing configuration. For instance, a user may specify allocating additional RAM to an already existing component in order for that particular component to have added computational power. In some embodiments, reconfiguration is the addition of new components to the existing configuration. In some such embodiments, users specify new functional components to be added to the existing set of components. For instance, the user adds a new web server to the already existing configuration, where the new web server integrates with the existing set of web servers. It should be apparent to one of ordinary skill in the art that one may increase the already allocated resources and introduce new components at the same time. Similarly, users may reduce and delete unneeded resources from the already existing configuration.

Reconfiguration occurs through the same or similar interface used to specify the initial configuration. Therefore, a user accesses the front-end manager through a web-browser and pulls up an existing configuration. The user graphically specifies adding new components, removing existing components, or modifying existing components through the graphical interface (i.e., multi-server control panel).

Modification of existing components further includes the ability to rearrange the configuration structure. For instance, first, second, and third web servers access a first database server and a fourth web server accesses a second database server. During reconfiguration, a user can disconnect the third web server from the first database server and instead connect the third web server to the second database server in order to relieve congestion on the first database server.

The modified configuration is then passed to the scheduler based on some triggering event, such as the user selecting a graphical item to setup the configuration. As before, the scheduler maps the components of the configuration to hardware nodes by creating an optimal logical assignment to maximize performance of the configuration and maximize the hardware node resources.

In some embodiments, the scheduler only identifies the affected components and the associated hardware nodes on which the components reside. If the affected components and nodes operate independent of the other components or nodes of the configuration then the scheduler can perform the reconfiguration without impact or regard to the other components. For example, a first web server, a first data server, and a first database server for performing a first set of operations reside on a first node, while a second web server, second data server, and second database server for performing a second set of operations reside on a second node. Should the reconfiguration specify doubling the capacity of the first set of components by duplicating each component, then the scheduler retrieves an image used to create the first set of components and passes the image to the deployment manager which ghosts or copies the image to the same or different node. Once installed, the copied image is configured to operate in conjunction with the other components. The newly allocated resources begin operation in conjunction with the other sets of components. Such reconfiguration occurs while the other sets of components continue to operate. Moreover, such reconfiguration occurs without human intervention and with minimal interruption to the existing running configuration.

In some embodiments, reconfiguration may require suspension of operation for one or more components of an existing configuration. For instance, some embodiments allow users to introduce a load balancer to evenly distribute traffic to previously configured web servers. In some such embodiments, introduction of the load balancer requires the web servers to be taken offline as the web servers must be reconfigured to interface with the load balancer instead of directly receiving the traffic.

However, some embodiments are able to reduce the impact caused by suspending active components of a virtual server by duplicating the previous configuration. The duplicate configuration can then be modified while the current configuration continues to operate. Once the modified duplicate configuration is complete, the modified configuration is activated on a new set of hardware nodes and the previous configuration is deactivated and removed from the previous set of hardware nodes. In this manner, some embodiments allow reconfiguration to occur almost instantaneously with no interruption in service.

Moreover, some embodiments of the invention provide a method for automatically reconfiguring a configuration in response to increased or unexpected demand. In some such embodiments, users select a parameter to specify automated reconfiguring of a configuration should demand exceed the set of allocated resources.

Figure 38:
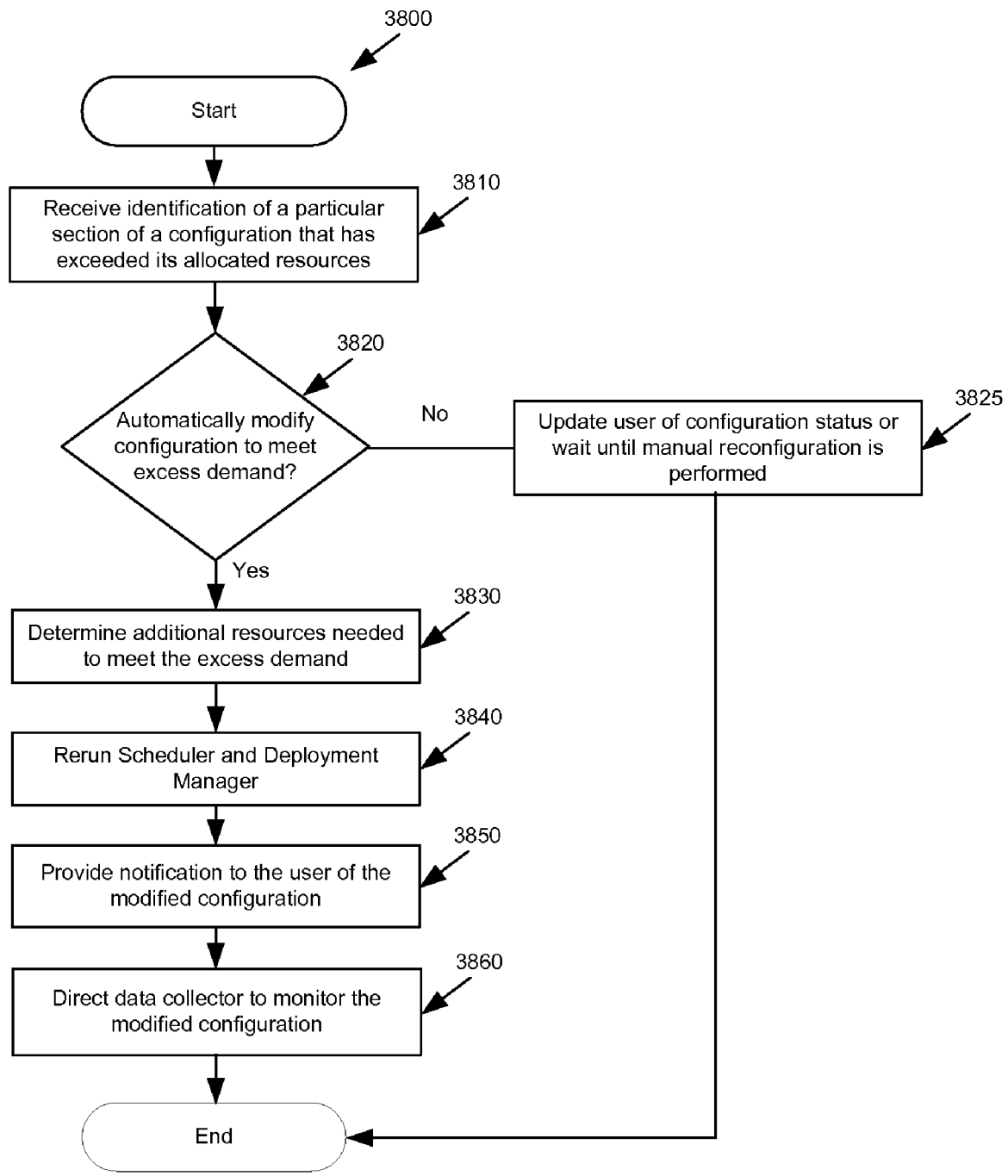
FIG. 38 presents an automated reconfiguration process that conceptually illustrates several operations for performing an automated reconfiguration of an existing configuration.

FIG. 38 presents an automated reconfiguration process 3800 that conceptually illustrates several operations for performing an automated reconfiguration of an existing configuration. In FIG. 38, the automated reconfiguration process initially receives (at 3810) notification of a configuration that has or is likely to exceed its allocated resources. The process determines (at 3820) whether the particular configuration should be automatically modified to meet the excess demand. If the process determines (at 3820) that the configuration should not be automatically reconfigured, the user is notified (3825) of the configuration status via the Thrash-O-Meter or email updates and the user may manually reconfigure the configuration as described above.

However, if the process determines (at 3820) that the configuration should be automatically reconfigured, the process determines (at 3830) the additional resources needed to meet the excess demand. Such additional resource allocation can be determined beforehand based on the statistical data received from the data collector and the data analyzer. For instance, the data analyzer may identify a single critical point within the configuration that creates a bottleneck. In response, the process automatically assigns additional resources to that particular resource without having to perform an analysis of or a reassignment of the entire configuration.

With the additional resources determined, the process reruns (at 3840) the scheduler and deployment manager to perform the logical assignment and physical mapping of the configuration to the hardware nodes based on the modified configuration. The process notifies (at 3850) the user of the changes to the configuration and the process directs (at 3860) the data collector to monitor the modified configuration.

Accordingly, the scheduler and deployment manager facilitate the reconfiguring of existing configurations whether through user reconfiguration or automatic reconfiguration. In both cases, by removing manual intervention from the functionality of the scheduler and deployment manager, the resulting downtime from such reconfigurations is reduced to an acceptable level where the impact to users or their business is minimal or non-existent.

Figure 39A:
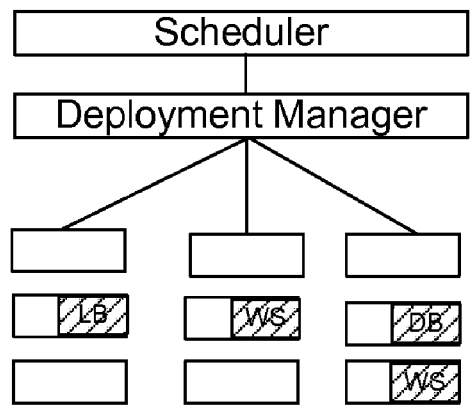
FIG. 39A conceptually illustrates fault-tolerant safeguards provided by a distributed configuration where the configuration is shown prior to node failure.
Figure 39B:
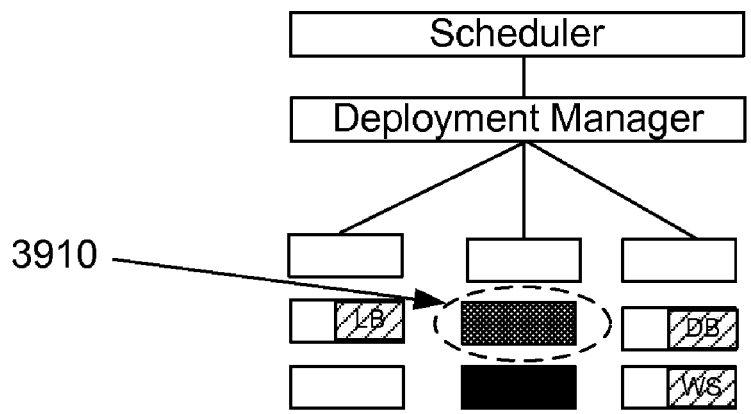
FIG. 39B conceptually illustrates fault-tolerant safeguards provided by a distributed configuration where the configuration is shown during a node failure.
Figure 39C:
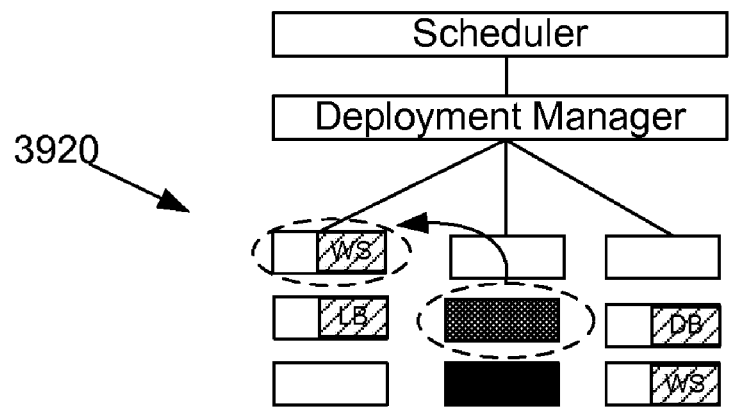
FIG. 39C conceptually illustrates fault-tolerant safeguards provided by a distributed configuration where the configuration has been reconfigured to operate over functioning nodes.

In some embodiments, the reconfiguration functionality is used to provide failsafe or fault-tolerant safeguards to user configurations. FIGS. 39A-39C conceptually illustrate a fault-tolerant safeguard provided through reconfiguration.

As illustrated in FIG. 39A, a configuration comprising a load balancer, two web servers, and a database server is distributed across multiple hardware nodes. Distribution of a configuration across multiple hardware nodes minimizes the impact that a single failing node has on the overall functionality of the configuration. Accordingly, in the event of a node failure, the particular component or functionality provided by the failing node will be lost, though the remaining components can continue to function.

To recover from such a failure, a typical scheduler would take offline the remaining functional components of the user configuration and reallocate all the functional components of the configuration. However, some embodiments of the invention leave the non-failing components operational and only reallocate the failing component. By only reassigning and reallocating the single point of failure, downtime for the entire configuration is minimized.

Specifically, in FIG. 39B, two hardware nodes 3910 within the grid of nodes fails. In particular, one of the failing nodes facilitated a web server of the configuration. Due to the distribution of the configuration across multiple nodes, the failure of the nodes 3910 causes the configuration to lose one of its two web servers. However, the other non-failing web server can continue to service the entire configuration until the failing web server is restored.

Nevertheless, by providing the reconfiguration functionality, some embodiments, as illustrated in FIG. 39C, reassign and physically allocate the web server on the failing node to a different functional node with sufficient resources to service the reassigned and reallocated components. In FIG. 39C, the web server on failing nodes 3910 is reconfigured to be assigned and allocated to the functional node 3920.

In reallocating the components of the failing node, some embodiments also reallocate the software image present on the failing node to the functional node. Typically, failsafe mechanisms store the software images (e.g., the operating system and application programs) in a centralized location such as a storage area network (SAN). Therefore, when a hardware node fails, the image is located within the SAN and modified so that the new functional hardware node can come and access the software image from the SAN. However, in such scenarios, if the SAN was to fail then all configurations would fail as the SAN is a single critical point where the software images for all configurations reside. Therefore, to better provide failsafe mechanisms, some embodiments also copy the software image to each node locally and in this manner the nodes are not dependent on a centralized storage area or SAN for the software configuration. Accordingly, when a component of a failing node is reallocated to a functional node, the software components associated with that failing node are similarly reallocated to the functional node.

Figure 40:
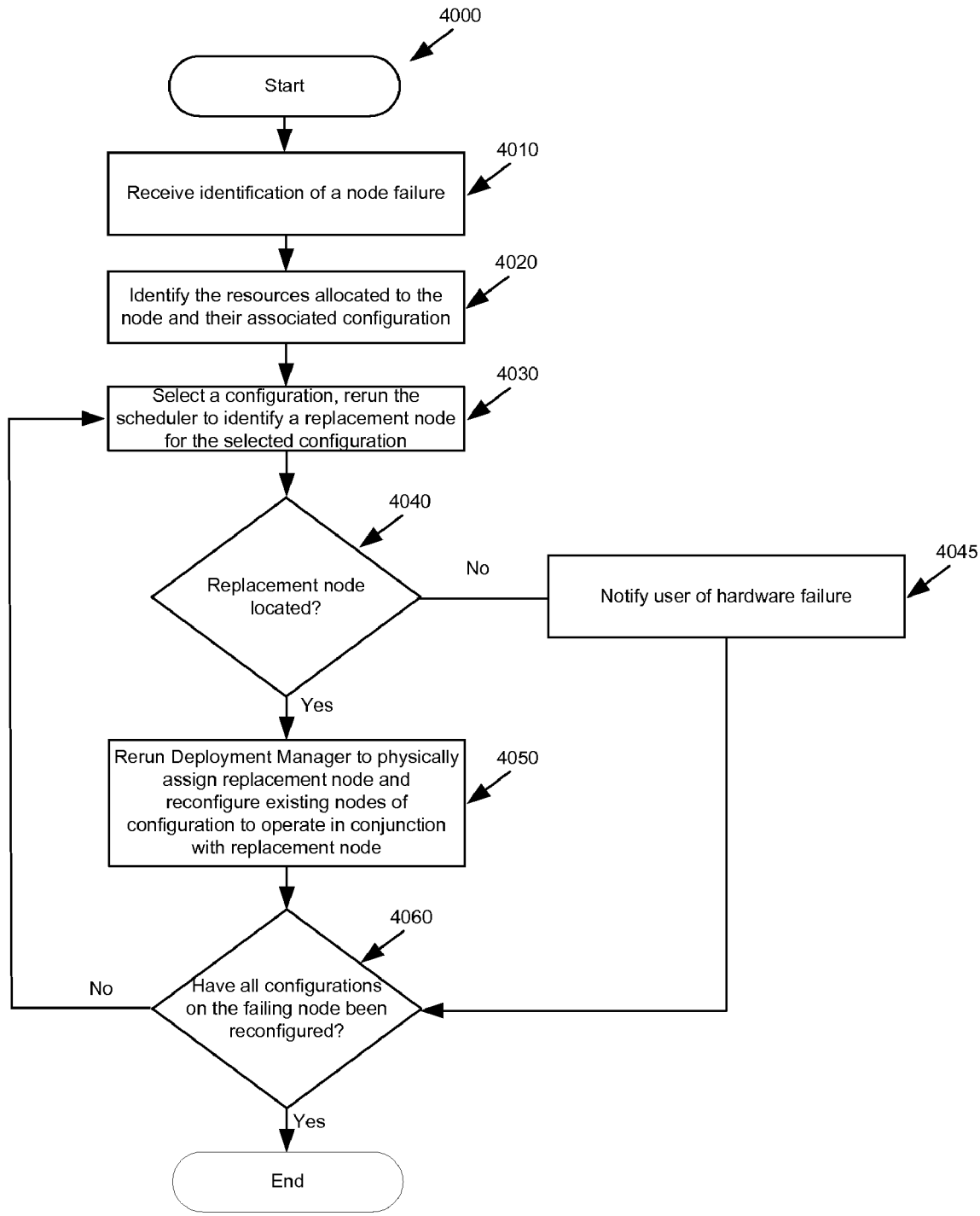
FIG. 40 presents a process that conceptually illustrates several operations for providing failsafe reconfigurability in accordance with some embodiments of the invention.

FIG. 40 presents a process 4000 that conceptually illustrates several operations for providing failsafe remapping in accordance with some embodiments of the invention. The process commences when the data collector identifies and provides (at 4010) notification of a node failure. After the process identifies the failing node, the process then identifies (at 4020) the resources allocated on the particular failing node and the configurations associated with the allocated resources. In some embodiments, assignment information is stored within a database, therefore a query identifying the particular failing node reveal information as to which configurations have resources allocated to that particular node.

For a particular configuration identified on the failing node, the process reruns (4030) the scheduler in order to identify a functional node that is a suitable host for the resources that were previously assigned to the failing node. If the scheduler cannot locate (at 4040) a replacement node, the scheduler issues (at 4045) a notification to the user and then determines (at 4060) whether other components of the configuration operating on the failing node can be relocated. However, if the scheduler locates (at 4040) a replacement node, the deployment manager is called and rerun (at 4050) to physically assign the component on the failing node to a functional node. In this manner, only the failing components of a configuration are reassigned and reallocated, therefore making the recovery process efficient while minimizing the downtime for a particular user.

Some embodiments perform the reassignment by remapping backup images for the failing node using the unallocated resources of other functioning nodes. For instance, the scheduler stores images of the software and hardware configurations for each node in the grid of nodes. Moreover, some embodiments contain multiple images for each node, where the multiple images are for each separate configuration that has at least one component operating therein. During a hardware node failure, these images are retrieved and reallocated to one or more functional nodes with unused or unallocated resources. However, one of ordinary skill in the art will recognize that remapping in this manner, may cause other functioning nodes to remap as well, as components on which they depend are now located elsewhere on other nodes.

Referring back to FIG. 40, the remapping process described with respect to steps 4030-4050 occurs (at 4060) for every configuration with at least one component allocated to the failing node until all such configurations have been remapped to functioning nodes.

IV. Billing

In some embodiments, the hosting system 100 provides a method for billing for hosting a server configuration. Some such embodiments provide a method for billing users based on an amount of one or more resources allocated for a particular configuration over a period of time. Some embodiments track the resource usage (e.g., memory usage) at particular intervals of the billing period in order to determine the total allocated usage for the billing period. Additionally, some embodiments determine a billing amount based on a projected usage of one or more resources of a configuration over the time interval of the billing period. Therefore, when a user initially specifies a configuration, the total amount of resources that would be used if the configuration remains unaltered throughout the billing period is determined and compared against an amount of resources allotted to the user at the beginning of the billing period. Based on the resource projection, some embodiments identify resource allotment plans for the user to satisfy the resource demand of a configuration as determined by the parameters specified within the configuration.

Some embodiments perform dynamic billing so as to avoid billing a user for excessive overages when a particular configuration exceeds its allocated resources for a specified period of time. Typically, a hosting service contains static billing services. Such static billing services bill irrespective of the actual usage of the allotted resources. Accordingly, some users pay for resources that are never utilized within a billing period. Additionally, some such static billing services compute allocated amounts of resources at the end of the billing period. In this manner, such static billing services do not notify users when they have exceeded their usage allotment. As a result, some users unknowingly accrue excessive overage penalties for resources used in excess of their billing period allotment.

However, some embodiments provide dynamic billing that is able to notify users when the procured allotment is nearly exhausted. Such dynamic billing provides safeguards to avoid accruing overages by enabling the user to alter the configuration or the billing plan. Therefore, based on the preemptive notification, some embodiments allow users the ability to procure additional resources for the billing period or scale back a current configuration (e.g., reduce allocated resource of a component of the configuration or disable a particular component of the configuration) prior to having the configuration exceed the currently allotted set of resources.

In some embodiments, the dynamic billing performs automated safeguards to prevent excessive overage billing. In some such embodiments, a user configuration that has exceeded its set of allotted resources is automatically restricted from further operation once a certain overage threshold is reached. In some embodiments, a restricted configuration is fully disabled or cut-off from the set of hardware nodes, while in other embodiments a restricted configuration has its allocated resources throttled down so that excessive overages are avoided or within an acceptable level.

In order to provide dynamic billing, some embodiments continually monitor the allocated configurations by taking periodic snapshots of the resource allocation (e.g., memory allocation) for each configuration. In this manner, some embodiments monitor in real-time the activity occurring across the configurations and are thus able to monitor billing charges in real-time. In some embodiments, users specify an automatic cut-off or throttling threshold parameter to be used by the system as a triggering event that performs a series of operations when triggered during resource monitoring. In other words, some embodiments allow users to specify acceptable amount or percentage of overages before the cut-off parameter is triggered.

A. Billing Based on Projected Usage

In some embodiments, users select payment plans that allot specified amounts of at least one resource at the beginning of a billing period or before the deployment of a configuration. In some such embodiments, users distribute the monthly allotment of resources across the components of their configuration. For instance, if the plan allots 1 gigabyte of RAM hours for a billing period, the user can distribute 512 megabytes of RAM for the billing period hours across two web servers or can distribute 256 megabytes of RAM hours for the billing period across three web servers and one data server.

After some or all the allotted resources have been distributed throughout a configuration, some embodiments project the allotted resources over a billing period to provide an early warning as to whether the allocated resources are likely to exceed the allotted resource sometime within the billing period. In addition, some embodiments specify billing intervals within the billing period. During each billing interval, the configuration is monitored for usage and changes. Should a configuration exceed its allotted set of resources, the incremental billing intervals allow some embodiment to provide real-time notification to the users when the resources have been exceeded. Users can then modify their configurations at any time during a billing period on an "as needed" basis.

A typical hosting system statically allots a fixed amount of a resource (e.g., 1 gigabyte of RAM) to a particular component for an entire billing period (e.g., one month) irrespective of whether the configuration ever uses the fixed amount of the resource (e.g., the full 1 gigabyte of RAM). Some embodiments, on the other hand, dynamically allot resources of the hosting system over a time interval of the billing period. For instance, some embodiments dynamically allot memory hours over an entire billing period. Specifically, in some such embodiments the allotted memory hours refer to an amount of RAM that can be allotted per hour. In some such embodiments, the RAM hours can be provisioned in any manner to any components of the configurations. Additionally, the RAM hours can be adjusted every hour in response to changes in traffic patterns or demand. In some embodiments, a periodic snapshot (e.g., every hour) of the configuration will be taken to determine the amount of RAM configured over the snapshot period. Every period reduces an amount from the allotted amount specified within the billing plan. In this manner, users need only pay for the resources they allocate and can adjust to spikes in traffic by allocating additional resources as-needed.

For instance, a user might select a plan with 900 gigabytes of RAM hours, which can be distributed and re-provisioned at any time during a one-month billing period. The incremental billing of some embodiments permits the user to allot 2 gigabytes of RAM to a particular component of the configuration for 360 hours of the month (i.e., one half of the entire month) and then allot only 512 megabytes of RAM to the particular component of the configuration for the remaining 360 hours of the month. At the end of the month, the user will have dynamically consumed the total 900 gigabytes of RAM hours in an efficient manner as allotted resources need not be wasted during non-peak hours of operation as would otherwise occur with traditional static resource allocation.

Figure 41:
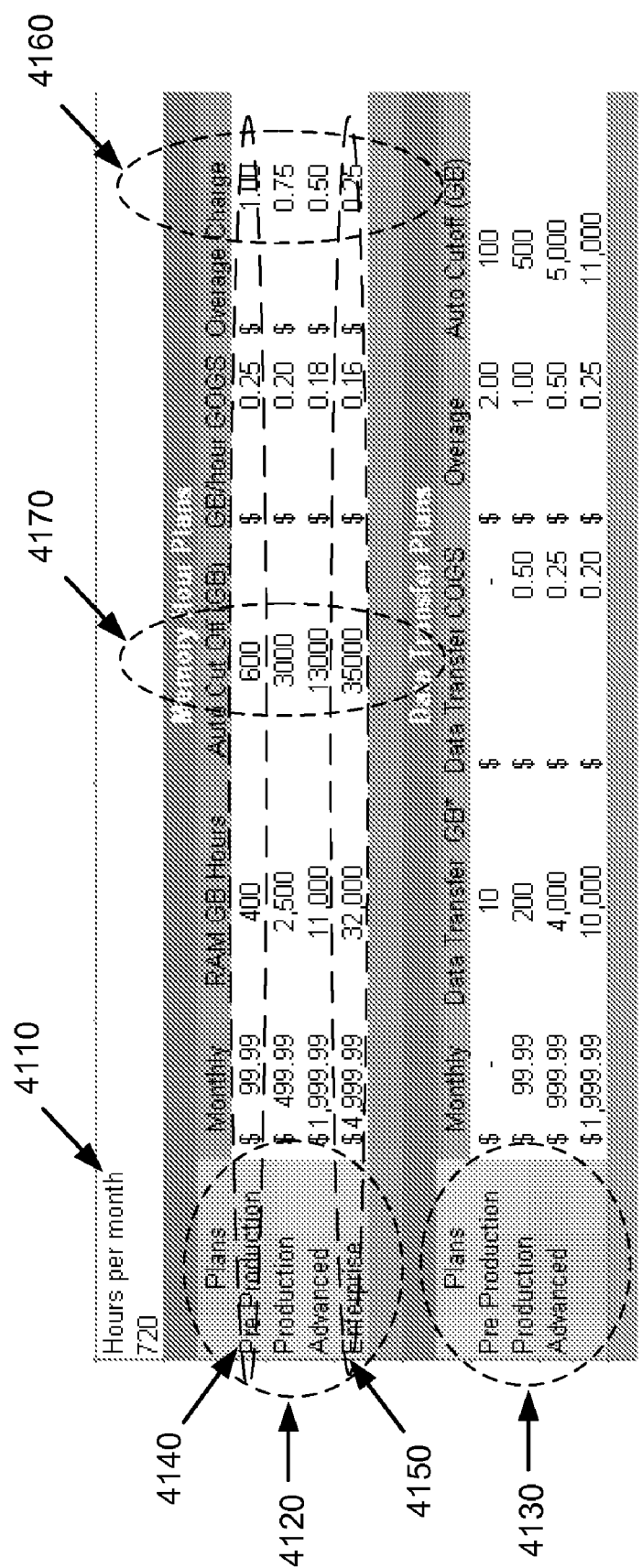
FIG. 41 illustrates various resource allotment plans of some embodiments to be used in accordance with the period billing procedure described above.

FIG. 41 illustrates an example of various resource allotment plans of some embodiments that are used in accordance with the incremental billing period procedure described above. In FIG. 41, field 4110 specifies a billing period of one month with incremental intervals of one hour.

In FIG. 41, the resource allotment plans include memory based plans (e.g., gigabytes of RAM hours) 4120 and data transfer based plans 4130 for specifying different resources that are allocatable over the incremental intervals of 4110. The memory based plans 4120 specify four different resource allotment plans based on a first resource (e.g., memory hours). Such plans track the amount of RAM allocated to a configuration at each interval of the billing period 4110 and bill the user accordingly. Each plan includes certain parameters such as a price for an amount of allotted gigabytes of RAM hours per billing period, a cut-off parameter 4170, price per gigabyte RAM hour, and overage use fees 4160. By billing based on memory hours and other resources (e.g., data transfer hours) other than the commonly used metric of CPU cycles, some embodiments provide for a flexible distribution of resources that results in better sharing of other resources of a single device. For instance, in a CPU allotment scheme, if two configurations each specify 50% of the CPU clock cycles, then neither configuration ever receives the full computing potential of the processor. However, in some embodiments of the memory hour scheme, the full computing potential of the processor is available to all configurations. Additionally, having such different dimensions available for billing provides some embodiments a more accurate billing method that can be tailored based on different parameters of a configuration.

In some embodiments, the data transfer based plans 4130 specify resource allotment plans based on a second resource (e.g., data transfer). Such plans track the amount of incoming and outgoing traffic of a configuration at each interval of the billing period 4110 and bill the user accordingly. Each data transfer plan 4130 includes some of the same parameters as the memory plans 4120, but also includes parameters specific to data transfer (e.g., gigabytes of data transferred). It should be apparent to one of ordinary skill in the art that a resource allotment plan of some embodiments may specify allotting two or more resources over a billing period. Moreover, additional resource allotment plans may be added or used in place of the memory hour 4120 and data transfer plans 4130 described above. For instance, some resource allotment plans specify storage hours as the resource allotment plan.

The different parameters of the resource allotment plans determine how to bill the resource usage of the particular configurations over the billing period 4110. For instance, plan 4140 includes allotting 400 gigabytes of RAM hours over the billing period 4110 for a fee of $99.99. Therefore, the user can allocate the 400 gigabytes of RAM hours to any set of components of a configuration and can readjust the allocations so long as the total sum of allocated RAM hours over the billing period 4110 does not exceed 400 gigabytes of RAM. However, should the allocation exceed the specified allotment, some embodiments of the resource allotment plans include an overage charge parameter 4160 that specifies an amount to be billed should the user configuration exceed the allotted amount of resources under the selected package. In some embodiments, the overage charges are computed at a specified overage interval within the billing period. Specifically, some embodiments compute overage charges on a daily basis.

For instance, if the user selects the resource allotment plan of 4140 which allots 400 gigabytes of RAM hours for a billing period and over the billing period the user configuration actually utilizes 500 gigabytes of RAM hours, then the user will be billed an additional 100 hours of overage gigabyte RAM hours at the overage rate of $1 per gigabyte RAM/hour as specified by the overage charge parameter 4160. Therefore, if the overage interval is daily and if 60 gigabytes of overage RAM hours occurred on the second to last day of the billing period, then the user is billed $60 for 60 hours of gigabytes of overage RAM hours on the second to last day of the billing period. Furthermore, if 40 gigabytes of overage RAM hours occurred on the last day of the billing period, then the user is charged $40 on the last of the billing period.

The resource allotment plans of some embodiments also include an automatic cut-off parameter that works in conjunction with the overage charge parameter. With reference to resource allotment plan 4140, the automatic cut-off parameter 4170 restricts the amount of overages that a single configuration can accrue within a single billing period. Specifically, the automatic cut-off parameter 4170 for the resource allotment plan of 4140 specifies a cut-off at 600 gigabytes of RAM hours. Therefore, should a user configuration on the resource allotment plan of 4140 hit the cut-off at 600 gigabytes of RAM hours, some embodiments of the invention will restrict the resources for the configuration or completely disable the configuration.

As further described below, some embodiments also impose an automatic cut-off at other instances. For instance, some embodiments automatically cut-off some or all of the hosting services when the configuration accrues a specified number (e.g., three) days of overage charges that cannot be successfully charged to the user's credit card.

Accordingly, the automatic cut-off parameter 4170 provides safeguards so that the customer is not billed excessive amounts of overages resulting from expected or unexpected spikes in traffic. Furthermore, the automatic cut-off parameter 4170 provides safeguards for the system and other configurations, as the scheduler of some embodiments assigns configurations to particular nodes based on expected resource allocation for the configuration. Therefore, should a configuration greatly exceed its resource allocation, other configurations operating within the same node may become detrimentally affected as fewer resources are now available due to the unexpected usage by the configuration with excessive overages.

In some embodiments, the resource allotment plans described above are used by the data collector 160 and the data analyzer 180 to perform billing services. In some embodiments, billing services are initiated at the time the user specifies the graphical representation for the server configuration. FIG. 42 presents a process 4200 that conceptually illustrates several operations performed by the data analyzer 180 to compute projected usages (i.e., projected billings) at the time that a user is specifying a configuration. In some embodiments, the process of FIG. 42 occurs either when the user is initially specifying the configuration or in modifying a previously specified configuration (e.g., by adding or removing components or by modifying the parameters of existing components).

The process 4200 begins by identifying (at 4210) the resource allotment plan that the user has selected. This plan specifies an amount of allocated resources for a particular configuration over a billing period. The process next identifies (at 4220) for each component of the configuration, the allocated amount of resources assigned to each component of the configuration. In some embodiments, the quantifiable allocated resource includes the amount of RAM hours (i.e., memory hours) allocated to a component. In some embodiments, the quantifiable allocated resource for a particular component includes not only the amount of allocated RAM hours, but also an amount of allocated storage hours, data transfer hours, and/or any other resources that can be quantifiably monitored for a particular component.

After determining (at 4220) the allocated resources for each component of the configuration, the process projects (at 4230) the total usage of RAM hours and other monitored resource hours for all components over the billing period based on the components enumerated for the configuration. Therefore, if a configuration includes three web servers with a first web server having 512 megabytes of allocated RAM hours, a second web server having 1 gigabyte of allocated RAM hours, and a third web server having 1.5 gigabytes of RAM hours, then the aggregate sum of the allocated resource over the entire configuration is 3 gigabytes of RAM hours. This aggregate value is then projected across the one-hour incremental billing interval for the entire one-month billing period to result in 2160 gigabytes of RAM hours.

The process compares (at 4240) the projected resource usage computed at 4230 to the amount specified within the user's selected resource allotment plan. If the projected usage exceeds the amount specified within the resource allotment plan, then the process notifies (at 4250) the user of the projected excess usage and recommends that the user select a resource allotment plan that more effectively meets the users desired capacity for the billing period. The process then provides (at 4260) the user the option to select the larger resource allotment plan. Additionally, the user may modify the configuration so that various components within the configuration consume fewer resources. Should the user select a larger allotment package or modify the configuration to allocate fewer resources, the process re-projects the resource usage over the billing period based on the newly selected resource allotment plan. However, should the user decline (at 4240) to upgrade or modify the configuration, the process terminates. However, so long as the projected usage exceeds the resource allocation in the user's selection plan, some embodiments continually present the notification provided at 4250 in the multi-server control panel whenever the user accesses the hosting system to monitor the configuration.

Figure 43:
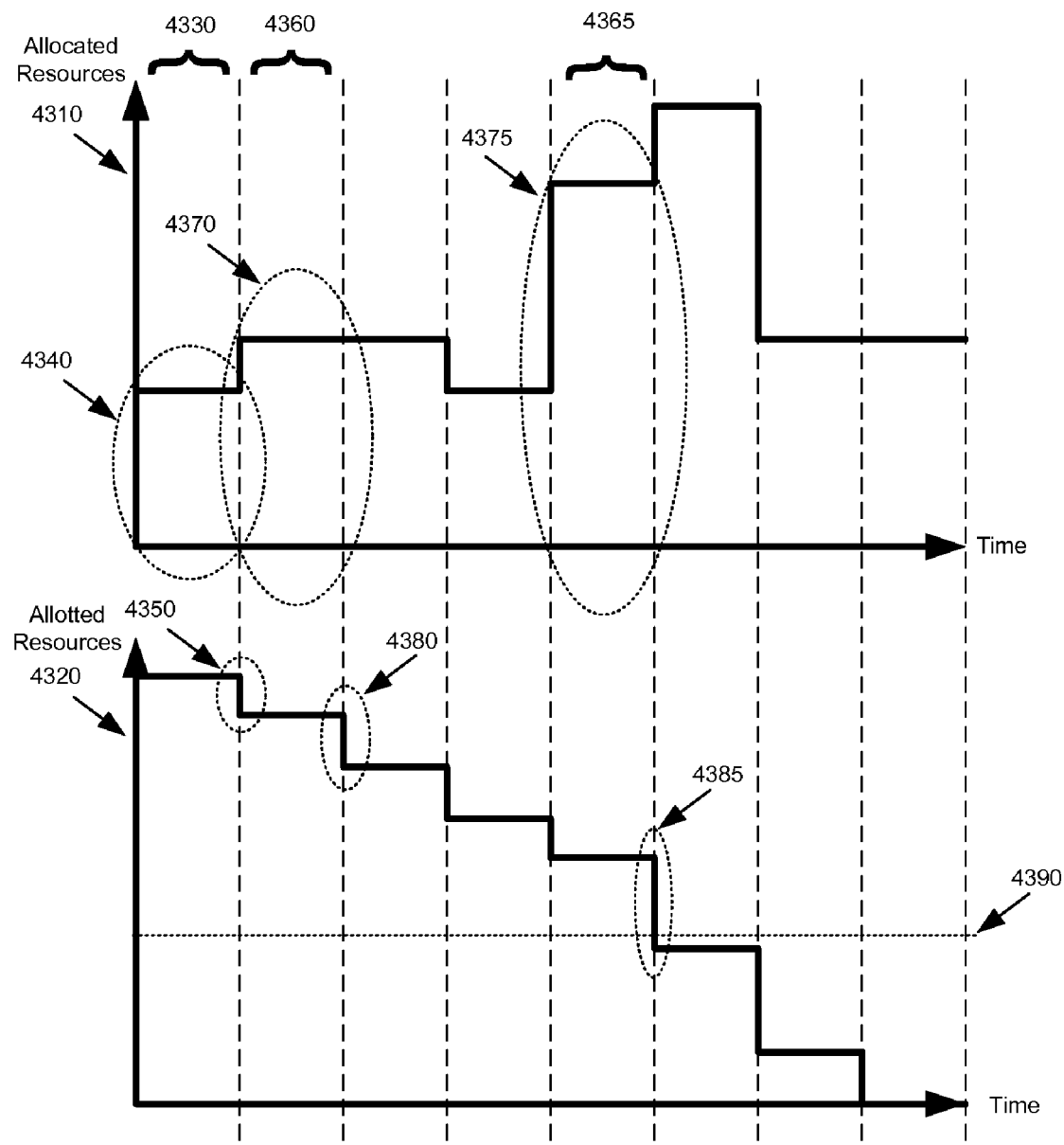
FIG. 43 conceptually illustrates some embodiments of the data collector and data analyzer tracking the resource allocation and providing notification when the particular resource allocation of a configuration reaches certain criteria.

The billing computations specified in FIG. 42 included projections for the amounts of allocated resources before deployment of the configuration. However, some embodiments of the data collector in conjunction with the data analyzer track the actual resource allocation of the configuration in order to account for changes in resource allocation throughout the billing period. FIG. 43 conceptually illustrates some embodiments of the data collector and data analyzer tracking the resource allocation and providing notification when the particular resource allocation of a configuration reaches certain criteria.

FIG. 43 includes a first graph 4310 that illustrates the resource allocation for the particular configuration over a single billing period. The billing period of FIG. 43 is divided into eight distinct billing sub-intervals. In conjunction with the resource configuration graph 4310, a second graph 4320 illustrates the amount of a resource allotted to the particular configuration for the particular billing period based on a selected resource allotment plan. Therefore, during each billing sub-interval, the total resource allotment is reduced by the actual amount allocated within the configuration shown in graph 4310.

During the first billing sub-interval 4330, the configuration shown in graph 4310 specifies allocating an amount 4340 of the resource. The total available allotment of the resource is then updated in graph 4320 by an amount 4350 corresponding to the amount 4340 allocated to the configuration during billing interval 4330. During billing sub-interval 4360, the user may have manually modified the configuration or the system may have automatically modified the configuration to allocate a greater amount 4370 of the particular resource, therefore a larger corresponding amount 4380 is reduced from the total resource allotment of graph 4320.

In some embodiments, the tracking transparently continues throughout the billing period until a specified event is triggered. Such a trigger is illustrated in graph 4320 by the line 4390. In some embodiments, the triggering event indicates that the sum of the allocated resources for the current billing period is within a notification threshold. Such an event is triggered during billing sub-interval 4365 where the allocated amount of resources 4375 causes the total allotment of resources for the billing period to fall to the notification threshold shown by line 4390.

The notification threshold 4390 of some embodiments indicates that the configuration is nearing its total allotment for the current billing period and may potentially exceed the allotment before the end of the billing period resulting in overage charges. In some embodiments, the notification threshold 4390 specifies that the configuration has exceeded the current allotment of resources. Accordingly, some embodiments provide notification to the user while also providing notification to the data collector and data analyzer to begin computing overage charges for the particular configuration. However, it should be apparent to one of ordinary skill in the art that such a triggering event may be depicted as an additional triggering line within FIG. 43. Additionally, it should be apparent to one of ordinary skill in the art that the total resource allotment graph 4320 may include several other triggering event lines for various other triggering events.

Figure 44:
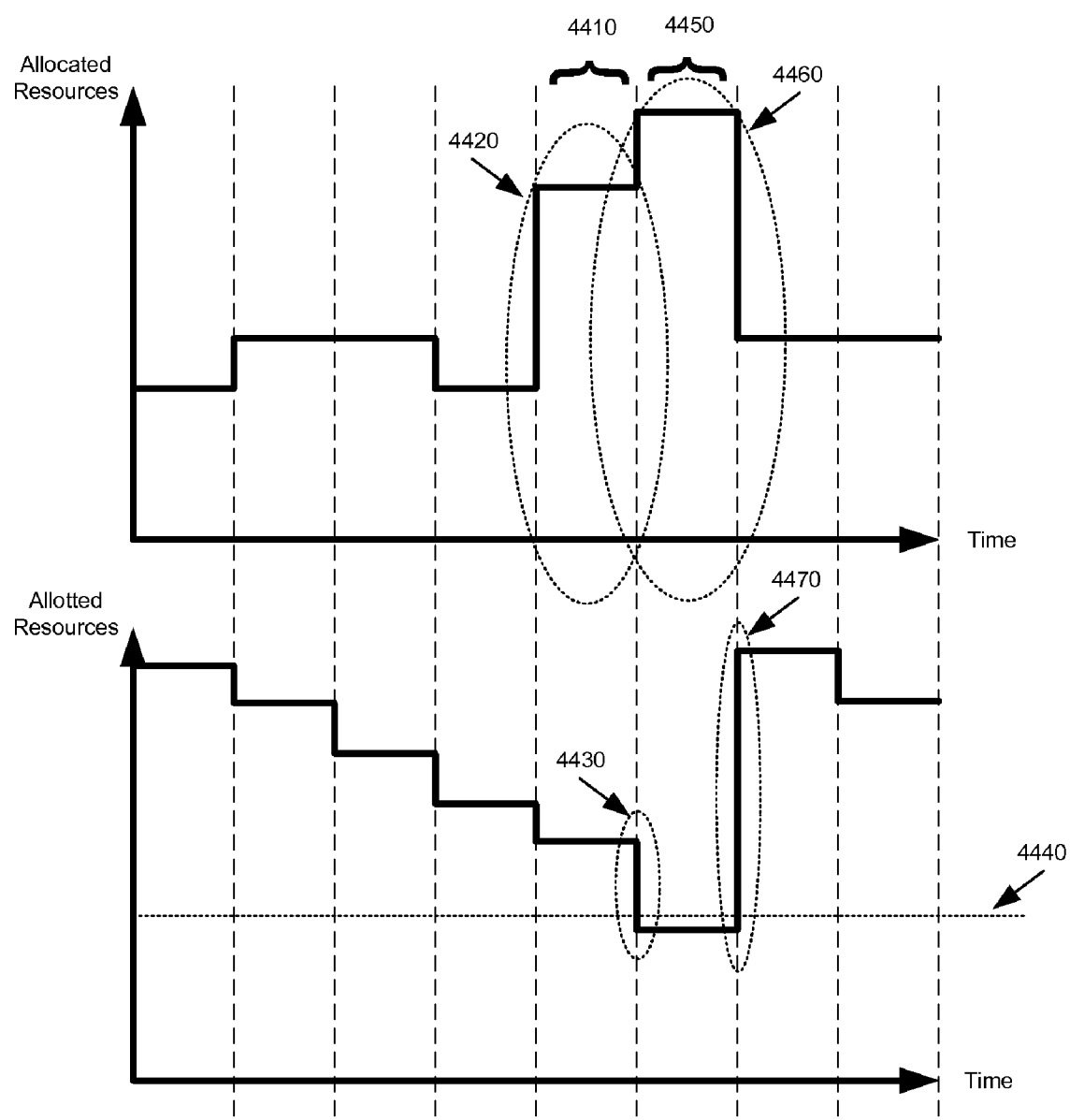
FIG. 44 conceptually illustrates an available option for a user to cure a configuration that has reached a particular allotment threshold.

FIG. 44 conceptually illustrates an available option for a user to cure a configuration that has reached a particular allotment threshold. As illustrated in FIG. 44, during billing sub-interval 4410, the particular configuration allocates an amount 4420 of a resource that causes the total amount allotted for the current billing period to fall below the notification threshold 4440. Accordingly, the user is notified of the lack of remaining allotted resources. In this example, the notification might occur via an automated email that is sent to the user informing the user of the current status of his/her configuration. Based on the received notification, the user may change the current resource allotment plan and select a different resource allotment plan that provides a greater allotment of resources.

During billing sub-interval 4450, the configuration continues to allocate a large amount of resources 4460, however because the user has selected a new resource allotment plan, the available allotment of resources during billing sub-interval 4450 increases to 4470. In this manner, users can avoid unnecessary overage charges and dynamically select billing plans that best suit their actual usage needs even though such usage needs may not be determined until after the configuration begins operations.

Figure 45:
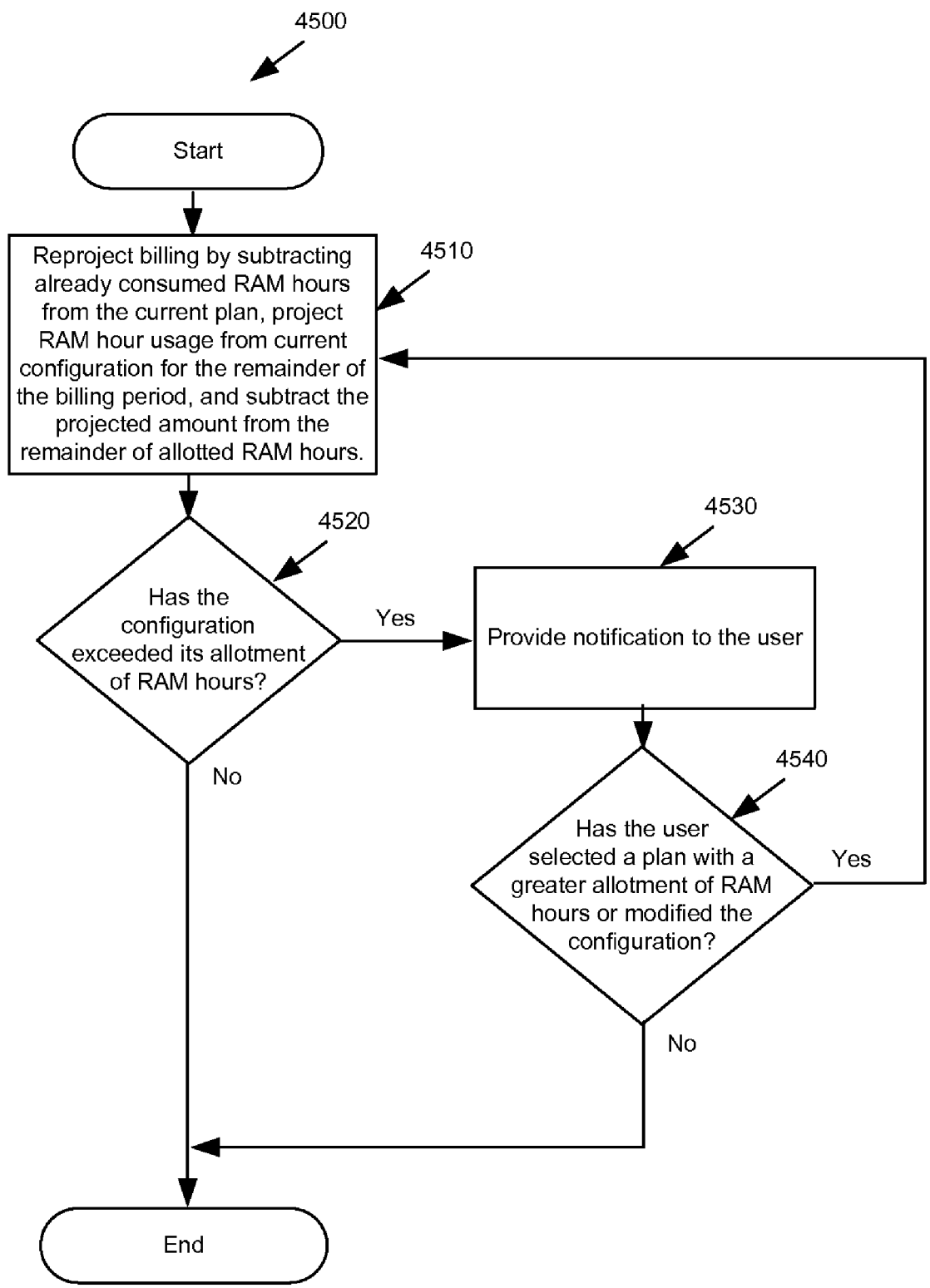
FIG. 45 presents a billing process that conceptually illustrates several operations performed by the data collector and data analyzer to recompute the projected billing for a particular configuration after receiving a modified resource allotment plan.

After the user selects a new resource allotment plan in response to a notification that the user configuration has exceeded or is about to exceed its allotted resource, the billing process is rerun to determine that a sufficient resource allotment has been procured for the remainder of the billing period. FIG. 45 presents a billing process 4500 that conceptually illustrates several operations performed by the data collector and data analyzer to recompute the projected billing for a particular configuration after receiving a modified resource allotment plan.

The process projects the billing for the remainder of the current billing period by subtracting (at 4510) the currently used resources (e.g., RAM) to date from the current resource allotment plan. The remainder specifies the amount of allotted resources available to be allocated for the remainder of the billing period. The process then projects the resource usage of the current configuration for the remainder of the current period.

The process determines (at 4520) if the configuration exceeds the allotment based on the already consumed amount of resources for the current billing period and the projected usage for the remainder of the billing period. If the projected resource usage falls within the current allotted set of resources, then the billing process ends. If the projected resource usage continues to exceed the current allotted plan, then the process (at 4530) notifies the user of the deficiency at which point the user may select a different resource allotment plan. In some embodiments, the user cures the deficiency by reconfiguring the resource allocation of the configuration so that the total amount of the deficient resource consumed by the configuration is reduced.

The billing process returns to 4510 should the user select (at 4540) a new resource allotment plan or reconfigure the allocated resources of the configuration in response to the notification. If the user does not adjust the resource allotment plan or modify the configuration and the configuration is exceeding the set of allotted resources, then the billing process ends and the configuration might be subject to overage charges. Additionally, so long as the user configuration exceeds the allotted set of resources of the selected resource allotment plan, some embodiments continually present the notification provided at 4530 whenever the user accesses the hosting system to monitor the configuration.

While FIG. 45 has been described by reference to examples with respect to a particular resource (i.e., RAM hours), it should be apparent to one of ordinary skill in the art that various other allocatable resources (e.g., CPU cycles, throughput, consumed network bandwidth, etc.) may similarly be encompassed within the scope of the billing process 4500. As mentioned above, instead of or in conjunction with the memory, the billing process 4500 performs projected billing over other allocatable resources in some embodiments. For instance, some embodiments determine whether a particular allotment for RAM hours and CPU cycles has been exceeded.

B. Tracking of Used Resources

Projected billing provides users with a beforehand knowledge of expected resource usage. However, due to the reconfiguration functionality provided by some embodiments of the invention, such resource usage can be modified during the billing period. Therefore, in order to bill according to the actual resource usage, some embodiments track the configurations by taking snapshots of the resource allocation during specified intervals.

Figure 46:
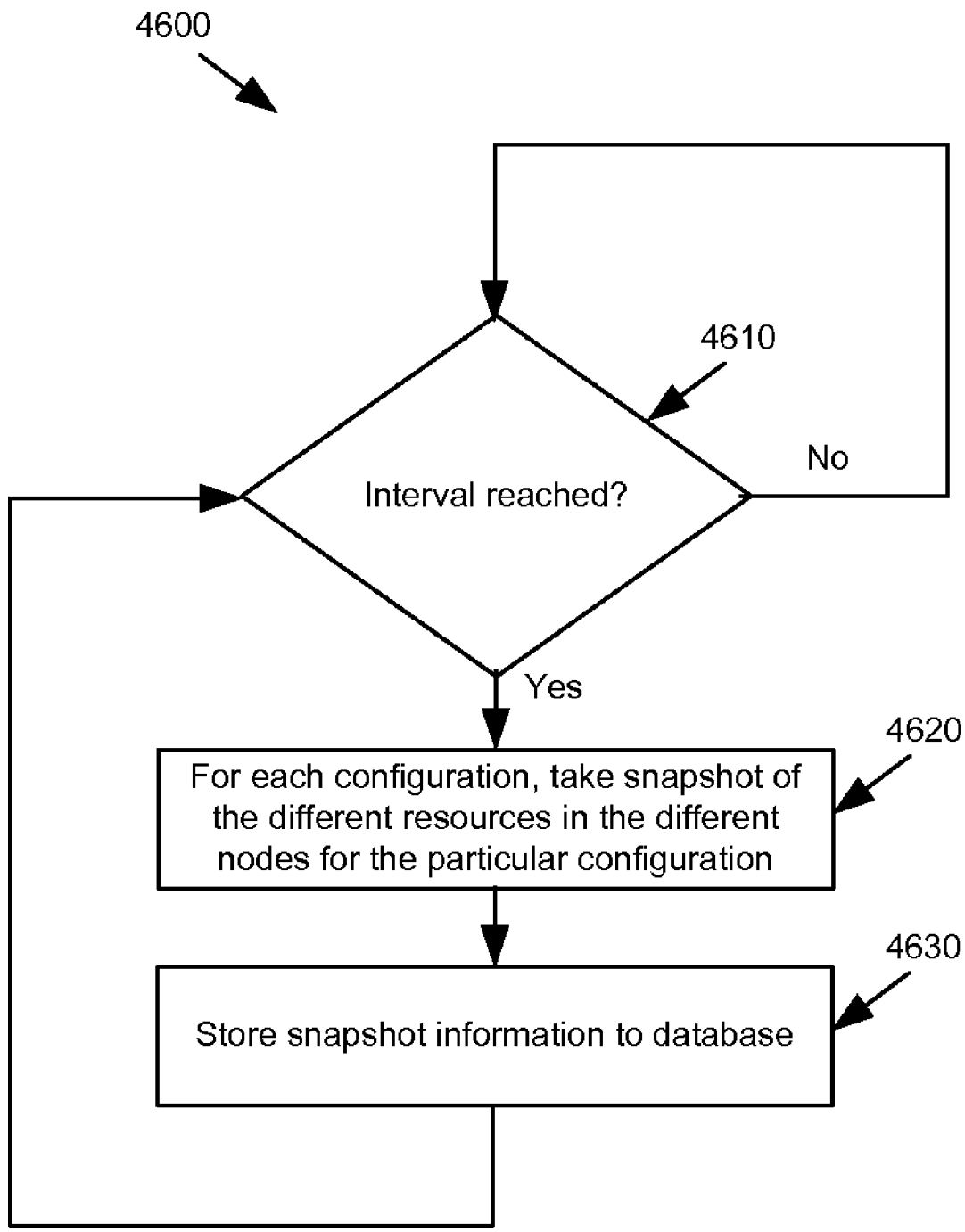
FIG. 46 presents a tracking process that conceptually illustrates several operations performed by the data collector to track the allocated resources for the configurations.

FIG. 46 presents a tracking process 4600 that conceptually illustrates several operations performed by the data collector to track the allocated resources for a particular configuration. The tracking process 4600 begins when the process identifies (at 4610) a predetermined tracking interval. In some embodiments, tracking is performed on an hourly basis, while in other embodiments tracking is performed on a daily basis. Additionally, the tracking interval of some embodiments is a definable parameter that can be adjusted by a system administrator or user in response to various factors.

If the interval has not been reached (at 4610), the process continues in a loop. While looping, the process of some embodiments may perform other operations such as data analysis or storage of data. If the interval has been reached (at 4610), the process takes a snapshot (at 4620) that records and stores in a database one or more resources (e.g., RAM, data transfer, disk storage, etc.) that have been allocated to each deployed configuration at the particular interval. For instance, a snapshot of a particular configuration records that the configuration has 2 gigabytes of RAM allocated at the interval and 10 gigabytes of data was transferred during the first interval. At a second interval, the user may have modified the configuration so that 4 gigabytes of RAM are allocated and 20 gigabytes of data was transferred. Accordingly, the snapshot at the second interval records the amount of resource allocated at each interval and further identifies modifications that occurred within the configuration.

In some embodiments, the process takes snapshots for all components of a particular configuration irrespective of the node location so that the analysis can be performed on a configuration per configuration basis. Some embodiments also provide the option of combining all the snapshots for all configurations of a particular user so that the analysis can be performed on a user-by-user basis irrespective of the number of configurations specified by each user. In still other embodiments, the process takes snapshots for only those components located on a particular node and therefore analysis can be conducted on a node per node basis.

It should be apparent to one of ordinary skill in the art that the process 4600 is performed for all configurations within the hosting system. However, in some embodiments, the hosting system takes snapshots for different resources of different configurations (e.g., CPU cycles and disk storage). Additionally, it should be apparent to one of ordinary skill in the art that even though the process 4600 illustrates taking snapshots for all configurations at the same interval, some embodiments of the tracking process of FIG. 46 are implemented so that snapshot interval for various configurations occurs at different instances. For example, the process takes snapshots for a first set of configurations at the start of every hour whereas the process takes snapshots for a second set of configurations at every hour however such snapshots occur twenty minutes into the hour. Alternatively, some embodiments specify different intervals for different sets of configurations so that the process takes snapshots at every hour for a first set of configuration and takes snapshots only on a daily basis for a second set of configurations.

The process records (4630) the snapshot information within a database. In this manner, different components of the hosting system may access the data. For example, the data may be retrieved at the end of a billing period to determine actual resource usage for billing purposes. After 4630, the process continues in a loop that continually monitors the configuration. In some embodiments, the process 4600 performs additional operations while waiting for the next interval.

C. Overage Billing

As described with reference to FIG. 45, some embodiments of the invention project resource usage before deployment of the configuration to verify that the resources allocated to a particular configuration do not exceed the amount of allotted resources for a billing period. Nevertheless, users may reconfigure their configurations after deployment to allocate resources in excess of the specified allotment. Additionally, users may choose to ignore notifications indicating excessive resource allocation and rather than pay for an upgrade in a resource allotment plan, some users may choose an acceptable amount of overage billing.

Figure 47:
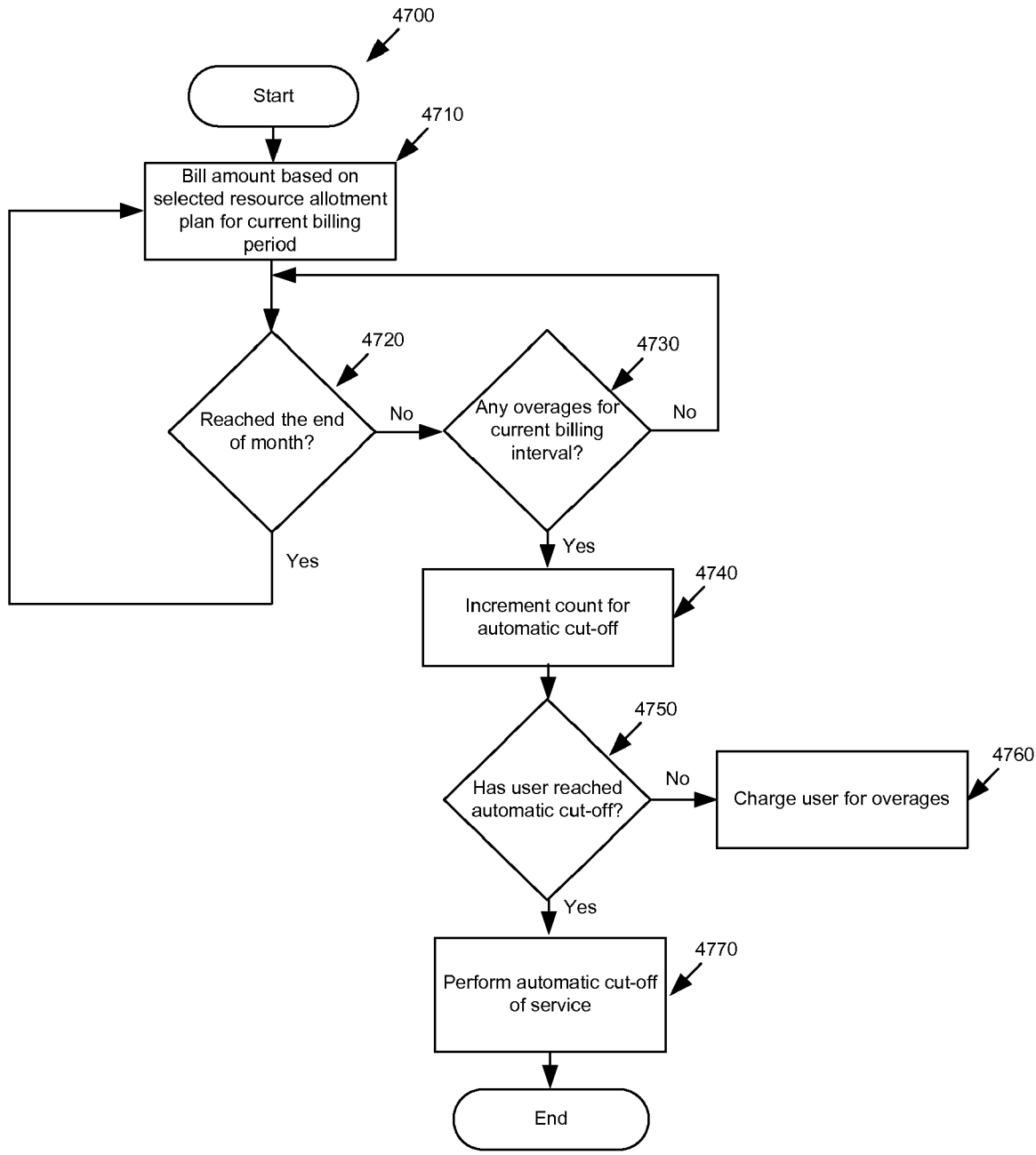
FIG. 47 presents a process that conceptually illustrates several operations for the various billing procedures encompassed within some embodiments of the invention.

FIG. 47 presents a process 4700 that conceptually illustrates several operations for the various billing procedures encompassed within some embodiments of the invention. The billing process 4700 begins when the user is billed (at 4710) for the current resource allotment plan that the user selected. The process determines (at 4720) whether the billing period has ended. If the billing period has ended, then the process returns to 4710. If the billing period has not ended, the process determines (at 4730) whether the configuration should be billed for any overages that occur during the particular billing interval. If no overages occur within the particular configuration, the process returns to 4720 to continue monitoring the configuration until the end of the billing period. If the process determines that an overage has occurred (at 4730) by exceeding the set of allotted resource provided by the resource allotment plan paid for at 4710, the process increments (at 4740) an overage count.

The process determines (at 4750) whether the configuration should be automatically cut-off based on the incremented overage count. In some embodiments, the process 4700 determines (at 4750) that it should cut-off a configuration when there have been several continuous overages during consecutive billing intervals (i.e., one day) within the billing period (i.e., one month) and the user has failed to pay for the overages. In some embodiments, the process 4700 determines (at 4750) that it should also cut-off a configuration when the configuration exceeds the allotted amount of resources specified in the resource allotment plan by a specified amount or percentage as described above with reference to 4170 of FIG. 41.

If the process determines (at 4750) that the configuration can be assessed overages without reaching the cut-off state, then the user is charged for the overage at (4760). However, if the process determines (at 4750) that the configuration should be cut-off, then at 4770 automatic cut-off is performed by the process 4700.

In some embodiments, automatic cut-off specifies that some or all the hosting services provided to the configuration are to be disabled. For instance, in some embodiments, the allocated resources of the configuration are removed from the grid of hardware nodes whereas other embodiments suspend operations of the configuration on the nodes until a new allotment plan is selected and any overage payments have been paid for. Additionally, some embodiments only disable administrative controls to the configuration so that a user is unable to modify the configuration even though the configuration remains operational. In still other embodiments, the hosting system throttles the configuration by reducing the allocated resources to a predetermined minimum set of resources, thus providing an operational configuration that is only able to process limited data.

Figure 48:
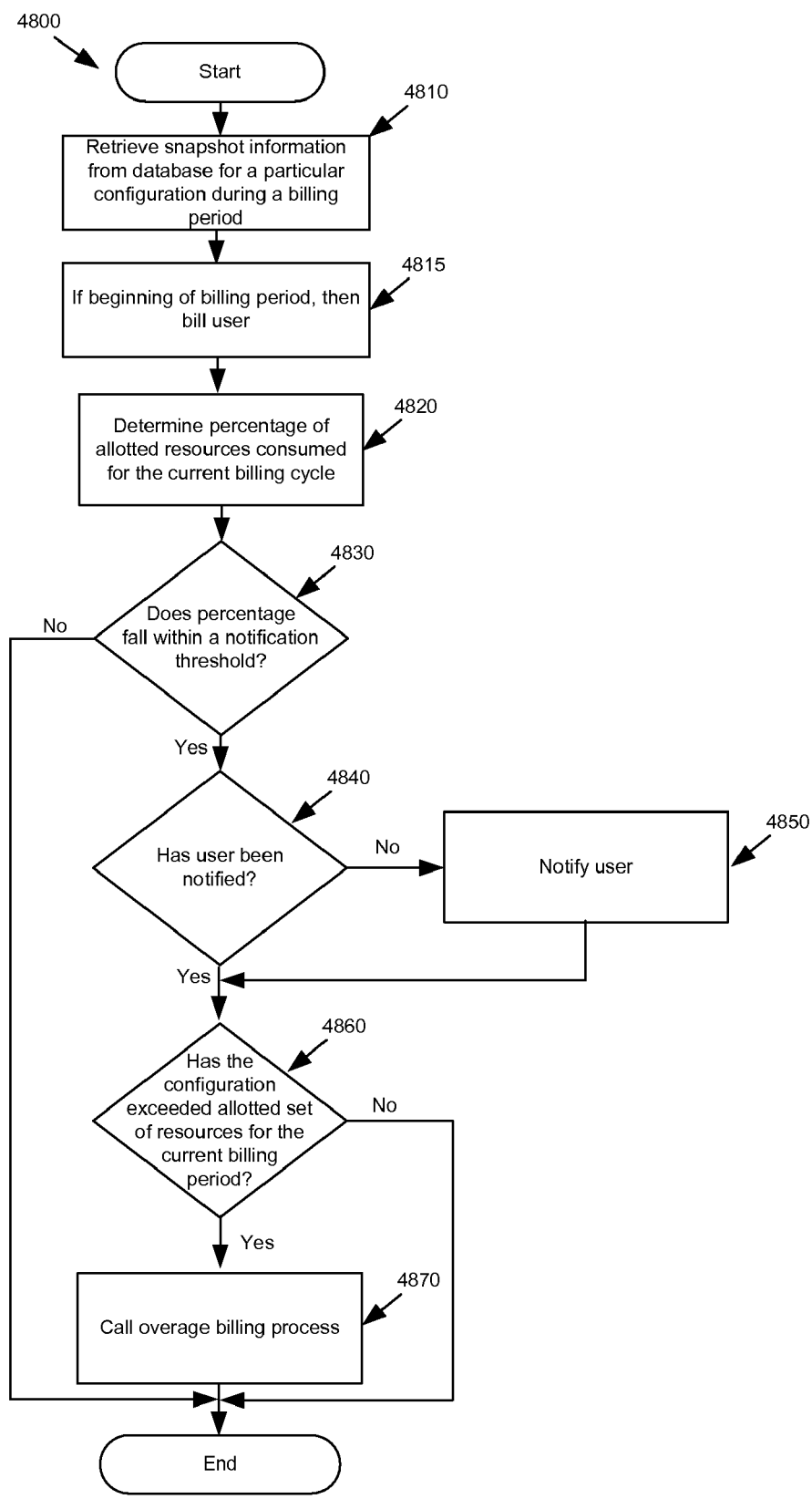
FIG. 48 presents a process that conceptually illustrates several operations performed during the billing process described with reference to FIG. 47.

FIG. 48 presents a process 4800 that conceptually illustrates several operations performed during the billing process described with reference to FIG. 47. The process 4800 begins by retrieving (at 4810) the snapshot information that captures the resources used by a particular configuration during a billing period. The process identifies (at 4815) whether it is the beginning of a new billing period and if so the user is billed for a selected resource allotment plan. The process then determines (at 4820) the percentage of allotted resources consumed during the current billing period based on the snapshot information. If the process determines (at 4830) that the percentage of consumed resources falls within a specified threshold, then the process determines (at 4840) whether the user has already been notified of the resource status. In some embodiments, the specified threshold indicates that the configuration is nearing its resource allotment usage in order to allow preemptive action by the user to avoid overage charges before they occur.

The notification check at 4840 prevents the process 4800 from continually notifying the user every time the process is run. For instance, the process 4800 occurs at specified intervals for billing overage usage. Such intervals may occur at different periods of time than the periods for the snapshot recording of data and for the projected resource usage described above with reference to FIG. 45. Specifically, some embodiments perform the overage usage process of FIG. 48 on a daily basis so that overages are billed daily to users.

If the process determines (at 4840) that the user has not been notified, the process notifies the user at 4850. In some embodiments, notification occurs via email while in other embodiments notification occurs through alternative communications to the user, such as through the "Thrash-O-Meter" of the front-end logic described above. If the process determines (at 4840) that the user has been notified, the process then determines (at 4860) whether the configuration has exceeded its resource allotment.

Figure 49:
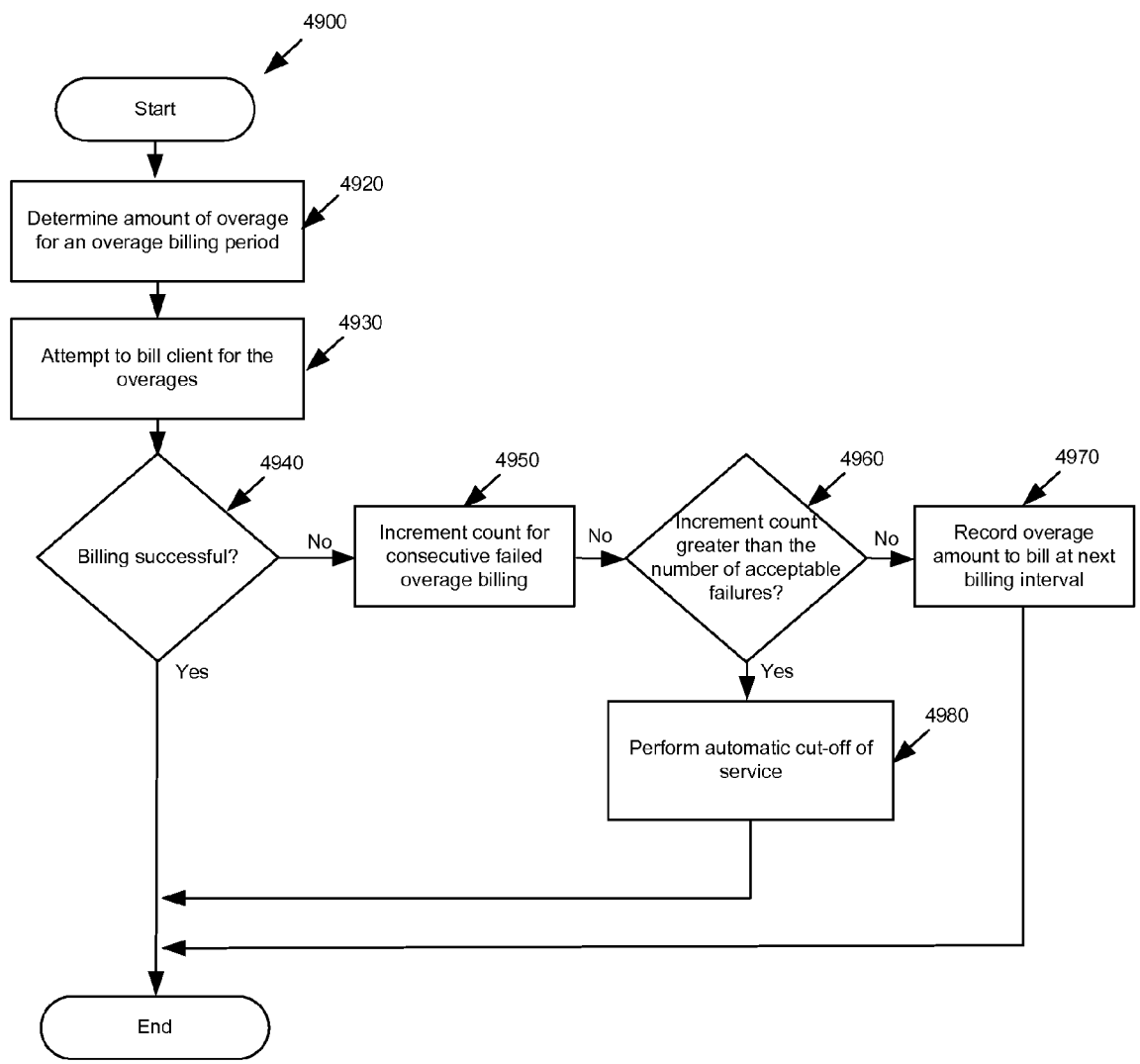
FIG. 49 presents an overage billing process that conceptually illustrates several operations performed in order to determine the amount of overage billing for a particular configuration.

A configuration that has not exceeded its resource allotment will continually be monitored in order to determine that the configuration stays below its allotted set of resources for the billing. However, should the configuration exceed its resource allotment, the amount of overages resulting from the amount of resources used in excess of those allotted and the duration for the overage will be determined pursuant to the overage billing process presented in FIG. 49 below. Accordingly, the process performs a call to initiate the process described within FIG. 49.

As described above, FIG. 49 presents a overage billing process 4900 that conceptually illustrates several operations performed in order to determine the amount of overage billing for a particular configuration. In some embodiments, the overage billing process 4900 is performed after the process 4800 of FIG. 48 during every overage billing interval (i.e., on a daily basis).

The overage billing process 4900 begins by determining (at 4920) the amount of overages that occurred during the current overage billing period. For instance, with reference to the overage billing specified within the resource allotment plans of FIG. 41, a configuration that has selected the plan 4140 and exceeds the 400 gigabytes of allotted RAM hours by 10 gigabytes of RAM hours in one day will be assessed an overage charge of $10.00 (i.e., 10 gigabytes of RAM hours over allotment with an overage penalty of $1 for every gigabyte of RAM hours over allotment).

The process then attempts to bill (at 4930) the user for the determined amount of overages. If the billing is successful (at 4940) the process ends. However, if billing is unsuccessful (at 4940) then the process increments (at 4950) a variable to track the number of failed overage billing attempts.

The process determines (at 4960) if the increment count is greater than a specified number of acceptable failures (e.g., three consecutive days of nonpayment). If not, the process records (at 4970) the overage amount and attempts to bill the user at the new billing interval of the billing period.

Otherwise, the process performs (at 4980) the automatic restricting of services. In this manner, users are protected against excessive overage billing. Alternatively, some embodiments may stop service based on an allowable amount of overages specified within the resource allotment plan selected by the user. For instance, with reference to FIG. 41, a user selects the plan 4140 that allots 400 gigabytes of RAM hours and specifies a cut-off at 600 gigabytes of RAM hours. If in one billing cycle the user's configuration uses over 600 gigabytes of RAM hours, some embodiments of the overage billing process 4900 will stop service to the user's configuration. In this manner, users are protected against excessive overage charges. Alternatively, some embodiments automatically select the next larger resource allotment plan rather than continually bill overages to the user.

It should be apparent to one of ordinary skill in the art that the various cut-off embodiments may be performed within a single overage billing process. Additionally, some embodiments specify various other criterion on which to perform the automatic cut-off.

V. Computer System

Many of the above-described processes (such as the processes illustrated in FIGS. 32, 33, and 35) are implemented as software processes that are specified as a set of instructions recorded on a machine readable medium (also referred to as computer readable medium). When these instructions are executed by one or more computational element(s) (such as processors or other computational elements like FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc.

In this specification, the term "software" is meant in its broadest sense. It can include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. For example, the front-end logic as one program with the scheduler and deployment manager implemented as separate programs. Finally, any combination of separate programs that together implement a software invention described here is within the scope of the invention.

FIG. 50 conceptually illustrates a computer system with which some embodiments of the invention are implemented. The computer system 5000 includes a bus 5005, a processor 5010, a system memory 5015, a read-only memory 5020, a permanent storage device 5025, input devices 5030, and output devices 5035.

The bus 5005 collectively represents all system, peripheral, and chipset buses that support communication among internal devices of the computer system 5000. For instance, the bus 5005 communicatively connects the processor 5010 with the read-only memory 5020, the system memory 5015, and the permanent storage device 5025.

From these various memory units, the processor 5010 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 5020 stores static data and instructions that are needed by the processor 5010 and other modules of the computer system. The permanent storage device 5025, on the other hand, is a read-and-write memory device. This device is a non-volatile memory unit that stores instruction and data even when the computer system 5000 is off. Some embodiments of the invention use a mass-storage device (such as a magnetic or optical disk and its corresponding disk drive) as the permanent storage device 5025. Some embodiments use one or more removable storage devices (flash memory card or memory stick) as the permanent storage device.

Like the permanent storage device 5025, the system memory 5015 is a read-and-write memory device. However, unlike storage device 5025, the system memory is a volatile read-and-write memory, such as a random access memory. The system memory stores some of the instructions and data that the processor needs at runtime.

Instructions and/or data needed to perform processes of some embodiments are stored in the system memory 5015, the permanent storage device 5025, the read-only memory 5020, or any combination of the three. For example, the various memory units contain instructions for performing the processes of some embodiments of the invention. From these various memory units, the processor 5010 retrieves instructions to execute and data to process in order to execute the processes of some embodiments.

The bus 5005 also connects to the input and output devices 5030 and 5035. The input devices enable the user to communicate information and select commands to the computer system. The input devices 5030 include alphanumeric keyboards and cursor-controllers. The output devices 5035 display images generated by the computer system. The output devices include printers and display devices, such as cathode ray tubes (CRT) or liquid crystal displays (LCD). Such displays can be used to view the multi-server control panel of some embodiments of the invention. Finally, as shown in FIG. 50, bus 5005 also couples computer 5000 to a network 5065 through a network adapter (not shown). In this manner, the computer can be a part of a network of computers (such as a local area network ("LAN"), a wide area network ("WAN"), or an Intranet) or a network of networks (such as the Internet).

It should be recognized by one of ordinary skill in the art that any or all of the components of computer system 5000 may be used in conjunction with the invention. For instance, some or all components of the computer system described with regards to FIG. 50 are used to store, perform or comprise some embodiments of the front-end provisioning logic, scheduler, deployment manager, data collector, data analyzer, and registration module described above. Moreover, one of ordinary skill in the art will appreciate that any other system configuration may also be used in conjunction with the invention or components of the invention.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

Accordingly, while the invention has been described with reference to numerous specific details, one of ordinary skill in the art will recognize that the invention can be embodied in other specific forms without departing from the spirit of the invention. For example, several embodiments described above use virtualization technology to deploy a set of configurations to one or more hardware nodes. This technology in some embodiments allows different configurations (of the same user or different users) to be deployed to one physical hardware node (e.g., one server). However, as understood by one of ordinary skill, other embodiments may deploy a configuration for a particular user to a set of servers that are dedicated to only the particular user. In other words, some embodiments might not share hardware nodes among different users or different configurations. Thus, one of ordinary skill in the art would understand that the invention is not to be limited by the foregoing illustrative details, but rather is to be defined by the appended claims.

What is claimed is:

1. A computer-implemented method for specifying a multi-layered system configuration of a set of virtual servers through a graphical user interface (GUI), the method comprising:

providing a set of user interface (UI) control elements for specifying the set of virtual servers for the multi-layered system configuration;

providing a first display area for displaying the multi-layered system configuration in a plurality of tier regions, wherein different tier regions are for displaying different subsets of the set of virtual servers that are in different layers of the multi-layered system configuration;

providing a first set of graphical items for representing a first subset of virtual servers that are web servers of the multi-layered system configuration in a first tier region of the plurality of tier regions;

providing a second set of graphical items for representing a second subset of virtual servers that are database servers of the multi-layered system configuration in a second tier region of the plurality of tier regions, the second tier region parallel to the first tier region;

providing a third set of graphical items for representing a third subset of virtual servers that are load balancers of the multi-layered system configuration in a third tier region of the plurality of tier regions, the third tier region parallel to the first and second tier regions;

receiving a selection of a graphical item that represents a particular virtual server in the set of virtual servers;

providing a UI control element for displaying a second display area that displays a virtual Internet Protocol (IP) address associated with the particular virtual server and a set of real IP addresses associated with the virtual IP address;

receiving a selection of the UI control element;

upon receiving the selection of the UI control element, providing the second display area;

providing the set of real IP addresses for display within the second display area, wherein a selection of a real IP address from the set of real IP addresses removes the real IP address from the set of real IP addresses that are associated with the virtual IP address; and providing a selectable item that, when selected, starts an automated process that causes the set of virtual servers to be deployed onto a set of physical computers without human intervention.

2. The computer-implemented method of claim 1 further comprising receiving a cursor over operation on the graphical item that represents the particular virtual server, wherein a third display area that overlaps the first display area and that provides data related to the particular virtual server is provided when the cursor over operation is received.

3. The computer-implemented method of claim 2, wherein the data related to the particular virtual server comprises an amount for each resource of a set of resources that is allocated to the particular virtual server.

4. The computer-implemented method of claim 1, wherein the set of UI control elements is a first set of UI control elements, the method further comprising providing a third display area for displaying a second set of UI control elements for performing a set of operations on the particular virtual server, wherein a UI control element of the second set of UI control elements is for performing a delete operation that deletes the particular virtual server from the multi-layered system configuration.

5. The computer-implemented method of claim 1 further comprising providing a third display area for displaying (i) data indicating usage of resources by the multi-layered system configuration and (ii) data indicating an amount that is charged to a user of the multi-layered system configuration based on the usage of the resources by the multi-layered system configuration.

6. The computer-implemented method of claim 5, wherein the set of UI control elements, the first display area, the second display area, and the third display area are provided in different sections of a single display for concurrent display.

* * * * *